(12) United States Patent
Wilkins et al.

(10) Patent No.: US 9,002,018 B2
(45) Date of Patent: Apr. 7, 2015

(54) ENCRYPTION KEY EXCHANGE SYSTEM AND METHOD

(75) Inventors: John Wilkins, Concord, CA (US); Michael Keefe, Danville, CA (US); Sam Rehman, San Francisco, CA (US)

(73) Assignee: Sync Up Technologies Corporation, Danville, CA (US)

( * ) Notice: Subject to any disclaimer, the term of this patent is extended or adjusted under 35 U.S.C. 154(b) by 389 days.

(21) Appl. No.: 12/931,631

(22) Filed: Feb. 7, 2011

(65) Prior Publication Data

US 2012/0204032 A1    Aug. 9, 2012

(51) Int. Cl.
| | |
|---|---|
| H04L 29/06 | (2006.01) |
| H04L 9/08 | (2006.01) |
| H04L 9/00 | (2006.01) |
| H04L 9/32 | (2006.01) |
| H04L 12/58 | (2006.01) |

(52) U.S. Cl.
CPC ............ *H04L 9/083* (2013.01); *H04L 9/006* (2013.01); *H04L 9/0891* (2013.01); *H04L 9/321* (2013.01); *H04L 9/3263* (2013.01); *H04L 63/0428* (2013.01); *H04L 51/00* (2013.01); *H04L 63/062* (2013.01); *H04L 2463/041* (2013.01)

(58) Field of Classification Search
USPC ......................................................... 380/285
See application file for complete search history.

(56) References Cited

U.S. PATENT DOCUMENTS

| | | | |
|---|---|---|---|
| 4,200,770 A | 4/1980 | Hellman et al. | |
| 4,218,582 A | 8/1980 | Hellman et al. | |
| 4,405,829 A | 9/1983 | Rivest et al. | |
| 4,424,414 A | 1/1984 | Hellman et al. | |
| 5,657,390 A | 8/1997 | Elgamal et al. | |
| 6,014,688 A | 1/2000 | Venkatraman et al. | |
| 6,061,791 A * | 5/2000 | Moreau | 713/171 |
| 6,154,543 A | 11/2000 | Baltzley | |
| 6,986,049 B2 | 1/2006 | Delany | |
| 7,721,093 B2 * | 5/2010 | Sundararajan | 713/168 |
| 7,770,018 B2 * | 8/2010 | Fiske | 713/182 |
| 7,809,953 B2 * | 10/2010 | Little et al. | 713/184 |
| 7,957,726 B2 * | 6/2011 | Whittington et al. | 455/418 |
| 7,979,899 B2 * | 7/2011 | Guo et al. | 726/7 |
| 8,209,394 B2 * | 6/2012 | Guo et al. | 709/217 |
| 8,209,744 B2 * | 6/2012 | Zhu et al. | 726/5 |
| 8,209,751 B2 * | 6/2012 | Fiske | 726/18 |
| 8,230,486 B2 * | 7/2012 | Voice | 726/5 |
| 8,245,040 B2 * | 8/2012 | Matsuo | 713/168 |
| 8,296,562 B2 * | 10/2012 | Williams et al. | 713/155 |

(Continued)

OTHER PUBLICATIONS

Digital Signcryption|http://www.signcryption.org/publications/pdf-files/yz-c97-fnl-rvs.pdf| Zheng|Oct. 25, 1996|pp. 1-15.*

(Continued)

*Primary Examiner* — Mahfuzur Rahman

(57) ABSTRACT

The present invention is a computer-implemented key exchange system and methods for improving the usability of encryption technologies such as Public Key Infrastructure (PKI). One aspect of the present invention includes registering users, verifying user identity, and classifying users such that the users may send a communications such that communication recipients can verify the user identity and classification of the communication sender. Another aspect of the present invention includes users initiating relationships with other users, approving the establishment of relationships, and exchanging encryption keys between users after the establishment of a relationship.

23 Claims, 45 Drawing Sheets

(56) References Cited

U.S. PATENT DOCUMENTS

| | | | | |
|---|---|---|---|---|
| 8,316,237 | B1* | 11/2012 | Felsher et al. | 713/171 |
| 2003/0081785 | A1* | 5/2003 | Boneh et al. | 380/277 |
| 2003/0095663 | A1* | 5/2003 | Nelson et al. | 380/270 |
| 2003/0206638 | A1* | 11/2003 | Xu et al. | 380/281 |
| 2004/0179684 | A1* | 9/2004 | Appenzeller et al. | 380/44 |
| 2004/0181469 | A1* | 9/2004 | Saeki | 705/30 |
| 2004/0187018 | A1* | 9/2004 | Owen et al. | 713/200 |
| 2004/0249817 | A1* | 12/2004 | Liu et al. | 707/9 |
| 2005/0069137 | A1 | 3/2005 | Landrock | |
| 2005/0120214 | A1* | 6/2005 | Yeates et al. | 713/171 |
| 2005/0138353 | A1* | 6/2005 | Spies et al. | 713/153 |
| 2006/0111039 | A1* | 5/2006 | Whittington et al. | 455/8 |
| 2006/0123117 | A1* | 6/2006 | Heutchy et al. | 709/227 |
| 2008/0137859 | A1* | 6/2008 | Jagadeesan et al. | 380/270 |
| 2008/0205655 | A1* | 8/2008 | Wilkins et al. | 380/279 |
| 2009/0113543 | A1* | 4/2009 | Adams et al. | 726/18 |
| 2009/0292641 | A1* | 11/2009 | Weiss | 705/66 |
| 2010/0100733 | A1* | 4/2010 | Jaber et al. | 713/168 |
| 2010/0159898 | A1* | 6/2010 | Krzyzanowski et al. | 455/414.1 |
| 2010/0268771 | A1* | 10/2010 | Kulakowski et al. | 709/203 |
| 2011/0126002 | A1* | 5/2011 | Fu et al. | 713/156 |

OTHER PUBLICATIONS

SEFAP: An Email System for Anti-Phishing by Qiong Ren, Yi Mu, and Willy Susilo, University of Wollongong 2007.

Introduction to Identity-Based Encryption, by Luther Martin, Artech House 2008.

Ajax: The Definitive Guide, by Anthony T. Holdener, O'Reilly Media 2008.

Facebook Cookbook: Building Applications to Grow Your Facebook Empire, by Jason Goldman 2009.

OpenSocial Network Programming, by Lynne Grewe, Wiley Publishing 2009.

Service-Oriented Architecture (SOA): Concepts, Technology, and Design, by Thomas Erl, Pearson Education 2005.

Comparing Elliptic Curve Cryptography and RSA on 8-bit CPUs, by Nils Gura, Arun Patel, Arvinderpal Wander, Hans Eberle and Sheueling Chang Shantz, Springer Berlin/Heidelberg 2004.

Guide to Elliptic Curve Cryptography, by Darrel Hankerson, Alfred J. Menezes, Scott Vanstone, Springer-Verlag New York, Inc. 2004.

Programmer's Guide to Internet Mail: SMTP, POP, IMAP, and LDAP, by John Rhoton, Butterworth-Heinemann 2000.

Internet e-mail: Protocols, Standards, and Implementation, by Laurence Hughes, Artech House 1998.

Kerberos: The Definitive Guide by Jason Garman, O'Reilly Media, 2003.

Storage Virtualization: Technologies for Simplifying Data Storage and Management, by Tom Clark, Pearson Education, Inc. 2005.

Designing Storage Area Networks: A Practical Reference for Implementing Fibre Channel and IP SANs, by Tom Clark, Addison-Wesley 2003.

Cloud Application Architectures: Building Applications and Infrastructure in the Cloud, by George Reese, O'Reilly Media 2009.

Mastering Regular Expressions, by Jeffrey Friedl, O'Reilly Media 2006.

Content Delivery Networks: Web Switching for Security, Availability, and Speed, by Scott Hull, McGraw-Hill 2002.

* cited by examiner

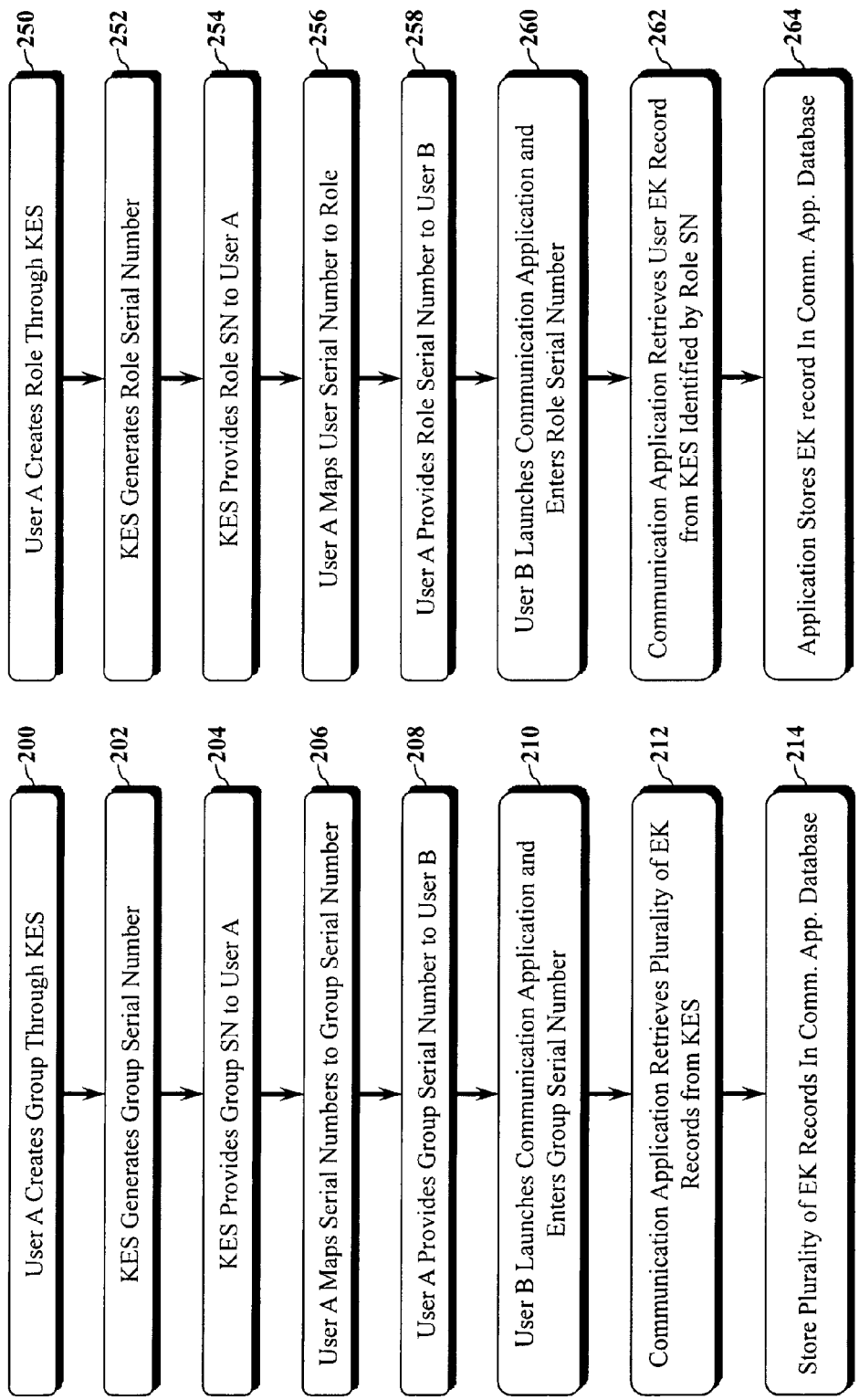

Search Request

| User ID | Search Criteria |

Fig. 6a

Search Result

| First and Last Name | SN | Public Profile |

Search Result Container

| Search Result |
| Search Result |

Fig. 6c

EK Request

| User ID | Device ID | Reply Format | Request Type | SN | SN PIN | Language/Country | Category |

EK Reply

| Reply Type | SN | EK Record Data | Message | Language/Country |

EK Reply Container

| EK Reply |
| EK Reply |

Fig. 7c

EK Request Container

| EK Request |
| EK Request |

Fig. 7d

-----BEGIN PGP PUBLIC KEY BLOCK-----
Version: GnuPG v1.4.9 (MingW32)

mQENBEp3lo4BCADixKXgQKa3WFq509tWxziiPTnjMCdD+AjMPLuKjc6lMixATJOK
9RFujO0DBbDjiAYp4AeHLyVCb84HOykLRAb3EaMsmOOOO8qe1A4BmLMdhJB27JEs
RT2WyjpYynzApbe4nKdqKN7fyMOtERAAd6M/PkxIJ3yHBXkM91T0GUWA4Sx6h5IJ
hWmkoQZiQLdBPEhLMyJEDDiTxsOgHDIPgPkq1Ovq7IqrU+c3PcxrIhuTCoywyt1h
K7sp2pdJp9bEG5opVF7YVusHPQZFzJjfUzNCvfcc1pfVHICWgvJwXCamgxw6gSoZ
3aeeCuroZ49USxgxvrVaU6hS0bw77b92mLC1ABEBAAG0JkpvaG4gV2lsa2lucyA8
am9obi53aWxraW5zQHN5bmN1cC5jb20+iQE8BBMBAgAmBQJKdyKOAhsjBQkJZgGA
BgsJCAcDAgQVAggDBBYCAwECHgECF4AACgkQvQm9pqi/ZOIH2Af+LEKXl4LYssbp
+eNBjzcEmcrPH0nDLUqwADDHsuTt52z/CBy8sJxOqia2OOqagdGahHTYQguoq6OP
V0+1Ukpsrr YPk/fk5mBXQo5dkiokds/7/8I7PqBbkOqAaRrO0b9W7S/Qzk4Nof/N
KNwjD78gHBVAGNn+r/oxHK9I9Y6j30qtORMRRIo/zfpAr+mSFD5ssgS03FO6WG8K
tZGKKTIYJtwILdkBgLU0KjbQozjd7WIUngBOopdl86ztg5uuUuko8pfHJRo8ZV4f
U39hQgh3XyKDhWNIZZDs3pH5K7USdR0qM37vXf0ixSLFatfbU2eIJavvfK2LTohn
SPbVB167c7kBDQRKdyKOAQgA0hVRTMsMvIrygc75w7LJzrBY6M9VovKjcHDXtepM
AwQQdrEgtW4hqW0r5gWOBmLwcYDSGn3jUrt6NyN8BgPuKmP00YaxsRO5izckCUm
H26G/OVxx+Y1J38VPjLFpf8oAFGRsD8cXCp60nEOf5ST3cV6OafUbSK1OVx9q5zs
FxpEcm9eUuz7IxBIpC0o+NhXrVrSuzWPwV2fVGxBzNVP7WdvpOwwfpUoaMXKxhq7
Bsul43UzySKf5i7BzbWwBNJizcGDqoTakHXcDfLmQKTgnND7uFx2ZSydKDjTerfl
h/xPbBlangYFJq36LDrxvEfG4+Rzs1hklwGgnECqcRmmMlwARAQABiQElBBgBAgAP
BQJKdyKOAhsMBQkJZgGAAAoJEL0Jvaaov2TiXH4IAKywewQhPp9pGlXrNL2IZbzs
Lyx/bP7OduAwPOsyGXQ1hfGK20nuz9SFI6zTo96DImupb2yk4F+lM10b5lXSwGf/
WS73x5XUyc9X2N6jBhQiSumrg+t3tKINMELiA6kD9tY70It7glycRx+W6c8VB2ey
OgbWcgq8fOxLqiPY0dMzNGAT0xI2jx3JJzHBSeJdNCMesI/E7U0+QpLS3Iquwx7A
tNwGgsdWthhviQUc83E0FtLoGWtUDCLu9aq1gF1LwZ89SBSdCmhqVL0ZAFpvrT0s
oDYiG6zXRUKBudTC/yzReIRarlKisQYa+cdFOJeOX/FAkk0UP9SC5WiKYqOjc/E=
=9syU
-----END PGP PUBLIC KEY BLOCK-----

Fig. 12b

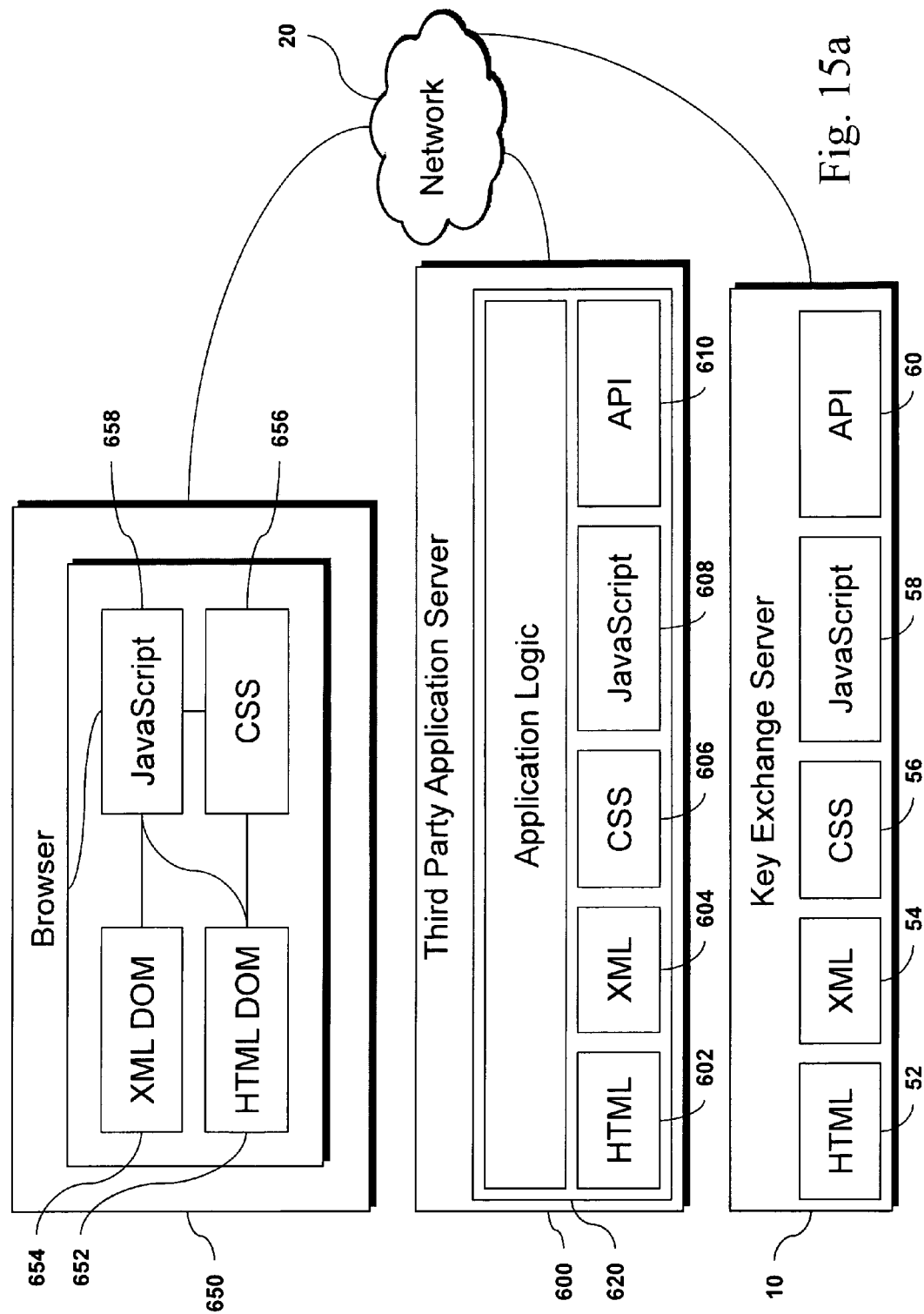

Fig. 15b

670
```
<html>
<body>
<input type="text" id="company" />
<input type="text" id="name" />
<input type="text" id="publicKey" />
</body>
</html>
```

672
```
<?xml version="1.0"?>
<dataMap>
<EKInfo>
<companyName src="syncConame" targetId="company" />
<firstName src="syncName" targetId="name" />
<publicKey src="syncPubKey" targetId="publicKey" />
</EKInfo>
</dataMap>
```

674
```
<?xml version="1.0"?>
<EKInfo>
<serial id="serialNum">JDOE2345Z</serial>
<companyName id="syncConame">Acme</companyName>
<name id="syncName">Jack Frost</name>
<publicKey id="syncPubKey">Frost</publicKey>
</EKInfo>
```

676
```
<script>
var syncPubKey = doc.getElementById('publicKey');
syncPubKey.value = doc.getElementById('syncPubKey').value;
</script>
```

Subject: Demonstration
From: MySender@sender.com
Reply-To: MySender@sender.com
To: MyRecipient@recipient.com
Return-Path: MySender@sender.com
X-Mailer: Email Application
X-SyncUp-Type: PLUGIN | PROXY | APPLIANCE ⟵ 680
X-SyncUp-Sender-SID: SERIALNUMBER ⟵ 682
X-SyncUp-Provider: PROVIDERNAME ⟵ 684
X-SyncUp-Provider-Namespace: namespace:// ⟵ 686
X-SyncUp-Provider-URL: https://www.provider.com ⟵ 688
X-SyncUp-Relationship: No ⟵ 690
X-SyncUp-Pre-Approved: Yes ⟵ 692
X-SyncUp-Encrypted: No ⟵ 694
X-SyncUp-Key-ID: KEYID ⟵ 696
X-SyncUp-Signature: <RSA SIGNATURE> ⟵ 698
X-SyncUp-Signature-Valid: <VALIDATION> ⟵ 699

Fig. 16

ENCRYPTION KEY EXCHANGE SYSTEM AND METHOD

CROSS-REFERENCE TO RELATED APPLICATIONS

This application is related to U.S. patent application Ser. No. 11/431,886, filed May 9, 2006, U.S. patent application Ser. No. 11/1713,475 filed May 2, 2007, and U.S. patent application Ser. No. 12/116,862 filed May 7, 2008, which are incorporated herein by reference. This application claims priority from U.S. Provisional Application Ser. No. 61/301,189 filed Feb. 3, 2010, which is incorporated by reference herein.

FIELD OF THE INVENTION

The present invention relates generally to establishing authenticated and secure communications and, more particularly, to methods for selectively disseminating and automatically configuring encryption keys and presenting messages indicating that a communication is authenticated, secure or both.

BACKGROUND OF THE INVENTION

Network security is of critical importance to sending data and communications over the internet. Numerous prior art solutions have been developed to address security issues. Public Key Infrastructure (PKI) key exchange (also called Diffie-Hellman key exchange) was first published publicly in 1976 by Whitfield Diffie and Martin Hellman. It was later discovered that the British signals intelligence agency, Government Communication Headquarters (GCHQ) had invented the practice first, but kept the practice classified. Early prior art solutions include U.S. Pat. Nos. 4,200,770; 4,218,582; 4,405,829; and 4,424,414.

PKI provides three powerful features: first, it enables Person A to generate a public key and a private key, and distribute the public encryption key to Person B in an insecure manner, receive a communication encrypted with the public key from Person B, which may then be decrypted only by Person A's private key. Additionally, Person A can encrypt a message with Person A's private key and transmit it to Person B, who may decrypt the message using Person A's public encryption key. The second scenario is called a 'digital signature' and serves to authenticate Person A to Person B, since it is assumed that only Person A has access to Person A's private key. An additional benefit is that encrypted communications cannot be decrypted if the contents of the message are modified, which serves to ensure that a message wasn't modified or otherwise subject to a man-in-the-middle attack during transmission.

Since PKI uses so-called asymmetric keys—a public key and a private key—the concept is challenging for non-technical individuals to understand. PKI is like a door lock that has two keys, one for encrypting (locking) and the other for decrypting (unlocking). Since the decrypting (unlocking) key is intended to remain a secret known to only one person or entity no shared secrets), the number of keys for exchanging encrypted information bi-directionally increases from one key in a scenario using a symmetric key to four keys in a scenario using PKI asymmetric keys. If there are two sets of keys, one set of keys for signing a digital work and another set of keys for encrypting a digital work, the number of keys increases to eight keys for exchanging information bi-directionally between two entities. Conceptually, this is difficult for non-technical individuals to grasp. Operationally, it is difficult to configure and use.

Anyone with access to a PKI key generation system can generate a pair of public and private encryption keys. Thus, sending an encrypted communication is effectively open to anyone. However, without additional security measures PKI can be used to impersonate a person or entity. Digital certificates were developed to validate the identity of a person or entity associated to a key using a mutually trusted authority, called a Certificate Authority (CA). When an encryption key is received within a digital certificate, the receiving computer system can use the attributes of the digital certificate to validate the certificate and encryption key with the trusted CA to ensure the identity of the person or entity associated to the encryption key.

Digital identification (ID) certificates may use PKI technology to sign contractual documents. Technically, a digital signature on a digital document is considered stronger than a physical ink signature on a paper document. The reason for the increased trust is that a digital signature can verify the person signing the digital document, while also ensuring that the digital document hasn't been modified after the signature was applied. Digital signatures may vary in the strength to which they can positively identify a person or entity. A digital ID, such as a Class-1 Digital ID$^{SM}$ from Verisign™ or a Personal Email Certificate from Thawte, matches a digital ID to an email address and preferably includes a person's name. These digital IDs verify the email address, but not the person using the email account unless further measures are taken.

To effectuate a binding contract, a certificate authority should require stronger forms of verifying the identity of a person or entity. Strong forms of identification verification typically require two forms of government issued ID, usually consisting of at least one government-issued photo ID (e.g., a driver's license, a passport, etc.) and another form of government issued ID (e.g., a birth certificate, a Social Security number, etc.). Address verification usually involves a copy of a telephone, cable or utility bill that also contains the name of the person seeking authentication. This stronger form of authentication is more expensive to administer. Web of trust notaries, attorneys, public notaries, bank managers, etc. can verify a person's identity to a certificate authority, provided the certificate authority can also identify the certifying party. These processes can be expensive, time consuming and cumbersome, which discourages people from adopting digital IDs for email and for signing contracts.

Several protocols have been developed to hide the complexity of PKI key exchange from users. The most common use of PKI encryption technology involves the use of the Secure Socket Layer (SSL) protocol or its successor, Transport Layer Security (TLS) as described in U.S. Pat. No. 5,657,390. SSL was developed to address the need for secure communication over Internet Protocol (IP). SSL technology provides several very powerful features: first, it provides a means of negotiating ciphers and hash functions between a client and a server in a 'socket layer' that resides above the transport layer (or the transport layer in TLS); second, it provides an exceptionally convenient means of conveying an encryption key for use with a web browser or other client: for example, the user of a browser client merely clicks a Secure Hypertext Transfer Protocol (HTTPS) hyperlink, which returns a hypertext document (e.g., HTML, XML) and facilitates key exchange, whereby the keys are configured for use automatically. SSL technology usually involves digital certificate validation with a certificate authority to reduce the risk of interacting with fraudulent vendors. The combination of convenience, security, and trusted keys is effectively the backbone of global electronic commerce. However, an important reason for the success of SSL/TLS is that it doesn't require the user to learn anything about the underlying technology. Ordinary people use SSL/TLS without any training and typically just marginal awareness that an exchange of encryption keys is taking place.

Secure Shell (SSH) protocol is another easy-to-use protocol that was developed to enable data exchange over a secure channel between two computers. SSH replaced insecure shell protocols like Telnet, which transmitted login and password credentials in clear text. SSH-1 was supplanted by SSH-2, which uses Diffie-Hellman Key Exchange and strong integrity checking to provide a means of thwarting man-in-the middle attacks. While SSH is user friendly, it is principally used by network engineers and system administrators.

One reason for the success of SSL and SSH is that they involve the user of a client application establishing a connection with a server. The server can automatically accept an encryption key/certificate from a client and can automatically provide an encryption key/certificate to a client, where the key/certificate exchange and configuration is completely transparent to the user.

Individuals involved in exchanging sensitive information over electronic networks may utilize numerous technically effective prior art solutions that employ encryption technology for authentication, message integrity and encryption such as Pretty Good Privacy (PGP) and its open standard, Open PGP. However, people have not adopted these solutions en masse largely due to the cumbersome nature of key exchange and key management. Each person must provide an encryption key or certificate to every person they communicate with in order to establish secure communications. Yet, there is no common key exchange method like SSL/TLS or SSH that makes the process seamless or simple enough for ordinary persons.

Diplomats, espionage agencies and others have exchanged encryption keys or ciphers using non-electronic means of exchange for as long as cryptography has existed. However, it is not customary for ordinary individuals without a significant technical background to exchange encryption keys using non-electronic means of exchange. Strong encryption keys are typically lengthy and cryptic, so people do not write them down, print them, or type them into computer systems. This fact makes the non-electronic exchange of strong encryption keys excessively burdensome. Consequently, ordinary people eschew available encryption technologies.

Many prior art solutions assume that people exchange encrypted communications using email exclusively. Prior art encryption key exchange solutions include key servers (e.g., OpenPGP, LDAP, X.500, etc.); however, these key servers have numerous drawbacks: first, while a non-secure public encryption key was historically considered a virtue overcoming the key exchange problem (i.e., Diffie-Hellman), a person disseminating his or her encryption key may not wish to allow any person who wants the public key to receive it. Most key servers allow a person to publish their public key to a key server, but they do not typically restrict access to the key or allow the key owner to approve requests for the key. One significant problem with unrestricted access to a public key used for encryption is that spammers, virus propagators and others can encrypt email using the public key and bypass spam, virus, malware and other filters. U.S. Patent Application No. US 2008 0137859 (Jagadeesan) and U.S. Patent Application No. 2005 0069137 (Landrock) express a need for secure exchange of public keys to prevent man-in-the-middle attacks among other problems. Second, encryption keys exchanged over key servers are often bound to a particular email address, which compounds the problem of people changing their email addresses frequently, or using more than one email address or the same email address with numerous devices (e.g., mobile phones such as RIM Blackberry or Microsoft Outlook for Mobile). Third, keys may be compromised and subsequently revoked by the user. Encryption key servers do not usually make it easy to update people who previously requested the encryption key for the purposes of key rotation. Fourth, some encryption applications search for encryption keys at key servers prior to sending an electronic communication when the application does not have an encryption key for the destination. This means of 'key discovery' is intended to help a person build their address book or 'key ring' of encryption keys, but it may slow an application down substantially, so users often turn these features off—thwarting the widespread adoption of encryption solutions. Prior art leaves non-technical individuals exposed to the complexities of key exchange and key management, and this exposure reduces the likelihood that people will adopt encryption solutions when transmitting sensitive information over the internet. For a general discussion of network security, refer to *Understanding PKI: concepts, standards and deployment considerations*, by Carlisle Adams and Steve Lloyd, Addison-Wesley, 2002.

To dramatically increase the use of encryption technology among individuals, key exchange and configuration must become as easy as solutions like SSL/TLS and SSH, so that the user does not have to learn anything about encryption technology. In February 2009, Dr. Joel F. Brenner, the U.S. National Counterintelligence Executive, gave a speech to the 4th Annual Multi-INT Conference and said the following, "And dealing with our workforce's relentless demand for convenience, and its impatience with reasonable security requirements—that's a behavior problem. As you may have noticed, whenever convenience and security butt heads, convenience wins hands down, every time."

Email is an area with significant security risks. According to the Radicati Group, over 1.2B people worldwide used email in 2007 and this number is expected to grow to 1.6B people by 2011. Leading web properties serve a substantial portion of the world's email users (e.g., in February 2008 Yahoo claimed 254.6M users; Microsoft claimed 256.2M users, Google claimed 91.6M users; and AOL claimed 48.9M users). According to Comscore, 93.4% of internet users in the United States use web-based mail services that usually present email to users within web browsers. Today, people still exchange email primarily in unencrypted form, and the consequences are substantial. Unencrypted and unsigned email leaves people vulnerable to privacy violations, the theft of intellectual property and fraud. Financial institutions, government agencies, utilities, and other public institutions often send email messages without signing them. So recipients cannot verify the identity of the purported sender.

People using email to communicate with others frequently receive unwanted email (called spam). Spam can involve unsolicited marketing offers that overflow a user's inbox and thereby reduce the utility of email. Spam can also be malicious in that it is intended to fool the user as to the identity of the sender and the system from which the email was allegedly sent. Misrepresenting identity can be done for many reasons, but several motivations include: falsely presenting an identity presumed to be trusted by the recipient, so that the recipient will act on the contents of the message such that the recipient becomes the victim of a phishing attack or inadvertently downloads malware; and, misrepresenting the identity of the sender to thwart authorities and other persons from tracking the true sender and the source of the message.

Numerous solutions have been developed to address the problem of identity misrepresentation in the sender address: SMTP-AUTH is an extension to the Simple Mail Transfer Protocol (SMTP) to require the user to login prior to sending an email via an SMTP server so that the true identity of the sender is known. A false header is still possible with SMTP-AUTH unless the server is configured to restrict email addresses and domains the sender is authorized to use.

Sender Policy Framework (SPF), Sender ID and Domain-Keys Identified Mail (DKIM) as described in U.S. Pat. No. 6,986,049 to Delany (assigned to Yahoo) verify that an email message came from the domain that appears in the email header; however, it does not verify the sender's identity. One advantage of DomainKeys is that when it is used with Author Domain Signing Practices (ADSP), Mail Transfer Agents (MTA) may be configured to disregard unsigned emails from a domain that purports to send only DomainKeys signed messages. Another advantage is that the decryption key is retrieved 'out-of-band' (i.e., the decryption key is not contained within the email message itself). Signed Email for Anti-Phishing (SEFAP) is similar to the approach used in DomainKeys, but it utilizes identity-based encryption (i.e., the public key is the sender's email address) rather than a PKI public key retrieved from a DNS server.

Unfortunately email fraud (often called 'phishing') can use SPF and DomainKeys. These technologies do not stop fraudulent email; they stop misrepresentation of the message's originating domain. In *SEFAP: An Email System for Anti-Phishing* by Qiong Ren, Yi Mu, and Willy Susilo, University of Wollongong 2007 the authors stated, "Most of email-based phishing attacks succeed in large part because they fabricate the origin of email." Some studies suggest that over half of all spam email is authenticated by these types of technologies. For example, a fraud perpetrator may send an email intended to impersonate a nationally chartered bank, such as 'BigCitybank' using a domain such as http://bigcitybank.custserve.com or bigcitybanksupport@bigcitybank.custserve.com where the inclusion of the term 'bigcitybank' as a Canonical Name (CNAME) extension to the domain name is sufficient to fool a recipient that it came from BigCitybank. Since many firms outsource services with third party providers, it is not uncommon for a CNAME extension to represent a legitimate business operation. However, SMTP-AUTH, SPF, DomainKeys and SEFAP still cannot not detect that the message is fraudulent before it is transmitted to the recipient. According to the Anti-Phishing Working Group, a leading industry authority, 81% of domains used for phishing are compromised or 'hacked' domains. Since DNS hacking has become a significant problem, even publishing a public encryption key on a DNS server for use with DomainKeys involves some risks. In U.S. Pat. No. 6,986,049, Delany acknowledged this risk stating, "Using the DNS could present a security risk because the DNS itself is currently vulnerable." These security risks also apply to SPF, which is computationally less expensive than DomainKeys (i.e., it verifies the IP address of the sending domain).

Unsigned email is a significant component of identity theft. Major organizations have no generally effective means of knowing which recipients have the ability to decrypt a signed message with a public encryption key (i.e., when the clear text message isn't included) or an encrypted message with a private key, so organizations continue to send unsigned (unauthenticated) and unencrypted (clear text) email. One reason that verifying sender domains is insufficient is that fraud perpetrators are able to copy and utilize the Cascading Style Sheets (CSS) and graphics of major organizations such as banks to impersonate their identity—inducing unsuspecting people who believe they are communicating with a trusted major public institution into providing identity, authentication and other information. Analysts estimate that these email-induced 'phishing' scams result in over a billion dollars in losses per year ($3.2B in 2007, $1.7B in 2008 according to Gartner Group) in the US alone. Perpetrators are bold enough to use the style sheets of government agencies such as the IRS and the FBI with impunity.

Fraud perpetrators have recently developed highly sophisticated phishing attacks using email to induce email recipients into navigating to what they think is a trusted site (e.g., an online banking application). These sites emulate the application pages of the target site so that the phishing attack may go undetected. In some embodiments, the phishing attackers emulate every functional page in the site and perform a 'double dispatch' by presenting the features of the target site on a phishing web site such that the functionality looks identical in almost every way; then, passes the requests of the user to the actual site—virtually emulating all the functionality (e.g., incorrect password notification). In such cases, the perpetrator may remain logged in or return to the site at a later time, for example, to track financial information of competitors, to write unauthorized checks or send unauthorized bank wires from an online banking site, or to learn about the health conditions of a particular person, among other unauthorized uses of secure information. Phishing attacks have used the foregoing techniques to spoof supposedly secure two-factor authentication solutions employed by business banking sites, which has led to unauthorized bank wires of hundreds of thousands of dollars from both public and private institutions. If email messages were strongly authenticated, this practice could be curtailed significantly.

There remains a long felt but unsolved need to authenticate the source of a communication and to ensure that it was encrypted and not tampered with during transit. A number of impediments to adoption persist: first, most PKI solutions available on the market were developed for desktop email clients (e.g., MS Outlook), but most email users send and receive email using browser-based solutions. Another impediment is that major organizations have a need to defer encryption until content checking modules ensure that personnel within an organization only send authorized data; and, major organizations have a need to decrypt early so that anti-phishing, anti-spam, anti-virus and other modules can operate before distributing the communication to the intended recipient within the organization. While SEFAP teaches modifying SMTP servers and clients to sign and verify respectively, its authors have stated, "Identity-based property removes the unrealistic full PKI infrastructure deployment requirement . . . " SEFAP's authors demonstrate the long-felt but unsolved need for easier PKI key exchange.

Large organizations have begun to adopt email encryption solutions that hide key generation, key exchange, and key management from end users. Solutions like Voltage and IronPort PXE hide encryption technology, but it can be cumbersome to use (see U.S. Pat. Nos. 6,014,688 and 6,304,897). IronPort PXE requires the recipient of an encrypted communication to sign up with each email sender (or a centralized registry), and the solution sends an email notifying the user that an attached and encrypted sensitive message is pending decryption. The user then must save the encrypted message, open it in a browser (i.e., it is usually encapsulated within HTML), login to the sender's encryption solution (or centralized registry), and download the decryption key to decrypt the message each time they receive an encrypted message. Advantages of this solution include the fact that there is no need to install 'plug-in' applications on email client applications (although this approach does download JavaScript and Java applications embedded within the HTML), there is no need to utilize key rings or maintain relationships between users, and the decryption key is retrieved 'out-of-band' from a trusted source (i.e., not within the message). Disadvantages of such solutions include the fact that the recipient must save the attachment to a file, use a browser to present the message, must login to retrieve a decryption key for each message, and must develop a means of archiving messages for regulatory compliance (e.g., Sarbanes Oxley, Graham Leach Bliley, HIPAA, etc.) since the message itself will not reside in an 'inbox' in unencrypted form, and must be willing to accept email attachments including embedded applications (i.e., some firewalls may block messages for fear of malware). The encryption solution must maintain the encryption keys for substantial time periods too. While the IronPort PXE message itself is probably difficult to spoof (i.e., it contains JavaScript, Java, and an encrypted message attachment; JavaScript builds the client-side representation), it may still be subject to a man-in-the-middle phishing attack, because the notification email is often sent in clear text without signing it.

Some solutions provide secure messaging with an email-like user interface with no transport layer. Messages reside in a centralized database and users login with web browsers using SSL/TLS connections for added security. These solutions send clear text notifications via email when a new message is received. Therefore, these solutions may be vulnerable to phishing schemes too, because they allow a person to send an encrypted message to a secure server for an intended recipient who does not already have a public encryption key. In the case of an invitation, the intended recipient receives an insecure email invitation to sign up with the service in order to retrieve the secure message. The recipient is required to validate the email address prior to receiving any messages. Such solutions are also subject to phishing attacks when sending notifications. For example, a fraud perpetrator may intercept or mimic the contents of a clear text notification message and induce the intended recipient to navigate to a phishing site wherein they may be further induced to provide authentication credentials to the fraud perpetrator.

Secure web-based email firms like HushMail provide a means of exchanging encryption keys with other members of its service. HushMail takes into account the risk of storing a private key on a public server as described in U.S. Pat. No. 6,154,543 to Baltzley (assigned to Hush Communications Anguilla, Inc.). Despite the ease of use for users of HushMail, and the ability to exchange keys with non-HushMail systems (e.g., OpenPGP), slow adoption and the cumbersome nature of exchanging and managing keys with email users outside of the system demonstrates a long-felt, but unsolved need to address key exchange and key management seamlessly for email and other forms of network based communications.

One approach to addressing phishing attacks against major organizations (i.e., usually depository institutions) that induce victims with email involves signing a message with a private key. There are several problems with signing a message: first, the organization may need to know if the intended recipient can decrypt the encrypted message if it does not provide a clear text message too; second, if the recipient doesn't receive the public key out-of-band from a trusted source (e.g., as with IronPort), the user has to verify the authenticity of the key with a certificate authority, because the inclusion of a public key in a message can be replicated easily by a fraud perpetrator. In Request for Comment (RFC) 3709, a document developed by an industry working group for extending digital certificates with logos, industry experts stated, "Many investigations have shown that users of today's applications do not take the steps necessary to view certificates. This could be due to poor user interfaces. Further, many applications are structured to hide certificates from users. The application designers do not want to expose certificates to users at all." While users are lackadaisical about verifying digital certificates with SSL (probably because cryptic encryption codes are intimidating and difficult to understand), the lack of a general purpose solution for verifying a signed email using a standard web-based email system from a leading vender (e.g., YahooMail, Hotmail, AOL, GMail, Comcast, etc.) leaves the broader market without a means of positively identifying a trusted sender from torrential flood of spam and fraudulent phishing emails that users receive on a regular basis.

Another major problem preventing the widespread adoption of encryption technology with email and other forms of communication is that different types of users have different types of systems. For example, an online banking application may need to send a notification to a customer using a web-based email solution or a desktop-based email solution; and needs to know if the user can receive a signed message; and, further may need a means of receiving a public key from the recipient in order to encrypt the communication if necessary. This asymmetry between large organizations with complex enterprise-class applications and users of web-based email and desktop email solutions creates another seemingly insurmountable obstacle to wide spread adoption of encryption technology with email.

While depository institutions and financial services companies have been the primary target of phishing attacks, firms such as PayPal and eBay and their users have been victimized by phishing schemes in substantially higher volumes. In July of 2009, Google announced that it had added a visual icon (a graphic of a key) to GMail messages in order to indicate that DomainKeys-enhanced email messages received from eBay or PayPal were actually sent from eBay or PayPal (i.e., the "sent from" domain name is @paypal.com or @ebay.com respectively). To prevent so-called 'false positives,' a firm like Google must verify the validity of each domain when using a technology like DomainKeys coupled with a confirming visual indicator; and must take additional steps to ensure that any digital certificate verification not only validates the key, but the name of the institution and the domain used, because DNS hacking is a principal means of waging phishing attacks. Iconix provides a browser plug-in that decorates an email message (via the DOM tree) of an inbox when an email header contains Sender ID, SPF, DomainKey or DKIM metadata (see U.S. Pat. Nos. 7,422,115 and 7,487,213 assigned to Iconix). In addition to the shortcomings of this approach to authentication, the Iconix approach requires individuals to install browser plug-ins, which can be inconvenient; using a plug-in to modify or decorate the DOM tree may conflict with solutions that thwart man-in-the-browser attacks by preventing modifications to the DOM tree; the approach involves micropayments, which may impair adoption; and the approach requires retrieving a "stemp" for each message received (i.e., rather than using a public key).

Ad hoc approaches to verifying the identity associated to an email address or domain may be effective in the short run, but they are subject to what economists call the "Law of Diminishing Returns" as each communication provider (e.g., Google and each firm verified by Google) must individually develop such agreements and functionality to ensure that the domain validated by DomainKeys is in fact operated by a legitimate entity. This is another major impediment, since the duplication of effort across enterprises likely precludes medium-sized and smaller firms needing such protection from being able to achieve it with multiple providers at low cost.

Encryption keys can also be broken by brute force methods. Consequently, it is prudent to change or 'rotate' keys on a regular basis. Key rotation multiplies the complexity associated with key exchange and key management.

Prior art includes software- and hardware-based solutions for encrypting communications between domains. These solutions typically involve out-of-band asymmetric key exchange and are typically used for point-to-point encryption and decryption with Wide Area Networks (WANs) that use the internet in lieu of a dedicated connection, or for sending secure communications between large organizations. These solutions are effective too; however, they generally do not address the problem of an asymmetry between different organizational sizes. Key exchange and key rotation become expensive when the number of bi-directional relationships and unique encryption keys increases.

An emerging market for email gateways that provide SSL/TLS connections between two devices also helps to secure email (see RFC 2595, RFC 2487). The drawbacks of these SMTPS and STARTTLS solutions include the fact that both the sender and the recipient must have such a device to set up the SSL/TLS connection, which makes it impractical for individuals and small businesses. Additionally, people send email to many different addresses in a serial manner. Consequently, the slow nature of setting up and taking down secure network connections and the finite number of connections supported by the gateway in a high traffic environment is often too slow or limited to make it practical for large organizations.

PGP Corporation has developed a gateway-based email encryption solution that can act as an SMTP or IMAP proxy server. The solution is capable of retrieving keys from LDAP servers and OpenPGP key servers, and it can sign, encrypt, verify and decrypt emails using OpenPGP or S/MIME protocols. It is a significant positive development for large organizations, because it does not require end users to install desktop solutions or learn about email encryption. However, key exchange has some drawbacks: first, in the OpenPGP paradigm, public keys are published to OpenPGP key servers and are exchanged in unencrypted form each time the intended recipient doesn't have a key within the gateway solution. If available, the keys may be retrieved by anyone who requests one without approval. Some people are reluctant to publish public keys using the OpenPGP approach, because it enables email adversaries retrieve the public keys to encrypt spam, viruses, Trojan horses, and other unwanted data. Additionally, an unrestricted means of distributing keys enables an adversary to begin a brute force process to discover the private key if they already know the public key and the contents of an encrypted communication. A gateway service that doesn't enable person-to-person key exchange via a personalized identifier, approval of requests for an encryption key, and secure exchange of keys is a drawback to adoption.

Other economic factors preclude adoption of PKI among major organizations too. Implementing PKI technology with each enterprise application may be economically infeasible. The process of encryption and decryption may be too computationally intensive for legacy applications (i.e., it may materially adversely affect system performance) and may be too expensive to implement (e.g., adding functionality to mainframes, thus requiring the purchase of more expensive mainframe hardware).

The market needs at least the following functionality: a means of identifying persons and entities without them having to provide government-issued IDs manually through trusted third parties; a means of exchanging at least one set of PKI keys between individuals, organizations and/or network devices securely without requiring non-technical individuals to be aware of key generation, exchange, configuration, or management; a means of enabling large organizations with custom enterprise-class applications to exchange encryption keys with individuals and send signed and/or encrypted communications to individuals who use web-based email applications or desktop-based email clients (among other types of applications); a means of presenting a communication recipient with verifying indicia that gives the recipient strong assurance that the message was sent by the purported sender; a transparent method of rotating encryption keys that does not require significant user interaction; and, relatively economical network hardware components to accelerate encryption/decryption such that enterprise applications do not require radical or expensive modifications and do not suffer from significant increases in Computer Processing Unit (CPU) utilization.

SUMMARY OF THE INVENTION

The present invention is a computer-implemented key exchange system and methods for improving the usability of encryption technologies such as Public Key Infrastructure (PKI). One aspect of the present invention includes a user creating and storing a record containing an encryption key and other personally identifiable information in a Key Exchange Server (KES); the system receiving a personalized alphanumeric serial number candidate, ensuring it is unique and storing the unique personalized serial number corresponding to the encryption key (EK) record, and the user conveying the serial number to a recipient. The recipient may then enter the personalized serial number into a network-enabled communication application and request, via the application, the corresponding record from the KES. In response, the communication application receives data associated with the EK record and stores the data in the application's database, or receives an indication that approval from the owner of the EK record is required before the KES will transmit the requested EK record.

In another aspect of the present invention, the recipient enters a personalized serial number into a network-enabled communication application and requests, via the application, an associated EK record from the KES corresponding to the serial number. The KES determines whether approval is required, and if so, responds to the recipient indicating that the request requires prior approval from the owner of the EK record. Following an approval of the request, the KES provides a method to receive data associated with the EK record.

In another aspect of the present invention, a person does not have a serial number to enter into an application; and instead enters search criteria such as a person's name and phone number, email address, location (e.g., city, state and/or zip code), or other criterion. The KES responds by providing the serial numbers of potential matches. The person (now a serial number recipient) may select a serial number to request an EK record from one of the matching search results. In another aspect of the present invention, a user creates and stores an EK record and serial number that includes 'keyword' entries to enable other users to search for the EK record by keywords (e.g., plumber, pizza, gardening services, etc.). Keywords enable people to search for EK records of other users they don't already know, thereby making the service useful for business vendors, affinity groups, and other population groups.

In another aspect of the present invention, a method for receiving data following a request for an EK record that requires the record owner's approval includes the steps of automatically creating and storing a request record with a unique serial number to identify the record. The request record stores the date and time of the request, and the requester is prompted for additional information to be stored in the request record including the requester's name, user name, encryption key information and other information to facilitate the approval process, such as the requester's serial number, email address or a note field for specifying the purpose of the request. Next, the user responsible for approving the request is notified and provided with an interface for approving or rejecting the request. The requester is provided with status updates of the approval process as needed. After the request is approved, the corresponding encryption key information is available to be received by the requester.

In other aspects of the present invention, a requester may receive updates for requested records, synchronize multiple devices by replicating requests as an alternative to traditional synchronization; and restore an address book or an encryption application or module with previously requested records as an alternative method of backing up EK records. The present invention, therefore, provides a means of searching for EK records, exchanging EK records via serial numbers, approving requests, automatically configuring EK records for use, receiving key updates, synchronizing multiple devices quickly and securely, and providing a means of backing up and restoring EK records in one solution.

Another aspect of the present invention includes a restricted means of enabling a person to create and store a record containing an EK record and other identifiable information in a KES such that the first person or a third person on behalf of the first has a means of verifying the identity of the user. One aspect of this restriction involves creating a service level that is restricted to a certain class of users such as healthcare providers, lawyers, depository institutions, investment banks, utilities, retailers, or government agencies such that the registrant does not have the authority to create or enable the account until the identity of the registrant is verified with the key management system as being valid and belonging to a particular class of users. In another embodiment, the service level is restricted and the system administrator determines the class or classes on an ad hoc basis.

In one embodiment, when a person of a restricted class of users sends a communication signed by a private key, the recipient is provided with a means of authenticating the sending person with a standard PKI public key, but also has an additional means of verifying that the sender of the communication belongs to a particular class of users. Furthermore, since the system may also involve a persistent connection or relationship between two users, the recipient of the communication can also verify if the recipient and the sender have a persistent relationship as a means of ensuring that the sender isn't 'spoofing' the recipient.

In another aspect of the present invention, providers of web-based email applications may adapt the present invention such that the web-based email application server may request all public keys associated to a particular exclusive service level or service levels (or exclusive groups), and the members of the service levels (or groups) may be notified that they may send signed email to all email accounts within the domain without previously establishing a key exchange relationship with each user. In another aspect of the present invention, the existence of a key exchange relationship may take precedence over a domain-based email signature by the sender knowing which email address may receive a signed (and preferably encrypted) email message.

A more complete understanding of the present invention will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

FIG. 3 illustrates an embodiment of a method associated with a group serial number;

FIG. 4 illustrates an embodiment of a method associated with a role serial number;

FIGS. 6a-6c illustrate search request and result data structures;

FIGS. 7a-7d illustrate request and reply data structures;

FIG. 11b illustrates a communication application of the network device of FIG. 11a;

FIG. 11d illustrates data structures of the data storage of the network device depicted in FIG. 11a;

FIGS. 12a-12b illustrate an embodiment of an encryption key reply and an associated network device database record;

FIGS. 15a-15b illustrate third party application interoperability with the KES;

FIG. 16 illustrates an embodiment of a communication header with extended attributes that facilitate the present invention;

DETAILED DESCRIPTION OF THE INVENTION

Figure 1:
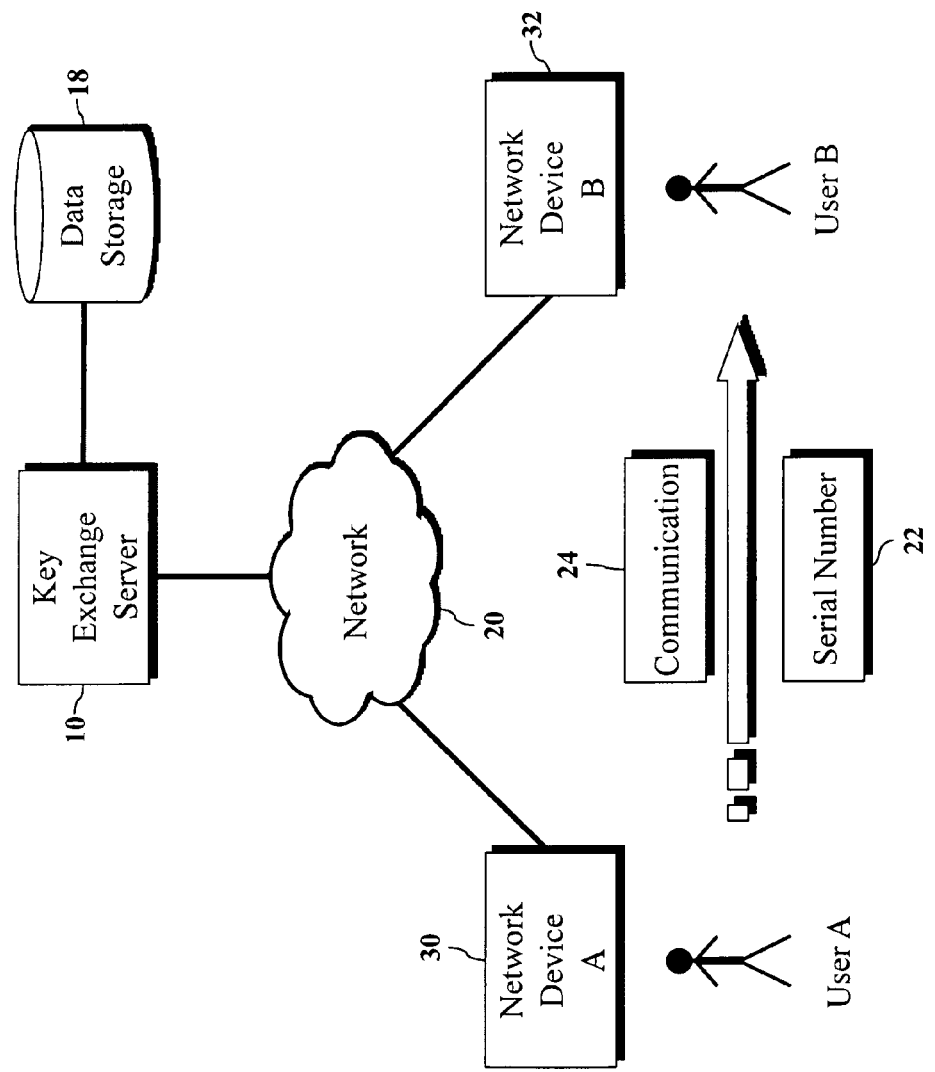
FIG. 1 illustrates an embodiment of the key exchange system and method.

The present invention may use a Key Exchange Server (KES), a plurality of network devices and at least one electronic communication. Each network device may operate a communication application capable of retrieving encryption keys from a KES and encrypting, transmitting, receiving, decrypting and verifying the sender of at least one electronic communication. Each network device may be specialized for operation in a particular environment; for example, a cellular phone, a personal computer or laptop, a VoIP phone, a web server or web-based email application, a network router or relay, and other types of network-enabled devices. A communication application may be specialized for particular types of communications; for example, email, Instant Messages (IM), Short Message Service (SMS) messages. A KES may be a prior art key exchange server such as an LDAP server capable of providing a public key associated to an email address, key ID or other identifier; or a novel configuration capable of organization-level controls, key generation, approval-based dissemination of keys and verification indicia, key rotation, and other features as disclosed herein. The term 'key' as used herein refers to an encryption key, except when referring to a 'primary key' or a 'foreign key' in a database record. An encryption key as described herein includes a digital certificate. While the disclosed embodiment principally describes use of the invention with text-based payloads, the present invention may also be used with binary communications including streaming binary data.

An exemplary embodiment of the present invention will be described with reference to FIG. 1. A KES 10 provides key exchange services and preferably key generation services to a plurality of network devices, such as network devices 30 and 32, through a network 20. The KES 10 includes at least one computer adapted for communication with the network 20, and a data storage 18 for storing encryption key and other information. The network 20 includes any system or systems capable of facilitating communications between the KES 10 and the network devices 30 and 32 and, in various embodiments, may include the Internet, a wireless network, an intranet or a Public Switched Telephone Network (PSTN). Each network device 30 and 32 is adapted for communications with the KES 10 through the network 20, and may include a mobile telephone, personal digital assistant, personal computer, portable computer, VoIP telephone, an application server or other network-enabled device. Each network device 30 and 32 may send or receive at least one communication 24.

Figures 2A, 2B:
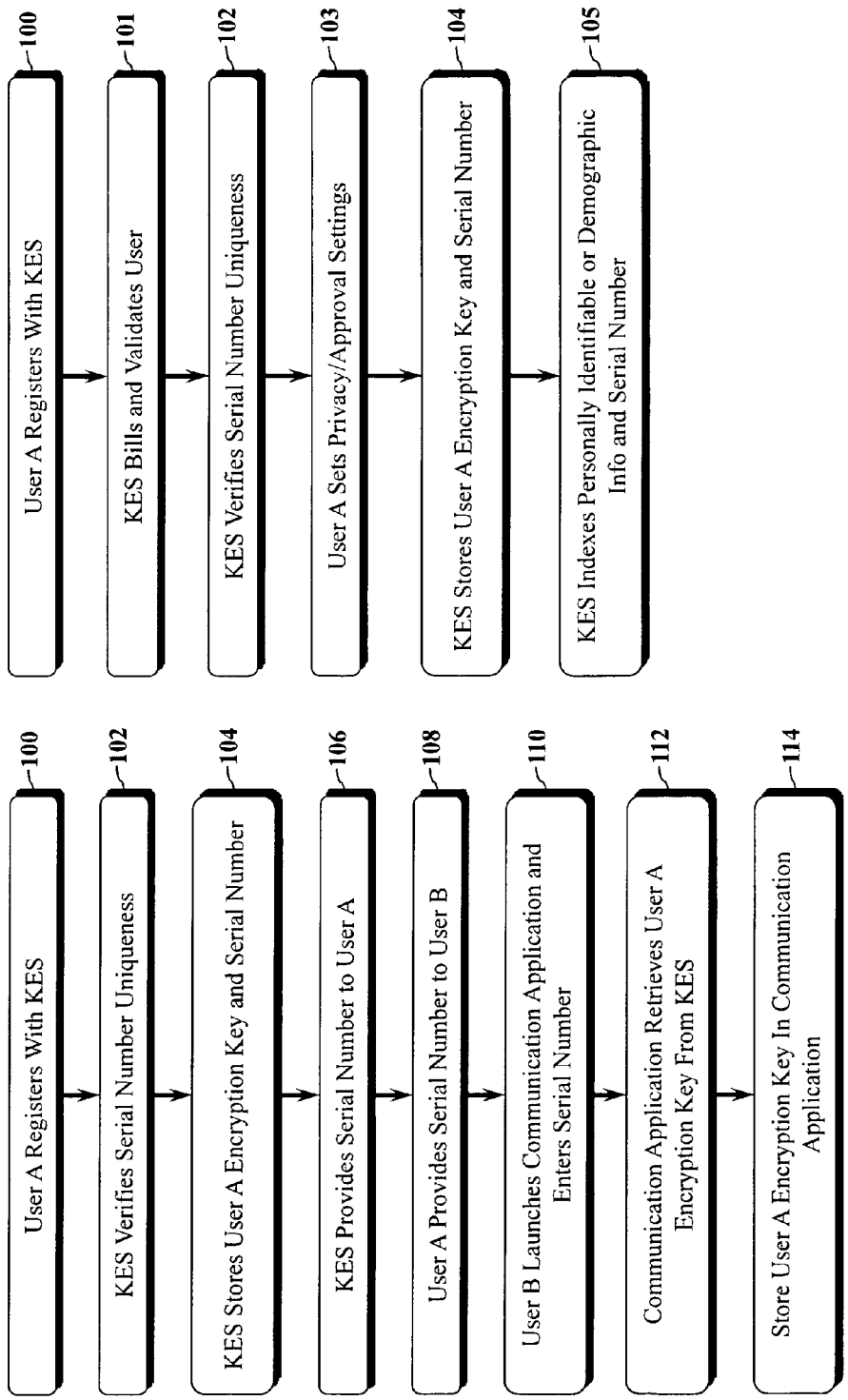
FIGS. 2a-2f illustrate embodiments of methods of the present invention.
Figure 2C:
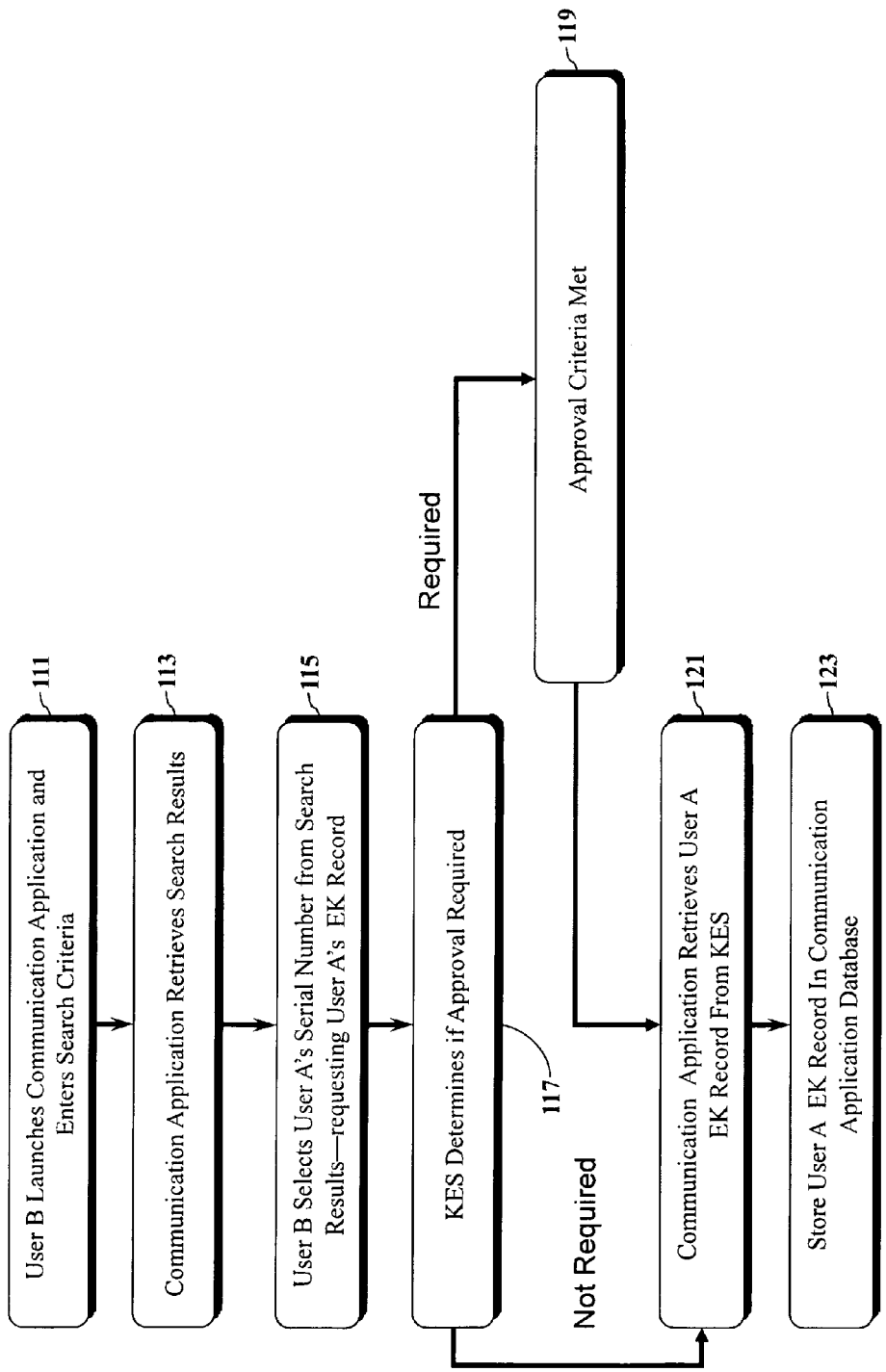
Figure 5:
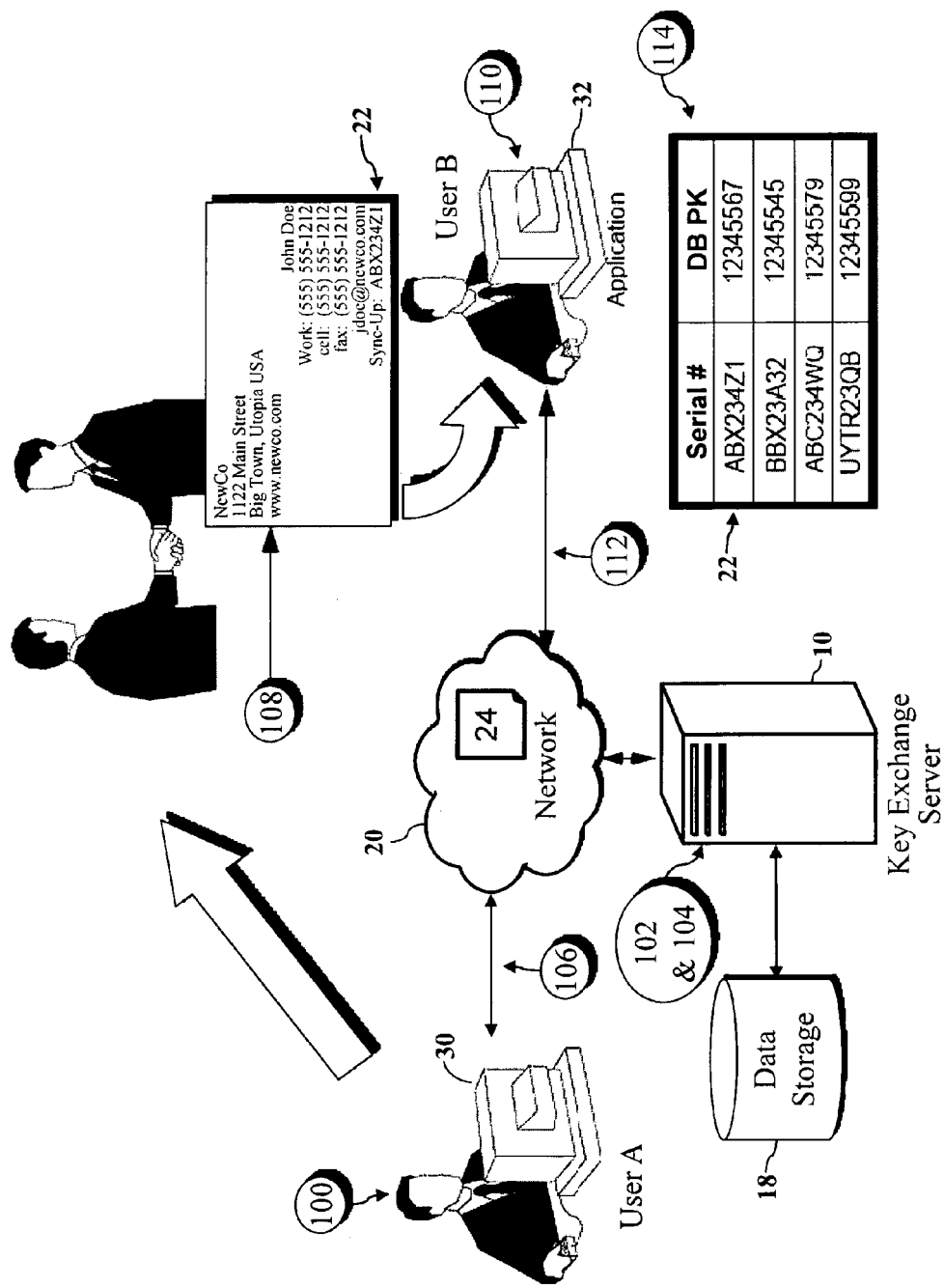
FIG. 5 illustrates an embodiment of the KES and method of the present invention.

Referring to FIGS. 2a-2b and FIG. 5, an operation of the embodiment of FIG. 1 will be described. In step 100, a first user, User A, registers with the KES 10. Registration provides User A with permission to generate, store, maintain and disseminate at least one encryption key via the KES 10. In one embodiment, User A establishes communication with the KES 10 through the network device 30 by launching a web browser application and entering or selecting a Uniform Resource Locator (URL) of the KES 10. Through web pages served by the KES 10 to the network device 30, User A invokes a new user registration process. In one embodiment, a network device may have at least one application adapted to perform the registration process.

User A enters a unique username and password combination for use by the KES 10 to identify and authenticate User A in subsequent visits to the KES 10. Alternatively, a temporary password is automatically generated by the KES 10 and may be changed later by User A after the first login session. In one embodiment, communications between the network device 30 and the KES 10 during the registration and login process are encrypted (e.g., using SSL or TLS protocol) providing a layer of protection against the unwanted access to or dissemination of encryption keys, policies or demographic information associated to the user account.

Referring to FIG. 1 and FIG. 2b, through user interfaces presented by the KES 10 to the network device 30, User A may invoke a user billing and verification process 101 by providing credit/debit card billing information to the KES 10, including the name on User A's credit card. Through a gateway to a credit card transaction processor, the KES 10 charges User A's credit card and verifies User A's name and billing information. If User A's name and billing information are successfully processed, the KES 10 stores an attribute in the data store 18 indicating that User A's name is verified. In one embodiment, the user's name from the credit card transaction is also stored in the data store 18, and is used to ensure that the user cannot later change their name to misrepresent the user's identity. In one embodiment, the KES 10 utilizes a third party address verification service. In one embodiment, the KES 10 sends a confirmation email containing a hyperlink to the KES 10 along with a confirmation code. When the user receives the email and clicks the hyperlink, the KES 10 validates that the specified email is a valid email address. In another embodiment, the KES 10 is adapted to periodically present a user interface to User A that prompts User A to certify that the information in User A's user profile and EK records is true and correct. In other embodiments, a user may mail, email, or fax an official document such as a telephone bill to the operator of the KES 10 to confirm that User A is a real person. An ordinary person skilled in the art will appreciate that the KES 10 provides various means of indicating to the recipient of a serial number and EK record that User A is a real and interested person (i.e., as distinguished from a trial user or a 'bot' that registers a user for surreptitious purposes).

In one embodiment, restricted service levels are available to restricted classes of persons such as healthcare providers, lawyers, depository institutions, investment banks, utilities, retailers, or government agencies and other classes and the account is only enabled after verification that the registrant possesses the qualifications to belong to the particular restricted class associated with the service level. In one embodiment, an organization such as a bank provides corporate registration information, bank charter information, and registered trademarks as part of the validation process.

In step 102, the KES 10 generates a unique Serial Number (SN) 22 to identify User A's at least one encryption key, at least one communication address, key use restrictions and policies, and demographic information associated with the EK record. In one embodiment, the KES 10 generates two sets of public/private key pairs—one set of keys for signing communications and one set of keys for encrypting communications. The SN 22 may be any unique identifier that is amenable for user input into a network device. In the exemplary embodiment, the KES 10 accepts a personalized alphanumeric serial number candidate from the registrant. The KES 10 queries the data storage 18 to ensure that the SN 22 is unique—i.e., is not already in use by the KES 10 to identify another user's encryption keys. A serial number 22 may also incorporate naming conventions such as portions of the user's name and/or company name. User selected serial numbers and the generation of serial numbers in accordance with naming conventions results in serial numbers being potentially easier to remember.

Alphanumeric characters enable the KES 10 to issue concise serial numbers 22 with an extensive address space that can accommodate millions of users. For example, over 2.8 trillion serial numbers can be generated using only 8 digits of case-insensitive alphanumeric characters, where each character has 36 possible values (e.g., 0 through 9 and A through Z). Alternatively, the SN 22 may include characters from other character sets to accommodate different languages and cultures, including non-Western character sets such as Kanji. In one embodiment, an extended character set known as the Unicode character set is used.

In an alternate embodiment, the KES 10 is adapted to generate serial numbers 20 of varying length. The KES 10 may also be adapted to receive a user-defined serial number 22, where one object of the functionality is to enable the user to create an easily remembered or 'personalized' serial number 22.

In one embodiment, the KES 10 is adapted to generate serial numbers 20 that are amenable to input on hand-held devices such as mobile phones. In one embodiment, the KES 10 generates a serial number that is easy to input when using Text on 9 Keys (T9). An ordinary person skilled in the art will appreciate that typing text on a cellular phone may require multiple key presses. For example, the number '2' may also represent the letters 'a,' 'b,' and 'c' in ordinal precedence. Therefore, the KES generates a serial number 22 such that it prefers the first letter available on a T9 keyboard (e.g., the letters a, d, g, j, m, p, t, and w are preferred to letters c, f, i, l, o, s, v, and z).

After a unique serial number 22 is generated, a filtering function may be applied by the KES 10 to determine whether the SN 22 is valid based on stored criteria. In one embodiment, the data storage 18 includes a table of offensive words, phrases and character patterns that are utilized by the filtering function to determine whether the SN 22 includes a word or pattern of characters that may be deemed offensive. If the SN 22 is not valid, then a new SN 22 may be selected.

In step 103, User A may specify privacy and approval settings, which determine whether User B may make an encryption key request for the serial number 22 via the KES 10, and whether User A must approve an encryption key request before disseminating the EK record as an encryption key reply.

In step 104, a data record is created in the database of data storage 18 for User A, and the unique serial number 22 is stored therein. The record includes a field for the SN 22, at least one field for at least one encryption key or digital certificate, and other fields such as name, company name, address, telephone number and email address. In one embodiment, User A is provided an opportunity to populate the database record with encryption key information and/or demographic information through a web browser interface. In another embodiment, User A may populate the database record through a user interface of a communication application adapted to communicate with the KES 10. The KES 10 may also store additional information, such as user account information and user preferences, including whether approval from User A is required before the KES 10 disseminates User A's encryption key information to third party requesters.

In one embodiment, the data record stores utilization restrictions and policies for each public key or certificate. In one embodiment, a utilization restriction and policy is associated to a public key and at least one communication address. The utilization restriction and policy provides data fields indicating whether the public key may be used to send an encrypted communication to the at least one communication address, whether the key may be used to verify a signed communication sent from another communication address, or both. Utilization restrictions and policies may also identify the type of communication application associated to a communication address and may identify suitable protocols (e.g., Open PGP, S/MIME, etc.), and encryption algorithms and methodologies associated to the key or digital certificate. Each data record may store a plurality of encryption keys, each with its own utilization restrictions and policies, and its associated communication addresses. In one embodiment, each key may contain utilization restrictions and policies in lieu of or in addition to those stored in the data record. An ordinary person skilled in the art will appreciate that some applications may be readily adapted to decrypt a signed communication since public keys do not need to be kept private, but the same applications may not be readily adapted to decrypt an encrypted communication if the application cannot be adapted for use with a private key without further inventive steps.

Referring to step 106 of FIG. 2*a*, the KES 10 communicates the serial number 22 to User A via the web browser interface on the network device 30 or, alternatively, via another supported method of conveyance, such as an email message to User A. In alternate embodiments of steps 100-106, third party applications may be adapted via plug-in technologies, Web 2.0 mash-up technologies (Asynchronous JavaScript and XML) or other approaches to present the user interface for registering with the KES 10 and generating a serial number 22 and EK record.

To protect against the unwanted dissemination of User A's encryption keys and demographic information, the data may be encrypted before it is stored in the data storage 18. In one embodiment, User A enters a passphrase candidate and the KES 10 is adapted to ensure that it is difficult to guess; then, after selecting a passphrase, the KES 10 encrypts the contents of User A's record using a symmetrical cipher such as Digital Encryption Standard (DES). In this embodiment, even the administrators of the KES 10 cannot access the contents of User A's record. An ordinary person skilled in the art will appreciate that if a hacker were to penetrate ports, firewalls, and other security measures of the KES 10 to gain access to the contents of the database, since each user may encrypt their data with different pass phrases, a hacker would still not be able to access the data; however, this embodiment would require User A to approve each request for the record, since the system would require decryption via the passphrase prior to disseminating the record's contents for both requests and updates. In one embodiment, only the most sensitive information (e.g., a private key) is encrypted with a symmetrical cipher.

Figure 9A:
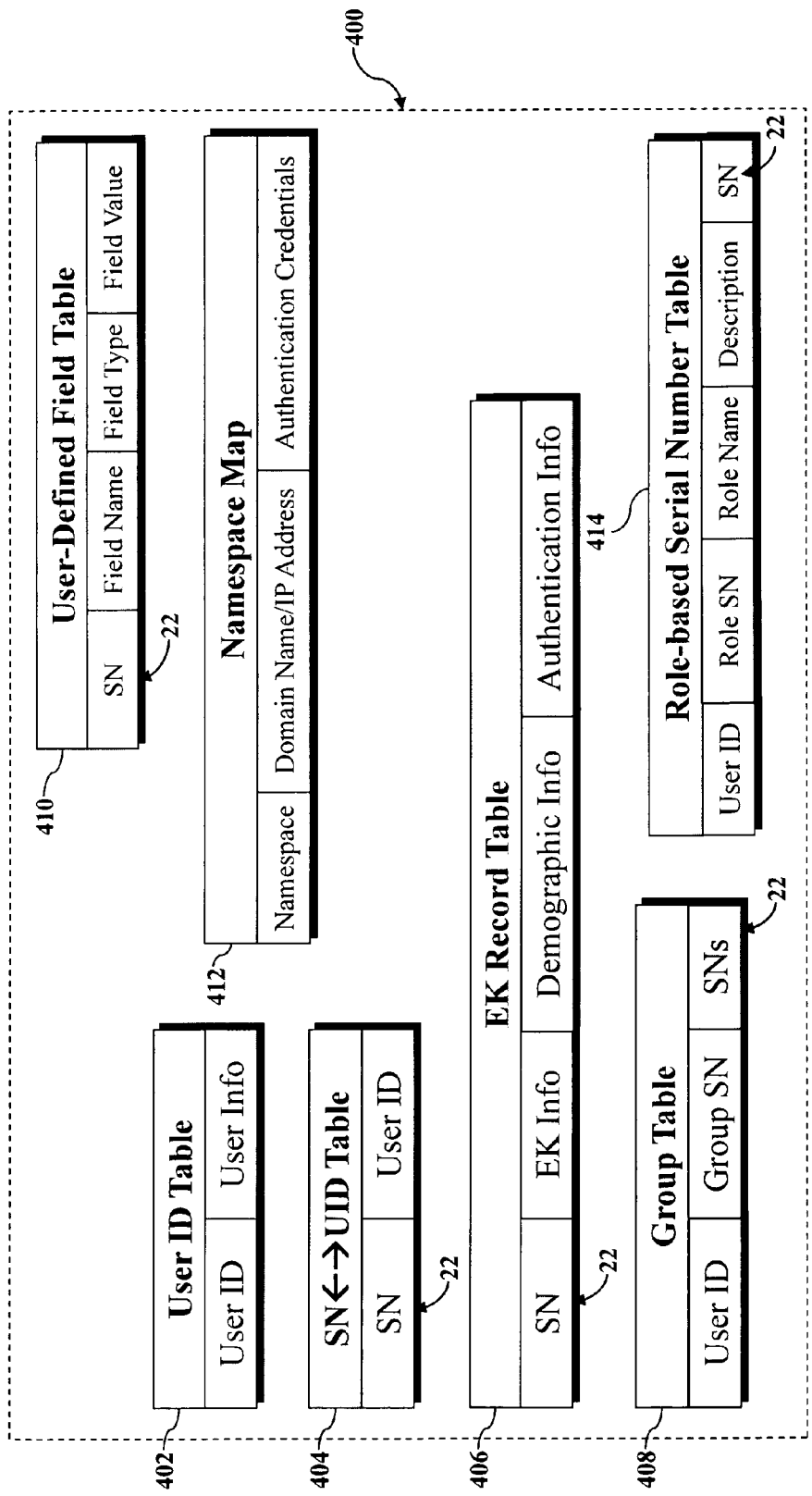
FIGS. 9a-9c illustrate data structures which may be used by the database server of the KES for storing data in the data storage.

In one embodiment, User A may create and store one or more user-defined fields in a record by specifying a field name and a value, as illustrated in FIG. 9*a*. User-defined fields make it possible to customize an EK record (e.g., a contractor's license, an industry sector classification, a bank charter number, etc.).

In one embodiment a search index manager processes the contents of the EK record and data is added to the data storage 18 for use with a search index processor (e.g., Apache Lucene). When a user submits search criteria in a search request that corresponds to data in the EK record, the search index processor may return the serial number 22 and other information associated to the EK record as a search result along with other matching search results. The object of these functions is to enable a person to search the search index of the KES 10 to find a serial number 22 associated to a user without first receiving the serial number 22 from that user and without accessing the database (i.e., accessing the database requires more security measures and is both computationally and financially expensive compared to a search index).

In one embodiment, the KES 10 and network devices 30 provide a search field enabling a user to submit demographic information such as a person's name, telephone number, email address company name or other criteria and retrieve associated serial number. The KES 10 optionally enables registered users to specify whether other users may search for their EK record by name, company name, telephone number, email or other criteria.

In one embodiment, the KES 10 provides interfaces that enable leading search engines to generate and submit a search request and receive a search result or a list of search results. Leading search engines may be further adapted to make an encryption key request and receive an encryption key reply. An ordinary person skilled in the art will appreciate that a person may search for another person's encryption key conveniently by using widely adopted search engines in lieu of accessing the KES 10 directly, or using prior art key servers. In one embodiment, an encryption key may be downloaded and installed automatically in a compatible application, the downloaded key made identifiable to the compatible application by a file extension association, a MIME type, or other technology.

In one embodiment, User A stores one or more profiles in the EK record 406 (FIG. 9a) that provide User B with information distinguishing User A from other users (e.g., when User A has a common name such as 'John Smith'). The profile does not require approval from User A to view its contents. A profile may contain text, pictures, structured demographic information and other data. In one embodiment, User B searches for User A's EK record without the benefit of User A's serial number 22 by inputting search criteria and submitting a search request. The KES 10 via a search index processor provides a search result with multiple records—e.g., numerous serial numbers 20 from different users named 'John Smith.' Without additional information, User B may not know which serial number 22 to request. User B can examine the profiles presented with the search results to help determine which serial number 22 corresponds to User A. In one embodiment, User B receives a request from User A, but cannot distinguish User A from other users without the benefit of additional information. User B can examine the profile presented with the request to determine if the serial number 22 corresponds to User A.

Referring to step 108 of FIG. 2a and FIG. 5, User A conveys the SN 22 to User B. User A may print the SN 22 on a business card and provide the business card to User B, type the SN 22 into an email message and send it to User B, verbally convey the SN 22 to User B or provide the SN 22 through another mode of conveyance. In one embodiment, the SN 22 is conveyed, along with an associated trademark that identifies the source of the SN 22 and the associated KES 10. For example, User A may convey the SN 22 in the form "SyncUp: JOHNDOE," where "SyncUp" is a promoted trademark identifying the source of the SN 22, making it clear what the number conveys. In this embodiment the SN 22 isn't just a serial number printed on a business card, displayed in an email or conveyed verbally; it is conveyed in association with a trademark to distinguish it from other serial numbers and addresses such as email addresses and phone numbers.

Referring to step 110 of FIG. 2a and FIG. 5, User B enters the serial number into a communication application on network device 32. In one embodiment, User B launches the communication application on the network device 32 that includes a blank serial number input field identified by a common name or trademark. The communication application is adapted to transmit an entered serial number 22 to the KES 10 and requests corresponding encryption key information associated with User A. User B can rely on the accuracy of the information entered into the KES 10 by User A, which presumably has been verified and kept current by User A.

The encryption key request is transmitted from the network device 32 to the KES 10 and may include a 'User ID' for authentication of the requester, a 'Device ID' to identify a network device for logging and synchronization of stored encryption key information, a 'Reply Type' or a 'Device Type' for identifying a data format or protocol associated with the network device 32; a 'Request Type' indicating if the encryption key request is for a new record, an update, or a deletion (among other possible request types); and, the requested serial number 22.

In another embodiment, the encryption key request includes a category (e.g., work, home, personal) to associate the requested serial number 22 with a request context. In this embodiment, subsequent synchronization requests can filter by category so that network clients 30 can synchronize only a subset of the EK records (e.g., only synchronize 'work' keys to the user's cellular phone). In one embodiment, a network device is adapted to provide a default categorization to a requested key (e.g., if the network device is a work-related or personal social network, the network device categorizes the requested key as 'colleague' or 'friend' respectively by default, etc.). In another embodiment, when User B requests a key, the KES 10 is adapted to categorize the key automatically according to location-based attributes (e.g., all keys within a particular city). In another embodiment, when User B requests a key, the network device and the KES 10 are adapted to categorize the method of receiving the serial number (e.g., automatically via an email signature, communication header or call log, from a search result, or manually entered). In an alternate embodiment, the network device or communication application may suggest the user request a particular serial number 22 by first retrieving information from the search index engine and presenting the information in conjunction with the serial number, and the user may click on a hyperlink or button executing the request. An ordinary person skilled in the art will appreciate that an automated means of requesting serial numbers may aid in a self-building set of encryption keys; however, as spammers begin adding serial numbers to their communications, the system may need to be further adapted to limit the effect of unwanted keys such as ignoring serial numbers within communications in spam or junk mail lists, dismissing an offer to add a serial number once, or precluding subsequent offers to add a particular serial number 22 after it has been dismissed or ignored.

The encryption key requester may also offer one of his or her serial numbers when making a request for the encryption key information of another user. The KES 10 may present the offered serial number to the user associated with the requested serial number, and the user may accept or decline the offered serial number. In one embodiment, the act of offering the serial number electronically serves as approval criteria if the offered serial number would otherwise require approval before disseminating encryption key information. In another embodiment, a request by User A for User B's serial number automatically results in the offering of User A's serial number to User B; and, User B's approval of User A's request automatically results in the acceptance of User A's serial number and EK record—establishing a bi-lateral relationship.

Figure 10:
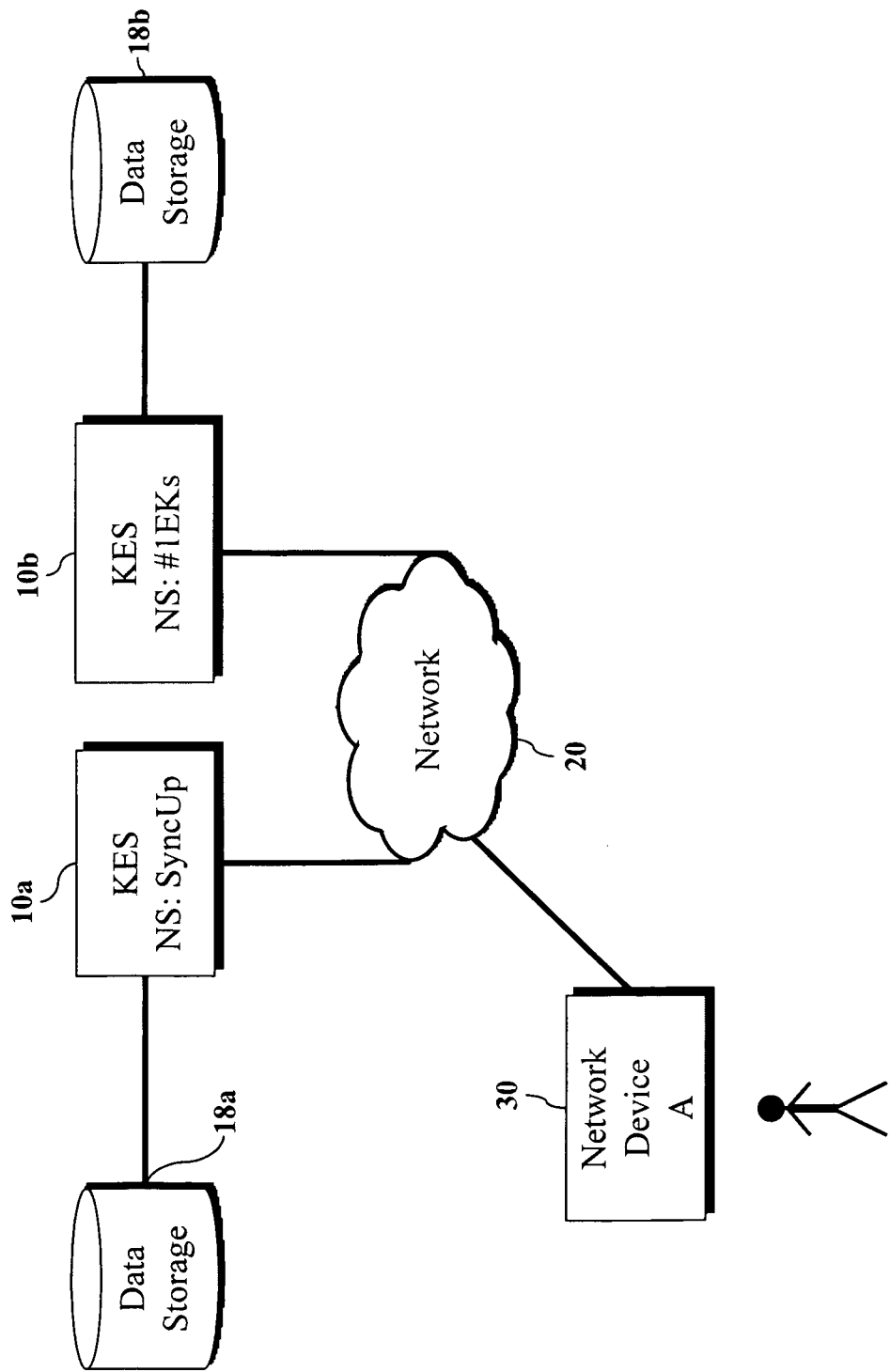
FIG. 10 illustrates a namespace redirect function of the present invention.

In one embodiment a request to the KES 10 expresses the serial number 22 in Uniform Resource Name (URN) syntax (i.e., IETF RFC 2141), such as "SyncUp://JDOE24Z/C," where the "SyncUp://" portion of the syntax represents a namespace. Referring to FIG. 10, if the system 10a processing the encryption key request does not have records within that namespace, it may relay the request to a system 10b that does store records with the provided namespace. In one embodiment, a namespace redirect function looks for the address of a separate system using a namespace map record, and redirects the request to that system and provides the encryption key reply to the requester. An ordinary person skilled in the art may appreciate that multiple firms may provide the service described herein with separate servers and branding, but may wish to have the ability to interact with competing firms so that users may utilize one service to access the records of another service via the namespace parameter (e.g., SyncUp://) prior to submitting the serial number 22. In an alternate embodiment, serial numbers 22 are unique among a plurality of service providers; thereby, precluding the need to use a namespace in favor of a lookup function similar to a DNS lookup.

In alternate embodiments, approval processes limit access to User A's encryption key information by requiring prior approval before the encryption key information is disseminated in response to a user request. The approval processes allow registered users to control the dissemination of their encryption key information.

Referring to FIG. 2c-2f, various approval processes may limit access to User A's encryption key information by requiring prior approval before the encryption key information is disseminated in response to a user request. The approval processes allow users to control the dissemination of their encryption key information, while maintaining a desired degree of privacy and confidentiality. In the various embodiments, User B launches a communication application on a network device 30 in step 111 and enters search criteria, which is submitted as a search request to the KES 10. In step 113, the communication application receives search results from the KES 10. In step 115, User B selects User A's serial number 22 from the search results, thereby submitting an encryption key request for User A's serial number 22 to the KES 10.

In one embodiment, User A defines a set of approval criteria to be applied to one or more EK records by the KES 10. After receiving an encryption key request (FIG. 7a) for an EK record 406, the KES 10 determines at step 117 whether approval criteria have been specified for the EK record. If approval is required, the KES 10 proceeds to step 119 until the approval criteria is met 119 (or disapproved). For example, manual approval by User A may be required prior to releasing the requested encryption key information in step 121. User A may approve with a network device or by logging in to the user account at the KES 10. While the KES 10 awaits approval from User A, the KES 10 may respond with an "approval pending" message in an EK reply to User B.

Figures 2D, 2E:
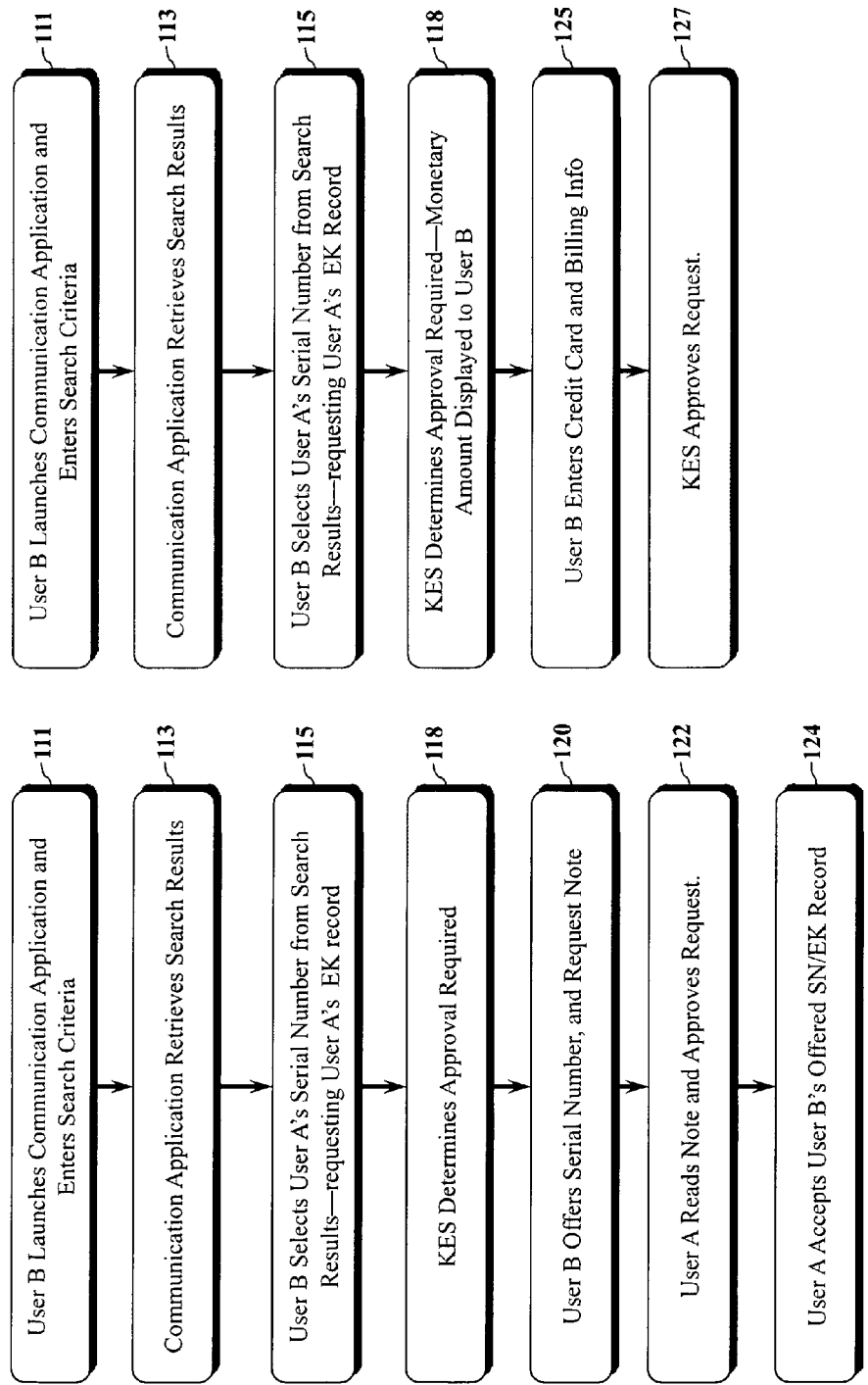

Referring to FIG. 2d, at step 118 the KES 10 receives an encryption key request and determines that approval is required. At step 120, User B is prompted to provide a note and to offer one of User B's serial numbers 22 to User A. In one embodiment, User B's serial number is automatically offered to User A, as User B only has one serial number. In step 122, the KES 10 presents User A with the contents of an approval record via a web browser or via a network device and User A approves the request, which permits an EK reply to User B. In step 124, the KES 10 presents User A with the contents of an offer record via a web browser or via a network device and User A accepts the offer, which results in an encryption key request followed by an encryption key reply. In an alternate embodiment of step 124, the KES 10 automatically accepts the offer—establishing a bi-lateral relationship between User A and User B.

Referring to FIG. 2e, at step 118 the KES 10 receives an encryption key request and determines that approval is required, where the criteria for approval is a monetary payment by User B. In step 125, User B is presented with a user interface prompting User B to supply and/or authorize the use of credit card and billing information. Upon verification of payment, the KES approves User B's request at step 127. An ordinary person skilled in the art will appreciate that an approval process may generate revenue for the service provider, and/or User A.

Figure 2F:
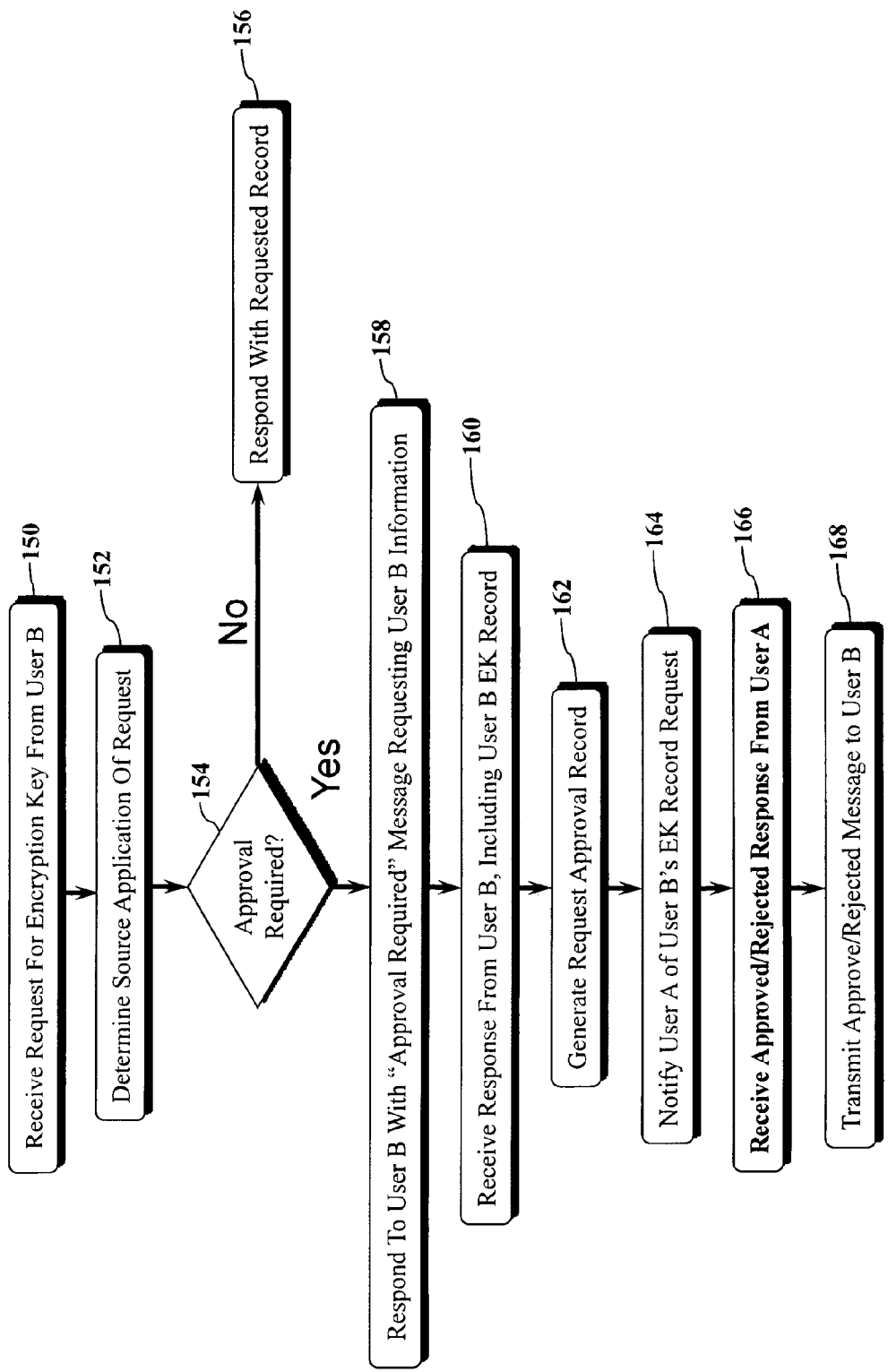

Referring to FIG. 2f, an exemplary embodiment of a web browser-based approval process will now be described. In step 150, User B requests an EK record by submitting a serial number 22 through a compatible end user application, such as by navigating a web browser application to the URL of an EK record request page or selecting a search result within a web page. Then the KES 10 determines the source application of the EK record request in step 152 so that the KES 10 can respond to User B with an "Approval Required" message in steps 156 or 158 in an appropriate data format. If approval is required, User A, must approve the request before the KES 10 can release the EK record to User B (step 154). If no approval is required (step 154), then the KES 10 responds with the requested record in a format compatible with the requesting application in step 156—a web page or a download for import into the requesting application. By contrast, other embodiments provide different formats such as an XML message, an email or an SMS message.

Similarly, the presentation format of the 'Approval Required' message may be selected based on the source application. For example, if the KES 10 determines that the encryption key request originated from an EK record request web page associated with the KES 10, the 'Approval Required' message may include a web page that informs User B that approval by User A is required. The web page may include a name field identifying User B to User A, an email field indicating an email address where User B registers and confirms the email address if approved, and other fields for collecting information from User B to assist User A in approving or rejecting the encryption key request such as a note field for use by User B to provide an explanation or purpose for the EK record request to User A. In one embodiment, the web page includes a field for User B's serial number 22, enabling User B to offer his or her serial number to User A. It should be noted that for security of the KES 10, the preferred method of making a request requires authentication of the requester.

In one embodiment, User B enters his or her name, email address, and other requested information into the 'Approval Required' web page and submits the information to the KES 10, which receives the information in step 160. In step 162, the KES 10 generates an approval record to track the request-approval process. The fields of the 'Approval Required' page may contain pre-populated data if User B is logged into the KES 10.

In step 164, the KES 10 notifies User A that there is a pending request that requires User A's approval. In one embodiment, the KES 10 sends an email notification to User A. In another embodiment, the KES 10 notifies User A through a communication application, such as upon login by User A onto the KES 10 or through a resident service module on User A's network device 30.

Figure 9B:
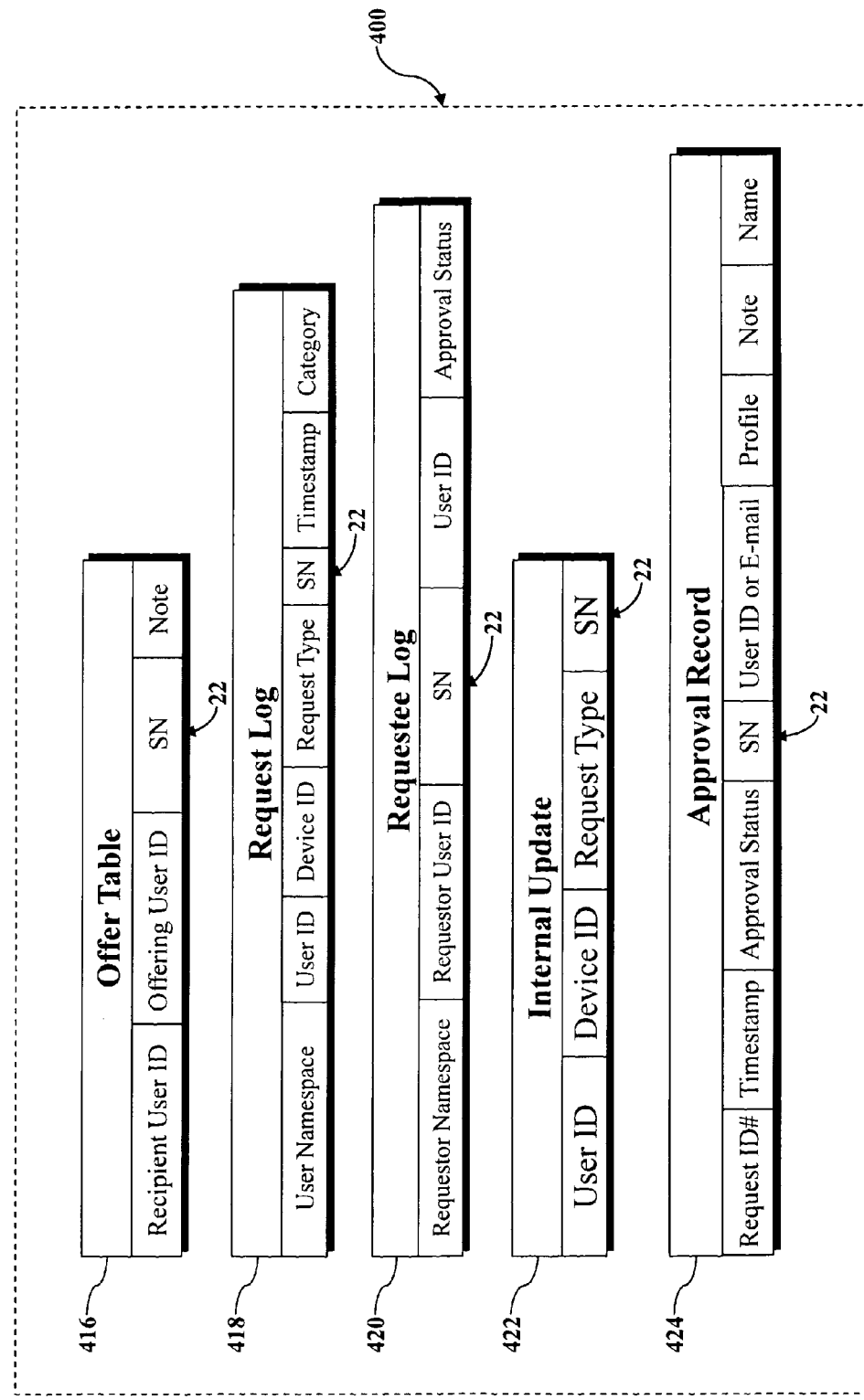

In step 166, User A approves or rejects (or possibly ignores) User B's request. In one embodiment, User A approves or rejects User B's request by logging onto the KES 10, navigating to an approval/rejection web page, selecting the approval record 424 (FIG. 9b) submitted and pressing either an "Approve" or "Reject" user interface button. If User A approves or rejects the request, the KES 10 changes an 'Approval Status' field 424 depicted in FIG. 9b from 'unapproved' to 'approved,' or alternately from 'unapproved' to 'rejected' if User A rejects User B's request.

In step 168, the KES 10 transmits a message to User B indicating the result of the approval process. In one embodiment, if User A approves User B's request, an email message is sent to User B including User A's encryption key information. The email may include the encryption key information as unstructured text, as a structured text record attachment (e.g., XML), or in another format. In alternate embodiments, the email message will include a URL or hyperlink to an approved request web page or a file that enables User B to retrieve the encryption key information from the KES 10. The messages transmitted between the KES 10 and User B, including associated email and web pages, may further include advertising which generates revenue for the KES 10 provider. In an alternate embodiment, a network device 30 adapted for communication with the KES 10 through an application plug-in receives the result of the approval process in a structured text record such as XML that is compatible with the requesting application. It should be noted that the preferred embodiment of making a request requires the requester to authenticate with the KES 10 prior to making the request; and, that the transmission of the EK request and EK reply is encrypted via a common transport level encryption protocol (e.g., SSL, TLS, etc.).

In one embodiment, User A defines a Personal Identification Number (PIN) or concise access code to be applied to one or more EK records by the KES 10. When receiving a request for an EK record, the KES 10 may determine that approval criteria is met for the EK record if the request contains a valid PIN or access code; and if so, will provide the requested information. An ordinary person skilled in the art will appreciate that a person may convey their serial number 22 for a record that requires approval in situations where the user is not able to make an immediate and needed approval electronically (e.g., when providing a serial number to a receptionist at a hotel, car rental agency, etc).

In an alternate embodiment of an approval process, User B may request access to and use of User A's encryption key and demographic information in accordance with legislative mandates requiring User B to provide User A with a means of controlling access and use of User A's demographic information and a means of communicating securely, such as the EU Directive on Data Privacy, the Health Insurance Portability and Accountability Act (HIPAA), Sarbanes Oxley (SOX) or the Graham Leach Bliley Act (GLBA). In this embodiment, approval by User A effectuates a binding agreement whereby User A will continually provide User B with accurate information, and User B may only use User A's information in a manner specified by User A; and User A and User B agree to communicate in a secure manner. In one embodiment, if User A rescinds approval to User B, User B is directed by a message from the KES 10 to cease use of User A's information and possibly to remove User A's encryption key information from User B's devices.

In one embodiment, a user account may have a plurality of EK records for use in a large organization. The login for the user account provides access to all EK records within the account. The EK record is adapted to have its own authentication credentials where the SN 22 provides a login, and the hash of a password is also stored therein. The EK record is further adapted to have an email address or other communication address for sending notifications to the user associated with the login credentials of the EK record. When a user logs in to the KES 10 using the login credentials of an EK record (rather than the user account), the user only has access to the functionality for that particular EK record. In one embodiment of an approval process, when a user approves an EK record associated to a user account, the KES 10 may be configured to automatically approve requests for other SNs 22 associated to the same account. In one embodiment, an EK record contains a Boolean flag indicating whether it will automatically approve a request for the EK record if a request for another EK record within the same account was already approved. In another embodiment, automatic approval applies a 'data mask' as described herein restricting access to particular data fields within the EK record. In another embodiment, when an automatic approval occurs, the KES 10 sends a notification message to the user associated to the EK record indicating that it approved a request for the EK record automatically.

In one embodiment, the KES 10 provides a "Send to a Friend" feature that enables a user to send his/her serial number 22 to other individuals via email. In one embodiment, the KES 10 accepts an email address from User A, and contains logic to determine if the submitted email address corresponds to a registered user, such as User B. If the submitted email address corresponds to a registered user, such as User B, the KES 10 is adapted to enable User A to offer User A's serial number 22 to User B using the offer process described herein instead of sending User B an email message; and, the KES 10 is further adapted to enable User A to request User B's record simultaneously. In another embodiment, the KES 10 contains logic to determine if the email address exists in an anti-spam list, and prevents the sending of an email message if the email address is present in the anti-spam list. If the submitted email does not correspond to a registered user and is not present in an anti-spam list, the KES 10 sends an email message including User A's serial number to User B. In one embodiment, the KES 10 adds User B's email address to an approval record with its approval status set to 'approved' on behalf of User A. This enables User B to request User A's encryption key information and receive immediate approval upon submitting the email address, or receive an offer for User A's encryption key information upon registering as a new user with the KES 10.

Figure 14:
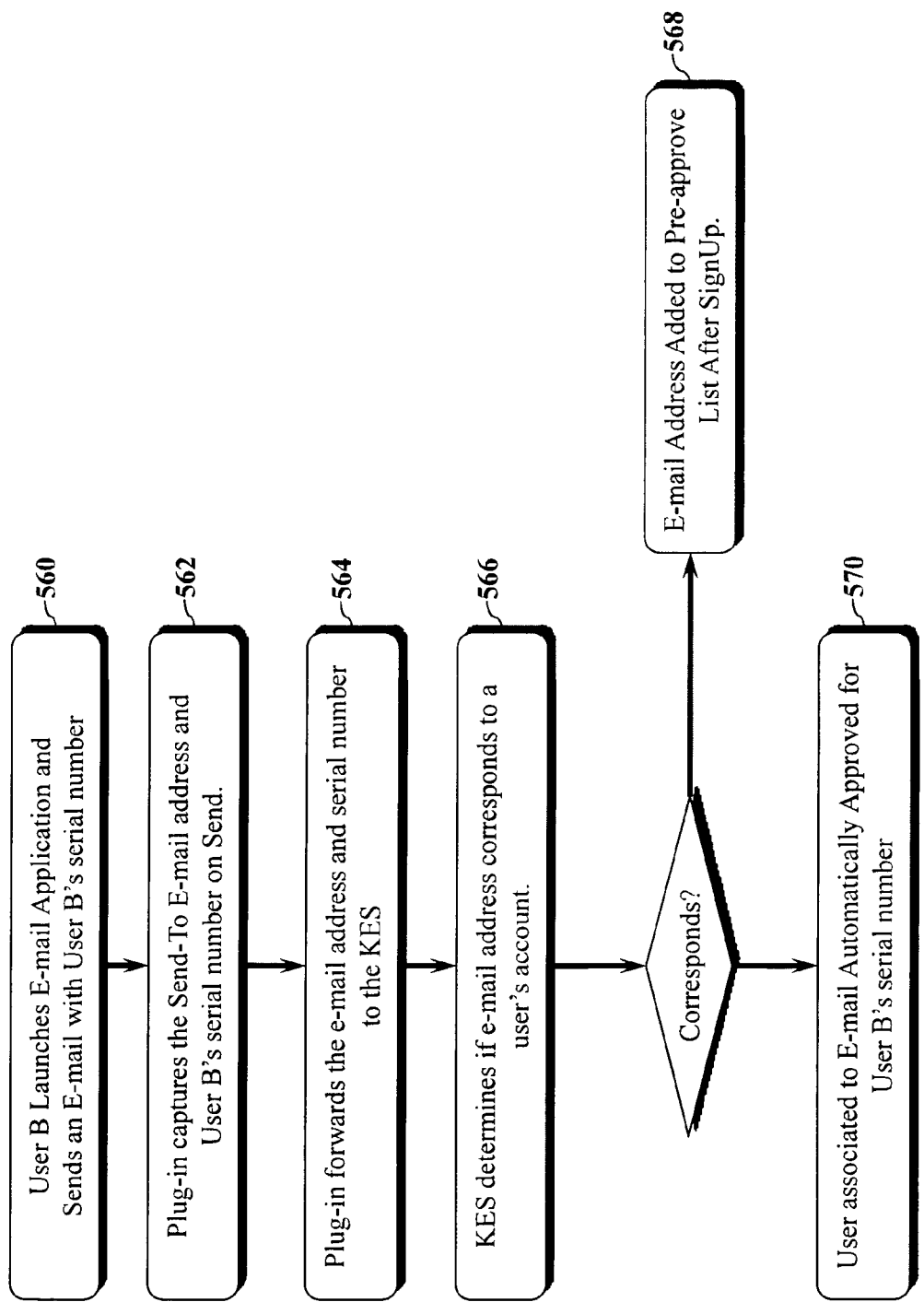
FIG. 14 illustrates an email application adapted for interaction with the KES.

Referring to FIG. 14, in another embodiment User A has an email application adapted to interact with the KES 10. The email application contains logic to parse the email application's 'Sent Email' folder for 'Sent-To' email addresses or alternatively to store a copy of sent email addresses as they are sent. In step 560, User A launches the email application and sends an email. In step 562, the logic stores a copy of a "Sent To" email address. In step 564, the logic sends the email address along with User A's serial number 22 to the KES 10. In one embodiment, the email and serial number 22 are sent to the KES 10 automatically. In another embodiment, the application is adapted to prompt User A asking if User A wants to pre-approve the person associated to the email address. In step 566, the KES 10 receives an email address and generates an approval record with the approval status set to 'approved' and determines whether the email address corresponds to a user's account. If the email address does not correspond to a user account, the email address is stored in the approval record and used to approve the person associated to the email address after they sign up and confirm their email address at step 568. In alternate embodiments, the approval record may be used to approve a non-user requesting an EK record where the encryption key information is disseminated to the requester at the same email address. Alternatively, the KES 10 disregards the email address if the person associated to the email address is not a user. In step 570, the KES 10 determines that the person associated to the email address is a user, such as User B, and pre-approves (or approves) a request by User B for the encryption key information associated to the serial number 22 submitted at step 564.

In an alternate approach, User A via the email application sends a serial number 22 to User B in conjunction with a signed Triple Data Encryption Standard (DES) key generated by the KES 10, User B's email address (which can be used for authenticating User B with the KES 10), and a timestamp used to limit the duration of approval. Upon receipt of the message, User B may request the serial number from the KES 10 via the Triple DES key, and the KES 10 may authenticate User B via the email portion of the Triple DES key. Advantages of these approaches include approving anticipated requests before they occur (as User A may include a serial number 22 in the email); and User B may forward an email sent by User A to User C, but User C is not automatically approved by User A in spite of User C's knowledge of User A's serial number 22.

In one embodiment of a pre-emptive approval process, a network device 30 and the KES 10 are adapted at step 564 to determine if the destination address corresponds to an existing user. If the destination address corresponds to an existing user, the KES 10 in step 566 generates an approval record with the approval status set to 'approved.' If the destination address does not correspond to an existing user, the KES 10 generates a triple DES key and transmits it to the network device and the network device potentially via an email application or modified email relay software may generate an email with a serial number 22 and send it to User B in conjunction with the signed Triple Data Encryption Standard (DES) key generated by the KES 10.

In other embodiments, approval criteria include user specified rules for automatic approval. For example, User A may set up approval levels that differ based on the content of the requested information. For example, User A may have a business EK record using one serial number 22 that does not require approval and another EK record and serial number consisting of home information that does require approval.

Figure 8A:
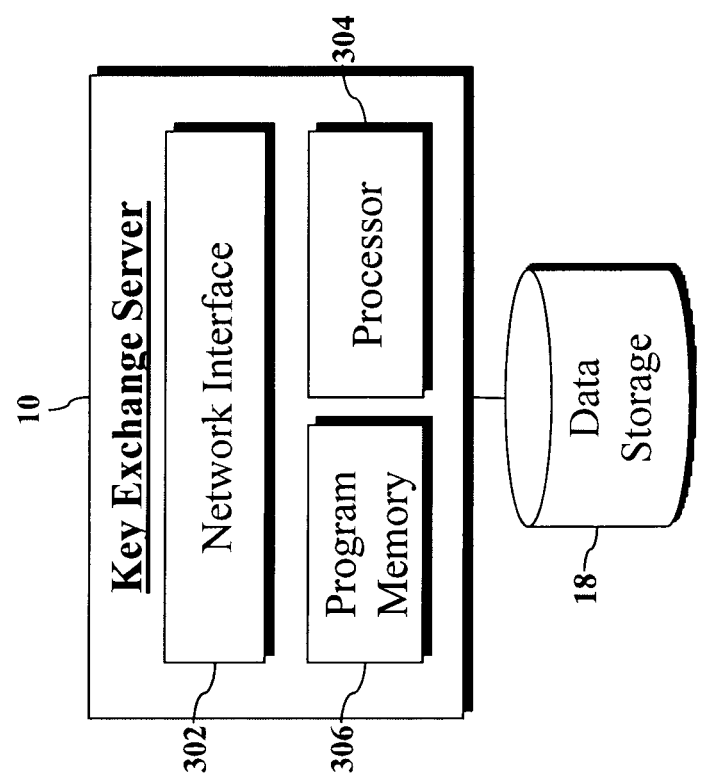
FIGS. 8a-8d illustrate an embodiment of a KES of the present invention.
Figure 8B:
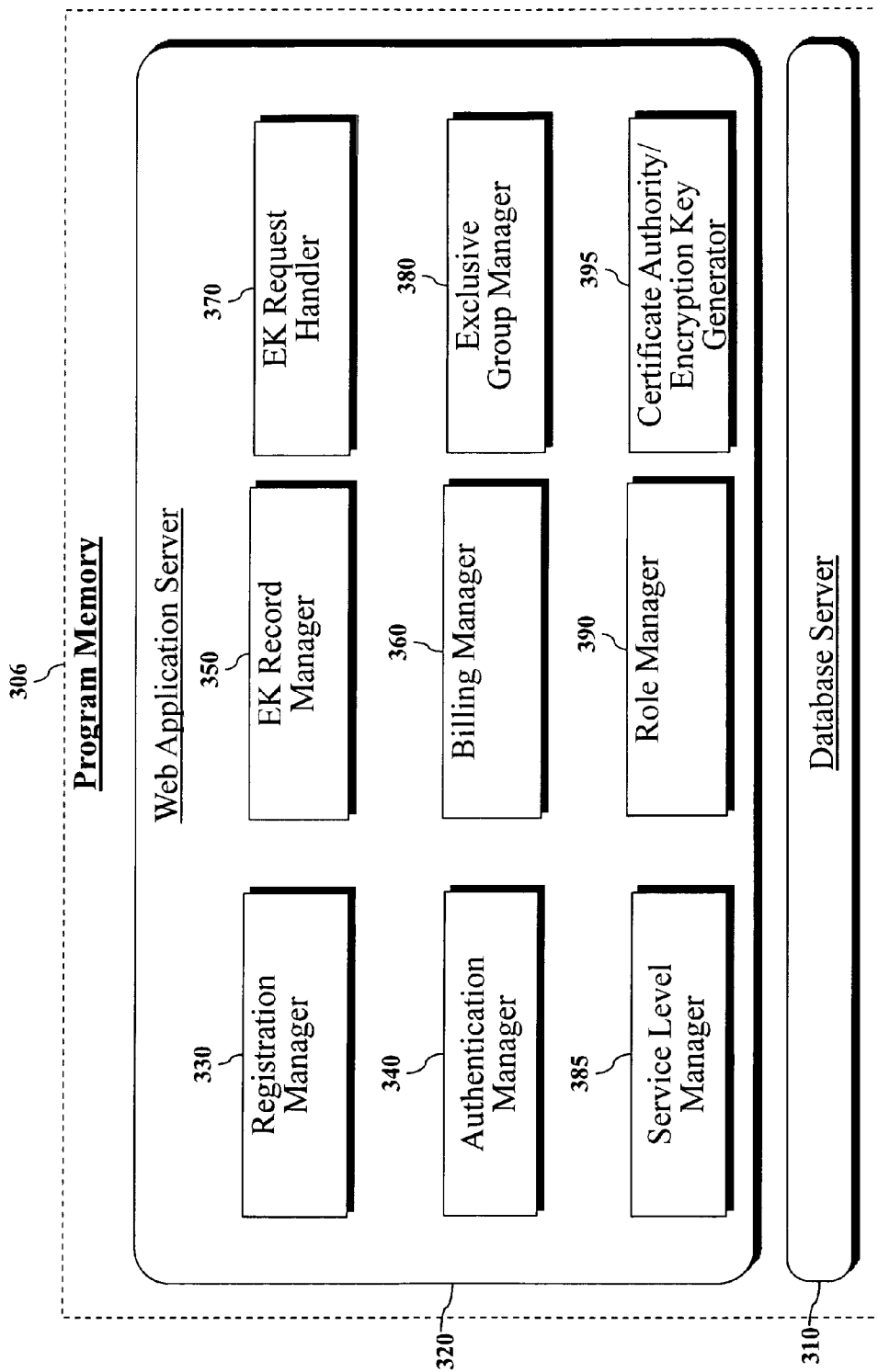
Figure 8C:
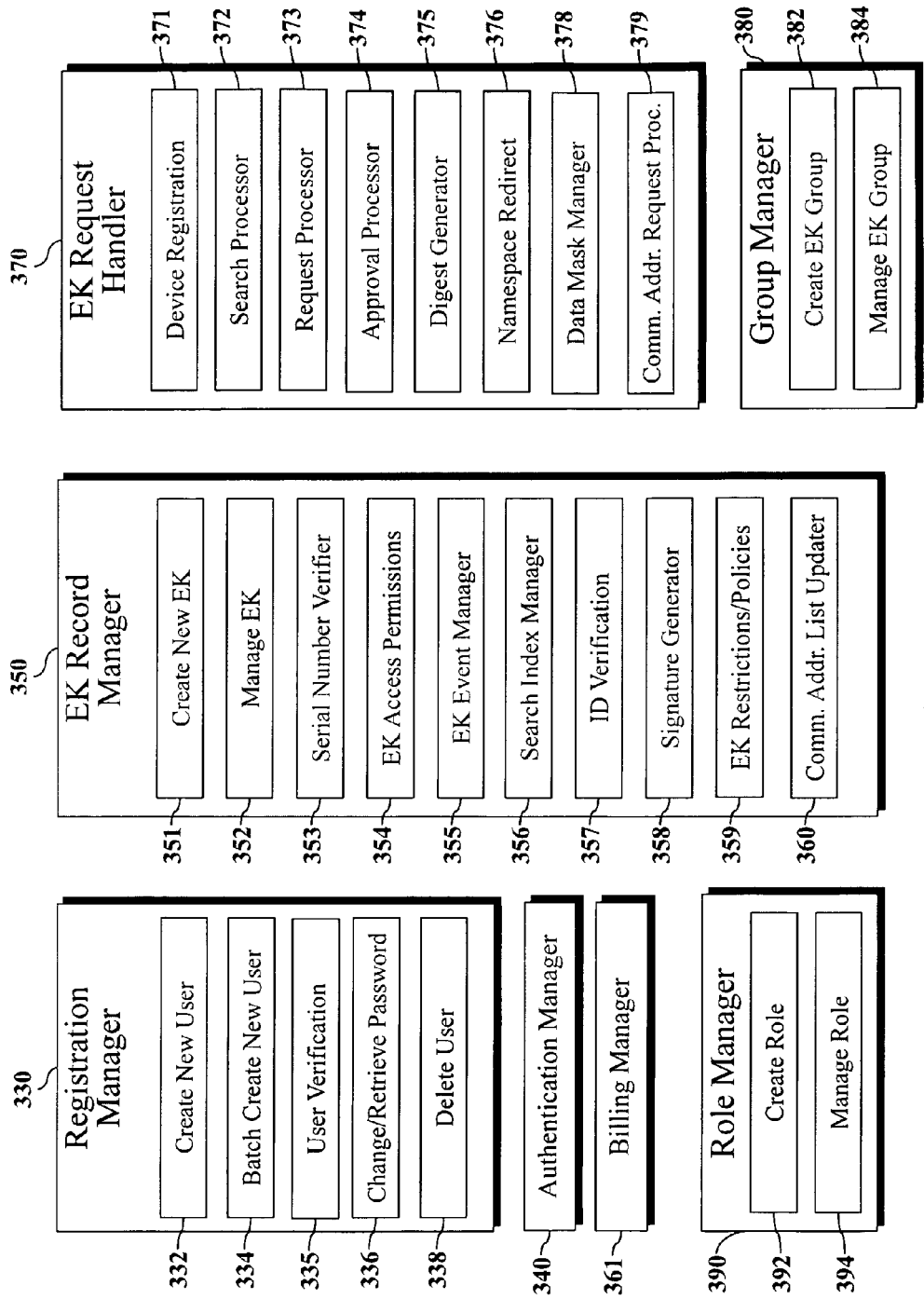
Figure 13:
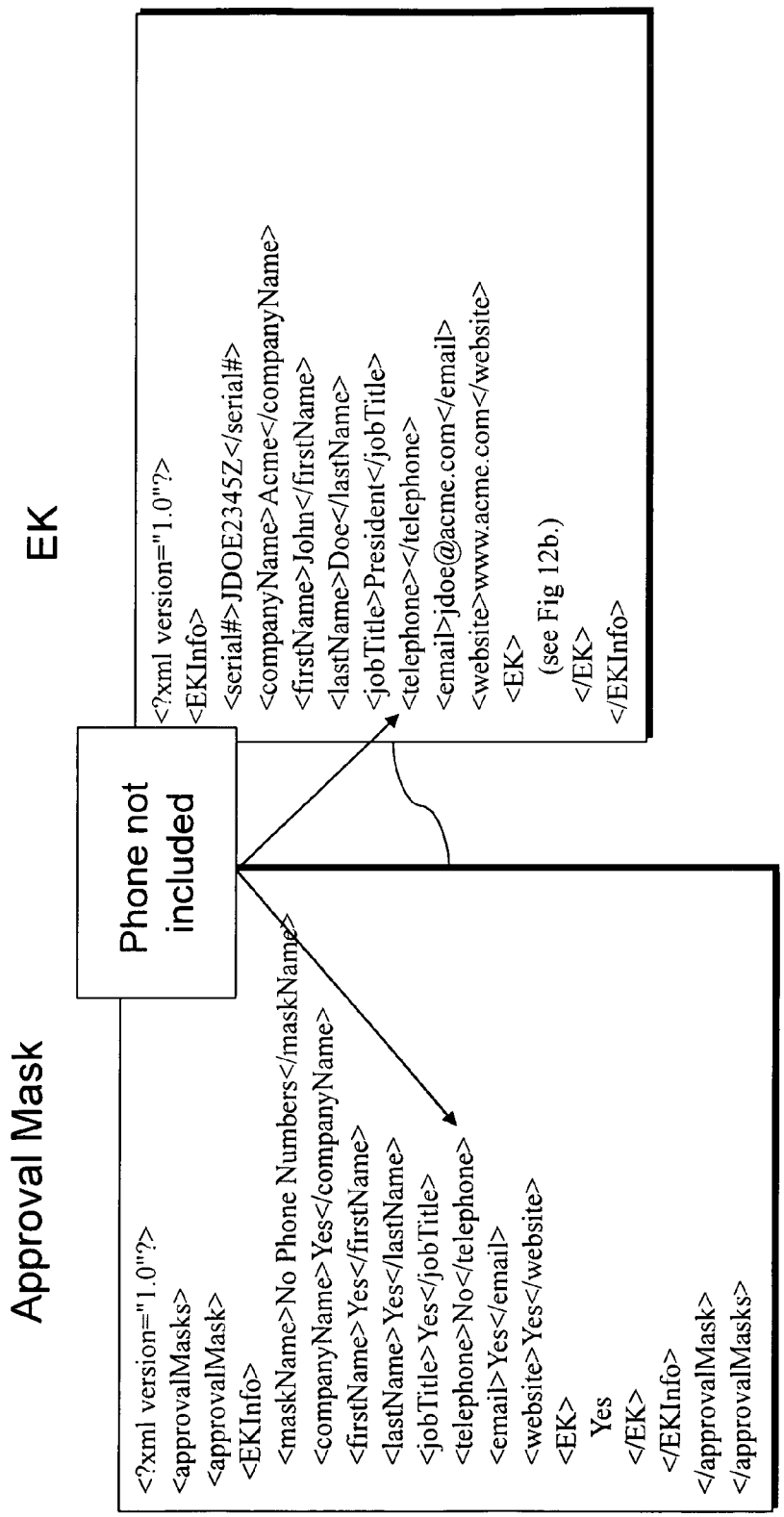
FIG. 13 illustrates an approval mask in accordance with the principles of the present invention.

Referring to FIG. 8*c*, in one aspect of the present invention the KES 10 contains 'data mask' logic 378, which enables User A to disseminate particular data attributes within an EK record while preventing the dissemination of other attributes by applying a data mask to an EK record prior to generating an encryption key reply. In one embodiment, the KES 10 provides logic enabling User A to create a data mask, to specify data attributes to include in an EK reply, to provide the data mask with a name, and to store the data mask in the KES 10. In one embodiment, the KES 10 provides logic 378 enabling User A to select a data mask from a plurality of data masks, and to apply the selected data mask to an EK record prior to disseminating a response message to User B. Referring to FIG. 13, a data mask may consist of all the attributes of an EK record where the field values are true/false or yes/no to indicate whether an encryption key reply should include the values. When assembling an EK reply, the data mask is applied as shown in FIG. 13. User A may apply a default 'data mask' to a record for added convenience. User A may also select a mask from a plurality of masks when approving a request for an EK record or when offering one of User A's EK records to another user such as User B. In one embodiment, a bi-lateral relationship established between User A and User B results in a "link" record in the database, which contains the same attributes as the Request Log and Requestee Log, and may also contain a reference to the data masks used by both User A and User B. In another embodiment, the KES 10 or a communication application on a network device is adapted to present data fields and a means of selecting or deselecting each field for dissemination. An ordinary person skilled in the art will appreciate that by storing user-defined masks related to a "link" record, the KES 10 enables each user to uniquely specify each attribute they intend to share with each user. In an alternate embodiment, a data mask is used to determine which fields within an EK record may be searched by other users, such that the search index manager 356 only includes fields marked 'true' or 'yes' in the search index database.

In one scenario, User A is a person who may find approval processes unsuitable (e.g., a celebrity, a politician, etc.), because disseminating the serial number 22 may result in thousands of requests from unknown individuals—creating more labor than User A would find acceptable. In an alternate embodiment, User A may preclude requests for the serial number 22 altogether. Instead, User A may require User B to provide User B's serial number 22 or username to User A, and User A will offer one of User A's EK records to User B electronically by specifying the serial number 22 offered and either User B's username or one of User B's serial numbers 22 in an 'offer' type request to the KES 10. User B may accept or decline the EK record offered by User A. An ordinary person skilled in the art will appreciate that User A may exercise the 'offer' type request irrespective of whether User A precludes requests for User A's serial number and EK record.

In one scenario, User A wishes to refer User B's serial number and EK record to User C. User A selects User B's EK record and serial number from a list within the key manager 528 (FIG. 11*b*) of a communication application 520 on a network device and invokes a 'refer' type request, which requires User A to further specify another user who will receive the referral. User A selects an EK record and serial number for User C. The communication application via the EK request manager 530 submits the 'refer' type request to the KES 10, which stores the 'referral' in a record associated to User C, enabling User C to make a request for User B's EK record via the serial number. In one embodiment, the 'refer' type request includes User A's name as the referring party. This notifies User B and User C that User A provided the referral. In one embodiment, User A and User B must have a pre-existing relationship and User A and User C must have a pre-existing relationship in order for User A to refer User B's serial number to User C.

In one scenario, User A and User B each have EK records, which require their respective approvals before disseminating encryption key information to requesters. User A has previously requested User B's EK record and received approval;

and User B has previously requested User A's EK record and received approval. In one embodiment, User A deletes the EK record he/she requested from User B. Referring to FIG. 8c, the KES 10 is adapted to respond to this event 355 by looking up requests made by User B for User A's encryption key information, and presenting User A with the opportunity to rescind approval to User B such that User B will not be able to receive updates to User A's EK record in the future. In another embodiment, User B is notified of User A's rescission of approval for User A's EK record. The KES 10 is adapted to respond to this event 355 by looking up requests made by User A for User B's encryption key information, and presenting User B with the opportunity to rescind approval to User A such that User A will not be able to receive updates to User B's EK record in the future. An ordinary person skilled in the art will appreciate that deleting a person's EK record or receiving a rescission of approval for an EK record may indicate the end of a bi-lateral relationship such that the KES 10 should present users with the opportunity to rescind approvals reciprocally.

In one embodiment, the KES 10 detects an EK record event 355 (FIG. 8c) such as an EK record update and spawns additional processes. For example, the KES 10 may present a user who updates his/her EK record with a list of additional processes the user may invoke, such as updates to banks, public authorities, and retailers with whom the user interacts. In another embodiment, the update event 355 (FIG. 8c) helps to notify organizations of the user's new encryption key information, and personal or demographic information in accordance with EU Directive on Data Privacy, the Health Insurance Portability and Accountability Act (HIPAA), or Sarbanes-Oxley (SOX)—ensuring that organizations maintain accurate and up-to-date information on the user and are able to communicate with the user securely. In this embodiment, the update event 355 (FIG. 8c) may spawn emails or mail notices. In another embodiment, the KES 10 may be adapted to invoke the foregoing processes with Third Party Applications (TPAs) using Web 2.0, "mashup" or other integration techniques. In another embodiment, where the event involves revocation of an encryption key or certificate, the KES 10 may be adapted to send updates to third party certificate revocation lists (CRL).

In one embodiment, an EK record may be requested through a hyperlink to a KES 10 request page, including at least one search parameter. For example, a signature block in an outbound email may include a hyperlink to the KES 10 request page along with the sender's serial number 22. An email recipient may make an EK record request by clicking the hyperlink.

In one embodiment, a network device 32 and/or communication application 520 is adapted to add a serial number 22 to a communication 24 header. In one embodiment, an EK record may be requested through a communication header extension (e.g., an SMTP header) containing the SN 22. In one embodiment, a network device 32 and/or communication application 520 is adapted to identify a SN 22 in a communication header, determine if the current user has already requested the identified SN 22, and to prompt the current user to request the identified SN 22, or to request the SN 22 on behalf of the user. In an alternate embodiment for use with directory services (e.g., LDAP, ActiveDirectory), a communication header extension (e.g., an SMTP header) may contain the network address of an LDAP server, the communication address and preferably the SN 22.

Referring back to FIG. 2a, after access to User A's EK record is granted to User B, in step 112, the KES 10 retrieves User A's EK record—identified via the received serial number 22—from the data storage 18. The KES 10 transmits the at least one encryption key, demographic data (e.g., first name, middle name, last name, telephone number, email address, etc.) and key use policies/restrictions in a structured information record, such as an XML file, suitable for mapping to data fields in User B's database. The reply format may be specified by User B's communication application through a reply format field in the EK request.

Figure 12A:
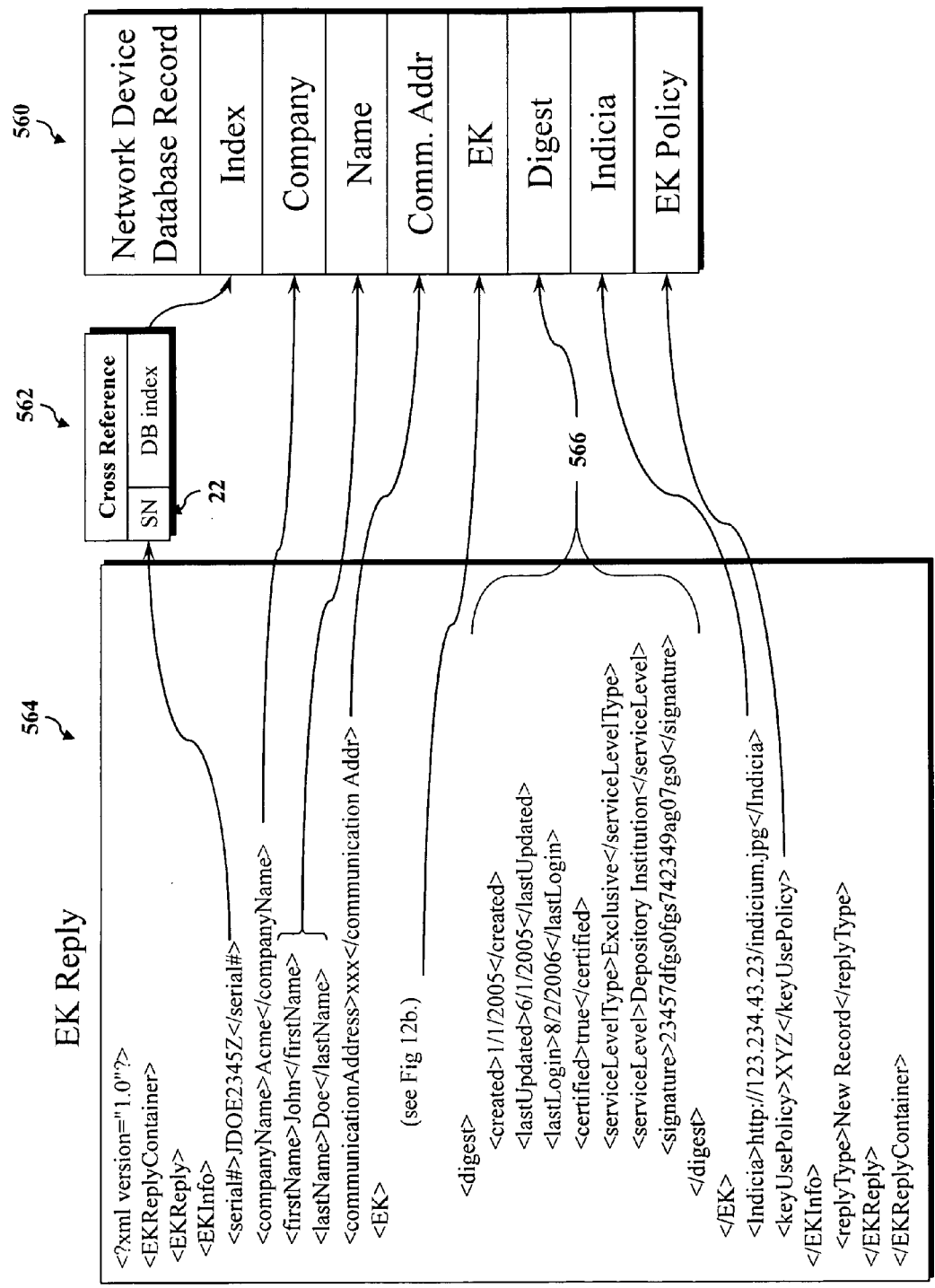

Referring to FIG. 12a, the response message may contain a 'digest' 566 that signs the retrieved EK record using Public Key Infrastructure (PKI) signature technology. This 'signature' authenticates the contents of the EK record and may indicate its creation date, last login date and last modified date among other attributes. This digest allows the receiving application to determine that the received EK record was created and/or modified on the server by the registered user and not another party during transit. The digest may also enable the receiving application to determine whether the user associated to the EK record certified the contents of the information, identify the user's service level, or determine authorized uses of the information (e.g., agreements executed during the approval process for the EU Directive on Data Privacy, HIPAA, etc.). The digest helps the recipient and the communication application determine whether the EK record contains reliable information among other uses.

The received encryption key or digital certificate information (FIG. 12b) is imported into User B's communication application database in step 114 of FIG. 2a. As illustrated in FIG. 12a, the conveyed serial number 22 is stored in a database table 562 that at least includes an identifier of an associated EK record, such as a unique database record index or primary key. An example of a mapping from an XML-formatted encryption key reply message 564 to a network device database record 560 and cross-reference file 562 is also illustrated in FIG. 12a. In one embodiment, the received EK record data is entered as a new record and the serial number 22 is stored in a cross-reference file 562 along with the record ID or index of the new record within the communication application. The cross-reference file 562 facilitates a link between the EK data stored on each network device 30 and the corresponding data stored in the KES 10, which is useful for updates, synchronization (i.e., the delete requests) and other linked requests. In one embodiment, the retrieved EK record is stored as a new record in an encryption key ring, enabling it for immediate use.

In one embodiment, User A may wish to provide User B with an alternative EK record and serial number 22 to replace a previously requested EK record and serial number. The key manager 350 (FIG. 8c) is adapted to enable User A to store an alternative serial number field in a previously requested EK record 406 using the logic to manage the record 352. The EK request handler 370 is also adapted to enable the request processor 373 to request the alternative EK record in lieu of the original record. The EK request manager 530 and key cross reference 532 of the communication application 520 on the network device are modified to process a "replace" response type. In one embodiment, the network device prompts User B to allow one serial number and EK record to replace another serial number and EK record. The communication application 520 facilitates the replace operation by removing the previous serial number from the cross reference record and replacing it with the alternate serial number; then, it proceeds to update and store the EK record contents.

In one embodiment, the KES 10 is adapted to facilitate the synchronization of a plurality of communication applications associated with a user. The KES 10 logs each request for encryption key information from each network device 32 application. When one of the network device applications sends a synchronization request to the KES 10, the requesting application will automatically receive encryption key information, deletion instructions or other information requested by other network-enabled applications associated with that user (i.e., using the 'request replication' synchronization method described herein). In one embodiment, a request results in an EK reply container with multiple EK replies, each of which is processed by the network device application.

In another embodiment, the KES 10 includes a service providing for the remote deletion of encryption key information stored on network devices and applications. For example, if a user discontinues the use of an application, or if a network device 32 is lost or stolen, the user may wish to delete the associated encryption key information for the user's account on that device and block future encryption key requests to the KES 10 from the application or device for the user's account. In operation, a registered user of the KES 10 initiates the remote deletion service and identifies the applications and devices targeted for encryption key information deletion. The KES 10 logs the identified devices and applications and prevents future encryption key requests for the user's account thereby. The deletion of the remote encryption key information may be implemented through the update and synchronization features described herein (e.g., by identifying the remote records as deleted or updated as blank records) or by adapting the KES 10 to transmit deletion instructions to one or more of the network-enabled applications that support remote deletion of encryption key information.

In one embodiment, a serial number is used to identify a role within an organization (e.g., purchasing manager, accounts receivable clerk, etc.) rather than an EK record for a particular individual. A role serial number is assigned by the KES 10 and mapped to an existing serial number 22 in a role database record 414 (see FIG. 9a). A network device 32 requesting encryption key information associated with a role serial number will receive the encryption key information of the individual EK record in response. Referring to FIG. 8c, the role manager 390 includes program logic for creating a role 392 and managing a role 394. In one embodiment, the 'serial number verifier' function 353 is adapted to accept a serial number candidate for the role and ensure that it is unique, and the request processor 373 is adapted to process role requests and replies.

Referring to FIGS. 1 and 4, an embodiment of the operation of role serial numbers will be described. User A establishes a role through an interface on the KES 10 in step 250. The KES 10 generates a unique role serial number in step 252 and transmits the role serial number to User A in step 254. In step 256, through a second interface on the KES 10, User A enters a serial number 22 associated to an individual EK record. The referenced individual serial number 22 is mapped in step 256 to the role serial number managed by User A. In one embodiment, the KES 10 requests approval to include the individual EK record serial number 22 in the role, as required. In step 258, User A conveys the role serial number to a third party, such as User B, to disseminate encryption key information.

In step 260, User B launches a communication application and enters the role serial number. In step 262, the communication application retrieves individual encryption key information associated with the entered role serial number from the KES 10. The KES 10 receives the role serial number from the communication application and retrieves the corresponding EK record from the database. The individual EK record is transmitted to the communication application, such as through an encryption key reply. In step 264, the received EK record is stored in the communication application database. It will be appreciated by those having ordinary skill in the art that User A may substitute serial numbers as individuals change roles within an organization.

In one embodiment, a plurality of serial numbers 22 such as those belonging to company employees or role-based serial numbers may be grouped under a single group serial number. A group serial number is assigned by the KES 10 and mapped to a plurality of existing serial numbers 22, role serial numbers, or group serial numbers in a group database. Further, a network device requesting encryption key information associated with a group serial number will receive a plurality of associated EK records in response. Referring to FIG. 8c, the group manager 380 includes program logic for creating a group 382 and managing a group 384. In one embodiment, the 'generate serial number' function 356 is adapted to accept a serial number candidate and ensure that it is unique or generate a serial number for the group, and the request processor 376 is adapted to process group requests and replies.

Referring to FIGS. 1 and 3, an embodiment of the operation of group serial numbers will be described. User A establishes a group through an interface on the KES 10 in step 200. The KES 10 generates a unique group serial number in step 202 and transmits the group serial number to User A in step 204. In step 206, through a second interface on the KES 10, User A enters one or more serial numbers 22 of potential group members. The group members may be referenced by individual serial numbers 22, role serial numbers and group serial numbers which are mapped to the group serial number managed by User A. In one embodiment, the KES 10 requests approval to include individual 22 or group serial numbers in the group, as required. In step 208, User A conveys the group serial number to a third party, such as User B, to disseminate encryption key information for the group of users.

In step 210, User B launches a communication application and enters the group serial number. In step 212, the communication application retrieves individual encryption key information associated with the entered group serial number from the KES 10. The KES 10 receives the group serial number from the communication application and retrieves the corresponding EK records from the database. The group of individual EK records is transmitted to the communication application, such as through an EK reply container. It will be appreciated by those having ordinary skill in the art that the plurality of EK records associated with the group may be retrieved by entering a concise serial number saving a significant amount of time and effort. In step 214, each of the received EK records is stored in the communication application database. In one embodiment, the communication application maintains a mapping of each EK record to its individual serial number, and each individual serial number to the group serial number.

In another embodiment, the group serial number functionality enables a user to create a group where membership in the group indicates to a requester that each individual member of the group is a valid member of the group. In one embodiment, the group record is adapted to present visual information to a requester which may include a textual verification, a graphical or video verification, or an audio verification of the type of group; the name of the group. An ordinary person skilled in the art will appreciate that users may create persistent or ad hoc social groups (e.g., Parent/Teacher Association groups, company employees, sports teams, etc.).

Another embodiment of the present invention includes a Taskbar Service Module (TSM) such as those available on Windows-enabled computers, which allows the user to activate a taskbar service from a taskbar, search for or make requests for encryption key information, and approve requests for encryption key information without the aid of an internet browser. A TSM provides a convenient way to access application functionality available to the KES 10 or a network device 30 without requiring the user to open a browser, navigate to the KES 10, provide authentication credentials, and navigate to the particular functionality the user wishes to exercise. A taskbar module also alleviates the need to access other applications, such as email or cellular phone address books adapted for use with the KES 10. Instead, the user may click on an icon on the taskbar to launch a TSM that will maintain a session with the KES 10. In one embodiment, the user may enter a serial number 22 and request encryption key information through the TSM, or approve requests for the user's information as necessary. The TSM stores the username, password, and network address necessary to establish a connection to the KES 10.

The TSM further includes an Application Programming Interface (API) allowing applications and plug-ins to access the KES 10 through the established session. The TSM includes functionality to accept requests received through the API from an application, and provides common functions described herein. The use of a TSM simplifies the development of applications and associated application plug-ins and reduces the need to develop redundant functionality when numerous applications are supported for the same operating system.

In one embodiment, an email application may be further adapted to parse incoming email messages using a common protocol such as POP 3 to search for serial numbers 22 attached to or included in an email. If the email application locates a serial number 22, it may determine via a cross-reference file 562 (FIG. 12a) if the application already has requested the serial number 22. If the application hasn't requested the serial number 22, the application may present a user interface dialog box offering to make a request, and the user may make the request or close the dialog box without making a request. If a serial number 22 is not found in an incoming email, the email application may alternatively issue a search request to the KES 10 using other identified criteria, such as the sender's email address identified by parsing the incoming email.

Referring back to FIG. 2b and FIG. 5, in one aspect of the present invention, wireless network devices are adapted to select, send and receive serial numbers using infrared or radio waves. In one embodiment, User A and User B, each with their own wireless network devices, are within proximity of each other. User A selects one of his/her serial numbers for transmission to User B and invokes the transmission process. The wireless network device encodes the serial number such that the receiving wireless device may decode it and identify the serial number as belonging to the service (e.g., incorporated URN syntax, as described herein). User B's network device may present User B with the option of accepting or rejecting the transmission. If User B accepts the transmission, User B's network device receives and decodes the transmitted message. The wireless network device may then request the associated EK record from the KES 10. In one embodiment, the transmission also includes an approval password or pin so that User B's request does not require further approval from User A.

Referring to FIG. 16, an approach to using the present invention involves parsing a communication header (i.e., depicted using SMTP extensions) to discover information about a communication partner and to add data to the communication header to enable a communication partner to discover one's own information.

In one embodiment, use of certain services, such as a request for encryption key information of users of an exclusive service level, is provided to users without charging a fee for the service. Providing services for free may be desirable because it promotes rapid and widespread adoption of the services and provides a valuable public service. The KES provider may collect revenue by charging for access to exclusive service levels and additional revenue by offering premium services on a pay-per-use or subscription basis.

In one embodiment of the present invention, the KES 10 reserves a sequence of characters in a serial number 22 for the benefit of a user paying a premium, or for the benefit of a particular organization or group. In one embodiment, the beginning character of a serial number up to a terminating character such as a period (.) may indicate a domain. Within this domain, the KES 10 may reserve one or more character sequences for a particular group. Exemplary embodiments of reserved keywords include company names or stock ticker symbols. In one embodiment, a registered user is only able to generate a serial number 22 with a reserved sequence of keywords if the registered user's account email is confirmed with a particular domain name. In another embodiment, the reserved sequence of characters indicating an organization or group may enable multiple users to sign messages using a certificate generated for that organization in a similar manner to the way certificates from certificate authorities are used to generate keys during communications with SSL/TLS.

Advantages of the present embodiment will be readily understood by persons having ordinary skill in the art. For example, in the present embodiment, an EK record is stored in a centralized database 18, and includes a unique, context-free serial number 22. A concise, personalized, context-free serial number (e.g., not an email address associated with an email account or a telephone number associated with a residence, etc.) is useful for conveyance, encryption key information requests, creating a request log and a requestee log, and creating a cross-reference 562 (FIG. 12a) between the EK record stored in the data storage 18 and a database index of the network device 32's communication application.

Unlike a context-driven ID such as an email address or telephone number, or an ID that contains a network address or routing information, a user does not typically need to change the context-independent serial number over time, avoiding a break in cross-reference links that would often occur (e.g., when a person changes jobs and thus email addresses and telephone numbers). In this manner, the context-independent serial number is associated with a trademark making it more easily conveyed. Using alphanumeric characters for the serial number makes it possible to issue short, personalized SNs 22 amenable to user input that identify an extensive address space. By contrast, referring to FIG. 12b, a conventional EK record may have hundreds or thousands of characters, each of which requires entry under a manual input system, and many configuration steps necessary to send or receive encrypted communications. Another benefit of a context-independent SN 22 is that it may be conveyed without revealing any of the EK record's data.

The present embodiment also makes it possible to retrieve updates and to synchronize many different types of devices and applications quickly, allowing a user to maintain consistent, up-to-date encryption key information across many different network devices.

Key Exchange Server

A KES may be any server capable of storing encryption keys associated to serial numbers 22, key IDs, network addresses, or other identifying criteria; accepting requests for encryption keys, retrieving an encryption key associated to a request, and providing the requested encryption key to the requester. In the exemplary embodiment, a KES is a novel centralized or federated system capable of registering users, setting organization-level controls for organizations with multiple users, approval-based relationships among users, key generation, key rotation, and secure dissemination of keys and verification indicia among other features.

An embodiment of a key exchange server (KES) 10 will now be described with reference to FIGS. 1, and 8*a*-8*d*. The KES 10 includes a network interface 302 to facilitate communications with network devices 30-32, a processor 304, and a program memory 306 that includes logic for instructing the processor 304 to facilitate the creation, storage, maintenance and retrieval of EK record information in a data storage 18.

Figure 9C:
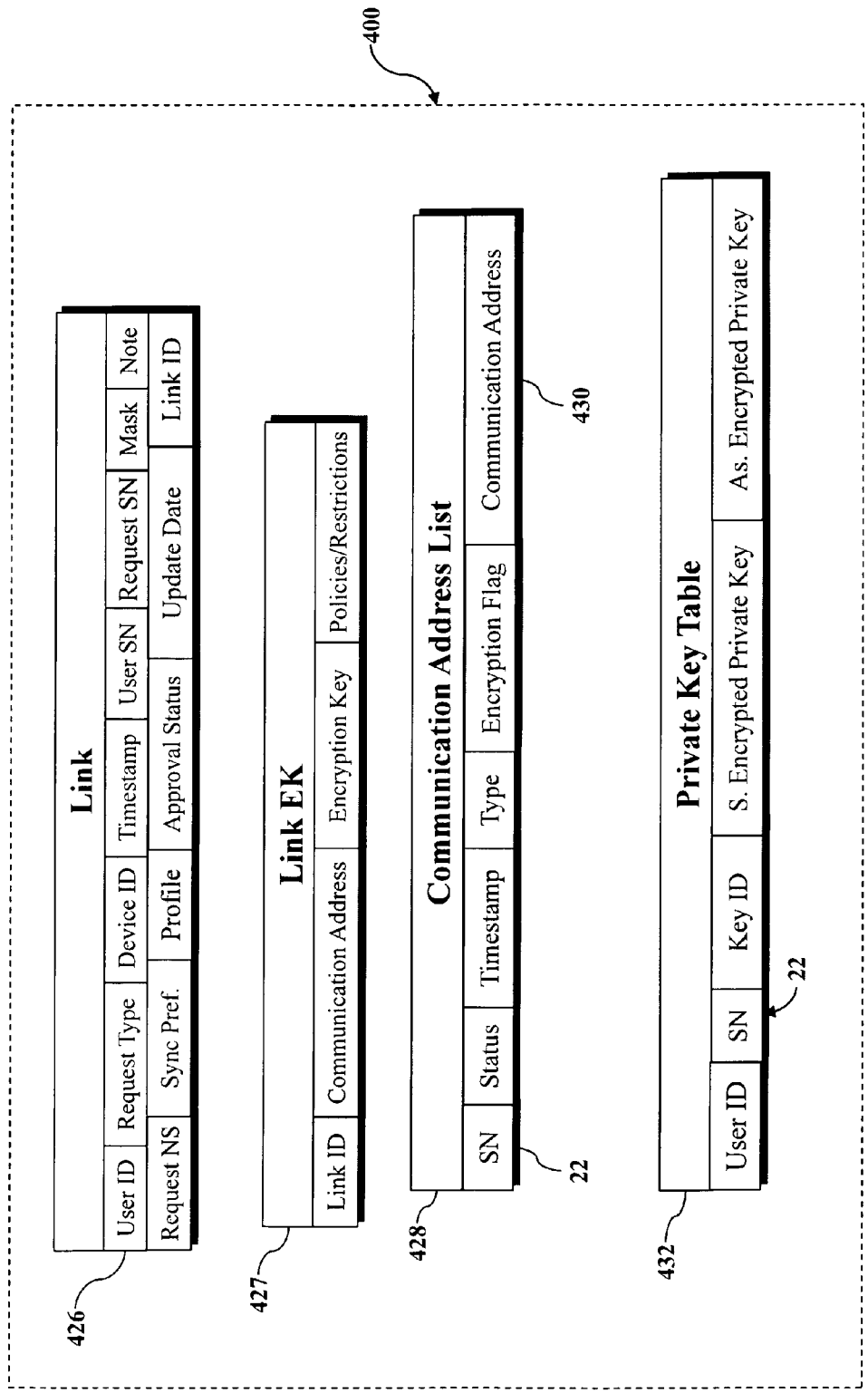

The program memory 306 of the exemplary embodiment includes a database server 310 and a web application server 320. The database server 310 includes a series of data structures 400 (FIG. 9*a*-9*c*), which the database server 310 may use for storing data in the data storage 18. The data structures 400 include a User ID table 402 for storing information about registered users, including a User ID, user information, authentication criteria, and authorization information. In one embodiment, user information includes an account password (i.e., usually an MD-5 hash of a password) and billing information, and may include additional data used by the KES 10. A second table 404 maps serial numbers 22 to user IDs, allowing the system to track the user associated with each EK record 406, and allowing a single user to maintain multiple serial numbers 22 with encryption keys for each serial number 22. For example, it will be appreciated by those having ordinary skill in the art that a single user account 402 may have a plurality of EK records 406 to accommodate multiple uses (e.g., business and personal), or an account suitable for use with an organization where the primary user is a system administrator, and each individual or entity associated to an EK record 406 may have authentication credentials for accessing at least one EK record 406 (but not the user account record 402). An EK record table 406 stores user encryption key information, demographic information, an associated serial number 22, and optionally authentication information (i.e., SN 22 is login, and an MD-5 hash of a password) so that a user may gain access to a single EK record within a user account that contains multiple SNs 22. An EK record may include at least one public encryption key (asymmetric key) or symmetric key and may include name, title, address, telephone numbers, email address, company name, web site, logo or picture and other information. A user-defined field table 410 stores user-defined fields—enabling a user to add fields that are not part of the pre-determined fields of the EK record 406. A group table 408 stores a group serial number and a series of serial numbers 22 associated to individual EK records 406, which is controlled by at least one user ID. A role-based serial number table 414 stores a role serial number, a role description and one serial number 22 associated to an individual EK record 406 and is controlled by at least one user ID. A namespace map table 412 stores the namespace, network address, and authentication credentials for the KES (FIG. 10, 10*a*-10*b*) of other service providers offering the same service. An offer table 416 stores EK record offers made by one user to another user. A request log table 418 stores EK requests (FIG. 7*a*) made by network devices. A requestee log table 420 stores the user IDs of the user who owns an EK record, the user ID of the requesting user, the requested serial number, and the approval status among other attributes. When User A updates an EK record 406, an internal update table 422 stores update notifications for User B, who previously requested the serial number. An approval record 424 stores the approval status and reply method of requests that require approval. A link record provides an alternate embodiment to tables 416-424. A communication address list table 428 stores the communication addresses that members of an exclusive service level may use when sending a signed communication (i.e., a signed communication that does not include a clear text payload). A private key table 432 stores an encrypted private key, where the key may be encrypted with a symmetric cipher and passphrase and/or encrypted with an asymmetric cipher, where the decrypting key is split in two such that the operator of the KES 10 and the user each have a portion of the key, and the private key stored in the record may be recovered by combining the split portions of the decrypting key (i.e., so called 'key escrow').

It should be appreciated by an ordinary person skilled the art that the exemplary embodiment is intended to describe the various processes and that implementation with various database technologies may lead to more optimal configurations. For example, in FIG. 9*c*, a link record 426 may perform the functions of tables 416-424 to improve system performance by reducing the number of tables and queries.

The web application server 320 includes a registration manager 330 for handling user registration, an authentication manager 340 for authenticating users and devices accessing the KES 10, an EK record manager 350 for handling the creation, storage and updating of encryption key information, a billing manager for charging users 360, an EK request handler 370 for delivering encryption key information to requesting network devices, a group manager 380 for handling group creation and management, a role manager 390 for handling role creation and management; and, a certificate authority and encryption key generator 395 for generating public and private key pairs, validating certificates, providing certificate revocation list and Online Certificate Status Protocol (OCSP) services, and/or interfacing with third party certificate authorities to perform one or more of the foregoing services. An ordinary person skilled in the art will appreciate that the preferred methods described herein can revoke an encryption key and substitute a new key (or certificate) using synchronization and update functionality, which may reduce complexity in a centralized or federated configuration compared to CRLs and OCSP services.

The registration manager 330 includes processes for creating a new user 332, creating a plurality of new users through a batch process 334, verifying users 335, changing/retrieving a password 336 and deleting users 338. In one embodiment, these processes may be invoked by a user of a network device 30 through a web page interface or via the interface of another application.

In an alternate embodiment, the "new user" batch process 334 invokes the EK record manager 350 to create a plurality of EK records simultaneously. The batch process includes receiving, at the KES 10, a batch of input data consisting of information for a plurality of users. The batch process creates new users and generates batch output data, including the user ID, the temporary password, and the serial number 22, as well as information from the batch of input data (e.g., an e-mail address or a mailing address) that will assist in disseminating registration data to the newly registered users.

In one embodiment of a "new user" batch process 334, a single user account table 402 is created for a system administrator user, and the batch process creates a plurality of EK records 406. Each EK record corresponds to a person or entity, and each EK record 406 may contain authentication criteria. A user may access the contents of a single EK record 406 within an account 402 by submitting authentication criteria for the EK record 406. In one embodiment, a batch process accesses a directory service (e.g., LDAP, X.500, Active Directory) to retrieve the criteria for generating EK records 406 (e.g., name, email address, etc.). In one embodiment, private keys may only be accessed by the system administrator user.

The EK record manager 350 verifies the serial number 353 for each EK record. In one embodiment, the serial number verifier 353 ensures that the serial number is unique within the KES 10. In an alternate embodiment, the serial number verifier ensures that a serial number is unique throughout a plurality of namespaces (i.e., multiple providers providing the same service) so that end users do not need to add a namespace prefix to a serial number. The EK record manager 350 creates a new record 351 to link the user ID and the EK record's serial number 404 (FIG. 9*a*), and access the certificate authority and encryption key generator 395 to generate keys. Invalid batch data can be logged and returned in a report. The batch input and output data could come from a file, a database, a network, a directory service (e.g., Lightweight Directory Access Protocol (LDAP) or Active Directory) or other source. In one embodiment, the batch registration process may also be used to verify an individual's identity (i.e., the identity of company employees typically involves background checks, etc.).

In one aspect of the present invention, a service level manager 385 provides an administrator of the KES 10 with the means to create, modify or remove service levels for particular classes of users, such as doctors, lawyers, depository institutions, government agencies, utilities, and retailers among other classes of users. A service level may contain a name of the service level, a description of the service level and an icon, logo, picture or other visual identifier that provides a visual means of identifying the service level. A service level may also contain an approval agreement (e.g., HIPAA, SOX, GLBA, EU Directive on Data Privacy) for use as approval criteria when establishing relationships between users. The service level manager 385 may also provide a means of adding a user to or removing a user from a service level, approving a user's request to be part of a service level, or revoking a user's approval to be part of a service level among other means of implementing and controlling membership in a service level, and transferring users between service levels. The service level manager 385 may also have a means of tracking the duration of a user's membership in a service level, and an automatic termination date, renewal date or key rotation date to facilitate revenue generation from membership in the service level. In one aspect of the present invention, the KES 10 is adapted to inform communication applications 520 requesting the EK records of an exclusive service level, as described herein, that a particular user is no longer a member of the exclusive service level.

In one aspect of the present invention the KES 10 provides a means of registering a user 100 with an exclusive service level function contained within the registration manager 330. Access to this feature may be restricted to system administrators of the KES 10, or alternatively may be made publicly available where a newly registered account that requests to join a restricted service level is subject to the approval of system administrators of the KES 10 using the service level manager.

In one aspect of the present invention, the EK record contains a service level identifier and is signed by the KES 10 to enable a network device 30 that has requested and received the EK record contents to ensure that the owner of the EK record belongs to a particular service level. In another aspect of the present invention, the request handler 370 of the KES 10 is adapted with a service level membership verifier function which verifies a user service level by looking up the user record via a particular key, key fingerprint, key serial number, personalized serial number 22 or other criteria to determine whether the user is a member of a particular service level. The EK record for a user of a particular service level may be extended to contain indicia such as an icon, logo, picture or other visual identifier, and preferably an auditory means of identifying the person, organization or entity associated to the EK record for use with anti-phishing embodiments of the present invention.

In one embodiment of the present invention, the KES 10 is further adapted to operate in conjunction with large-scale organizations that may prefer to store public encryption keys and demographic information within their local directory servers (e.g., Light-weight Directory Access Protocol (LDAP), Active Directory, etc.) in lieu of or in addition to storing the information on the KES 10 in EK records. This embodiment may operate in conjunction with the batch registration processes that select multiple serial numbers and EK records for one user account, modified such that registration selects a serial number, username and authentication criteria for making requests and approving requests by the person associated to the EK record, and a network address and authentication criteria for the corresponding information in the directory server such that the KES 10 may make requests of the directory server. In this embodiment, the user account may also contain a data cross-reference to map the attributes of the directory server to the corresponding fields of an EK record 406 such that a request for an EK record from a network device 30 that references information in a directory server may, upon authorization to receive the EK record 406, retrieve the corresponding information from the directory server and format a response where attributes from the directory server are mapped to the corresponding fields of an EK record 406 and the EK reply is constructed in a data format suitable for the requesting network device or communication application (i.e., extract, translate and load procedures).

Once a user completes the registration process and changes the assigned temporary password, the EK record may be published, which makes it possible for network devices 32 to request the EK record. Next, the user may set permissions 354 for the EK record, which makes it possible for the user to deliberately authorize or refuse each request for the EK record, or to automatically approve or reject requests.

Figure 8D:
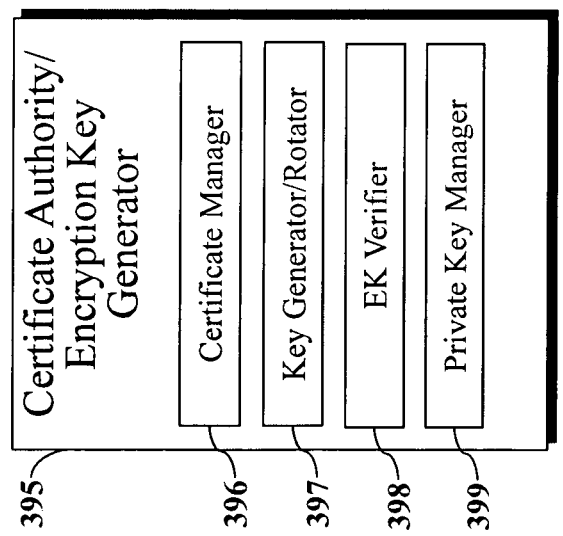

In one embodiment of the present invention, an EK record is adapted to enable the user to store at least one encryption key generated by other applications or third parties through the certificate authority and encryption key generator 395. Referring to FIG. 8*d*, the encryption key generator 395 contains functions to manage certificates 396; generate encryption keys 397, including automatically generating and updating EK records periodically (i.e., key rotation); a means to verify encryption keys/certificates 398 used by a client application; and a private key manager 399 for encrypting private keys with a symmetric cipher and passphrase and storing encrypted private keys in the database, and retrieving encrypted private keys either in their encrypted form or decrypted when a passphrase is provided. Encryption keys may also be stored with asymmetric ciphers, wherein part of the decrypting key remains with the service provider and another part of the decrypting key is transferred to the user (i.e., so called private key escrow). Each encryption key may have metadata attributes describing the encryption algorithm; whether the key is symmetric or asymmetric; its generated and expiration dates; its fingerprint or hash; its key ID and or serial number; and, the communication addresses that are configured to use the key (e.g., email addresses, telephone numbers, etc.) as part of the encryption key use restrictions/ policies among other attributes (i.e., attributes supported by leading cryptographic solutions).

In another embodiment, the KES 10 is adapted to generate encryption keys using well known encryption algorithms with the certificate authority and encryption key generator 395. The KES 10 may generate self-signed encryption keys; may invoke the services of a third party Certificate Authority (CA) using web services, remote method invocation or other techniques to generate the keys; or, the KES 10 may be adapted to serve as its own CA.

In one embodiment, asymmetric encryption and digital certificate technologies are extended as follows: a root certificate is generated; the root certificate generates certificates with a "delegation of authority" policy that enables them to further generate certificates. A certificate authority is adapted and extended to identify the type of person, organization, or entity that the generated certificate may identify (e.g., a depository institution). In another embodiment, "delegation of authority" policies enable the delegate to further specialize the classification with sub-classifications (e.g., a depository institution, a nationally chartered bank; a depository institution, a state-charted savings bank, etc.). As a matter of policy, the certificate authority or the person, organization or entity that has been delegated the authority to generate keys will only generate public/private encryption key pairs for persons, organizations, or entities that are of the type classified or sub-classified by the certificate. A certificate may also be generated such that the identified organization may generate a plurality of public/private key pairs for each person, organization or entity affiliated with the identified organization. In an alternate embodiment, each root certificate only generates keys for a particular class of users. In another embodiment, the certificate may have more than one classification/sub-classification scheme (e.g., a nationally chartered bank; a Fortune 500 company). Classification criteria may also include qualifications such as publicly-traded companies, companies with revenues in excess of a certain value. An ordinary person skilled in the art will appreciate that identifying classes of users is important, because most phishing attacks target specific types of institutions, such as depository institutions or institutions that facilitate financial transactions. While it is easy and relatively inexpensive to purchase a shelf corporation and an enhanced verification SSL certificate as part of a phishing scheme, it is very difficult to achieve strong revenues or to become a publicly traded firm, a depository institution, or a licensed professional.

The delete user process 338 includes both single delete and batch delete capabilities. In one embodiment, a large entity such as a mobile telephone provider or Internet Service Provider (ISP) offers access to the KES 10 as a value-added service bundled with other offerings. The batch delete would be used by large entities when access to the system changes on a regular basis and may be part of standard integration of the key exchange service to the large entity. In another embodiment, an individual user deletes his or her registration, which is consistent with the EU Directive on Data Privacy or HIPAA that requires that a subject has the right to request the removal of his or her information from a third party server.

In another embodiment, an "existing user" batch process invokes the EK record manager 350 to update a plurality of EK records simultaneously. The batch process includes receiving, at the KES 10, a batch of input data consisting of encryption key information for a plurality of users. The batch process provides a user ID, one or more serial numbers and updated information for each serial number. Using the user ID and serial numbers, the batch process selectively retrieves an EK record associated to a serial number via the Manage EK 352 function; then, updates the EK record with updated data and saves the record. A person having ordinary skill in the art will appreciate that batch processes for registering users (and deleting users), and creating, updating and deleting EK records may reduce the effort associated with updating a plurality of users simultaneously, such as the employees of a large corporation or the users of a third party service such as an Internet Service Provider (ISP) or a wireless network.

The EK record manager 350 includes program logic for creating a new EK record 351, managing EK records 352, verifying serial numbers 353, and managing EK record access permissions 354 such as making an EK record available for search and request, and setting request approval criteria. In one embodiment, the logic for verifying serial numbers 353 includes a pattern recognition algorithm to filter out serial numbers including offensive or otherwise undesirable sequences of digits. An EK event manager 355 tracks EK record manager activity 350 and may be configured to invoke additional event-driven processes. A search index manager 356 parses an EK record and transforms it into a format suitable for a search engine or index engine. An identity verification 357 function enables the EK record manager to invoke third party services to verify the identity of the owner of an EK record. A signature generator 358 enables a user via the EK record manager to sign a digital work by submitting the digital work, the serial number as the public identity-based encryption key, and a passphrase over a secure connection to access a private key associated to the input serial number 22; then, encrypt the contents of the digital work using the identity based encryption algorithm, and provide the SN 22 as the corresponding public key to verify the work. An ordinary person skilled in the art will appreciate that digital works such as a "terms of service" document on a web-based registration form may be signed by the registrant when the registration form is adapted to submit the work to the KES 10's signature generator 358. In one embodiment, composite application technologies are used for submitting the digital work for signing and for verification. For a general discussion of identity based encryption, refer to *Introduction to Identity-Based Encryption*, by Luther Martin, Artech House 2008. In one embodiment, the user may provide encryption key information through the EK record manager 350 which stores the encryption key information in the data storage 18 via the database server 310. Encryption key information may be input and updated through the user interface of a network device 30, including a web page interface when using third party encryption systems. Alternatively, the KES 10 is adapted to generated new or updated keys. The KES 10 may also be adapted to revoke keys, and to provide revocation notification via CRL lists or verify keys via an OCSP interface. The record manager 350 also contains functions to set EK restrictions and policies 359, and a communication list updater 360.

The permissions process 354 restricts access of users and network devices to particular EK records. When an EK record is published, the encryption key information may be made available for retrieval by any user who enters the corresponding serial number 22. Through the permissions feature 354 and the approval processor 374, a user may manually approve each request for the user's encryption key information, automatically approve each request, or establish rule-based conditions for approving access to the data or a subset of the data. For example, the user can deny the provision of encryption key information to anonymous requesters. Referring back to FIG. 1, when User B requests User A's EK record, the system can generate a response to User A indicating that it is awaiting approval from User A to release the requested information to User B. This would spawn follow-up requests for the record (if approved), a refusal message (if the request is rejected), or a "still waiting" message.

The EK request handler 370 includes device registration 371 for uniquely identifying each network device 30-32 that communicates with the KES 10; a search processor 372 for processing search requests and generating search results (FIG. 6a-6c); a request processor 373 for processing encryption key request and replies (FIG. 7a-7d), generating request logs 418 and requestee logs 420 (or Link 426 record), and invoking the request processor 373 as needed; an approval processor 374 for managing the approval process of a request, including notifying users, generating approval records 424 (FIG. 9b), and providing replies; a digest generator 375 for signing EK replies (FIG. 7b); a namespace redirect 376 for looking up different namespaces 412 (FIG. 9a) and rerouting requests for records located within different servers; and a data mask manager 378 for selectively restricting access to attributes within EK records. The request handler also provides a communication list request processor 379 for network devices associated to exclusive service levels.

The KES 10 or its functionality may operate as a standalone service, be embedded in a portal or web-based email service, or incorporated into the functionality of a social network among other methods of deployment.

Key Exchange Embodiments

The KES 10 as described provides services similar to prior art solutions (e.g., OpenPGP), but an ordinary person skilled in the art may appreciate the following improvements: a personalized identifier to be used as a proxy for exchanging encryption keys physically; an authenticated user session; the ability to establish relationships among users; a secure network connection for sending and receiving encryption keys between network devices 30 and 32 and the KES 10; the ability to revoke keys; the ability to generate new keys and re-distribute them on a periodic basis (i.e., key rotation); and the ability of users to request and approve requests for encryption keys. The KES 10 described herein enables additional novel and non-obvious methods of key exchange, and stronger means of authenticating persons and entities.

In one embodiment, the KES 10 generates a certificate for a user, the certificate capable of being used by a network device or its communication application to generate encryption key pairs. In one embodiment, the certificate includes a service level or a classification of the type of user. In another embodiment, the certificate indicates that the user was strongly authenticated. In one embodiment, the certificate is retrieved from the KES 10 by a network device 30 and the certificate is automatically configured for use with the key generation functionality 548 of the network device or its communication application. In one embodiment, the KES 10 is adapted to operate as a certificate authority to verify the encryption keys generated by network devices using the certificate.

In one embodiment, a user, via a network device, generates a pair of public-private encryption keys (i.e., in a manner similar to OpenPGP) using its key generation functionality 548. The public key is transferred from the network device via the network using a secure connection to the KES 10, where it is stored in the user's EK record 406. The private key may be stored on the network device. Prior to storing the private key, the private key may be encrypted with a symmetric cipher and passphrase. In one embodiment, a private key generated by the network device 30 and encrypted with a symmetric cipher and passphrase is transmitted to the KES 10 via a secure connection and stored in a private key table 432 associated to the EK record 406, Link record 426 or Link EK record 427 so that it may be retrieved in an EK reply by the network device 30 or another network device 32 associated to the user. An ordinary person skilled in the art will appreciate that the present invention enables approval of requests for encryption keys and secure communication sessions for transmitting encryption keys.

In one embodiment, the KES 10 is adapted to facilitate the exchange of PKI key pairs for the exclusive use of each party to a bi-lateral Link record 426 relationship. In one embodiment, each party has a Link record 426, which is adapted with a unique link ID. Each party has a Link EK record 427 for storing an encryption key associated to a Link record 426. Each Link EK record 427 stores one of the PKI encryption keys, preferably a communication address that can use the encryption key, policies and restrictions for using the encryption key, an encryption key ID, and the ID of the associated link (e.g., an SQL foreign key). An ordinary person skilled in the art will appreciate that each relationship may support a plurality of Link EK records 427 for different purposes (e.g., for multiple communication addresses, different types of communication systems such as email or VoIP, SIP, etc.).

In one embodiment, generating and distributing encryption keys includes generating a key ID to facilitate key rotation (e.g., when each party has more than one key from another party). In one embodiment, generating encryption keys by the network device 32 key generation functionality 548 or the KES 10 key generation functionality 395 includes generating unique key IDs which may be stored with the encryption key information or in a separate field within EK records 406 or Link EK records 427. The key ID may also be stored with its corresponding key (e.g., the key ID of a public key may be stored with a private key, and the ID of the private key may be stored with the public key). The key ID may be utilized during key rotation invoked by the key rotation module 552 on the network device or the key rotator 397 on the KES 10 so that the newly generated key will replace an older pre-existing key identified by the key ID. When a network device retrieves an encryption key from the KES 10 via an EK reply (FIG. 7b), the EK record data fields contain the encryption key and its corresponding key ID. The key ID may be stored in the network device database record 560 when mapping the EK reply to the database 564, or in the cross reference file in a separate field 562 (FIG. 12a) such that the key may be retrieved during key rotation and synchronization operations.

In one embodiment for exchanging encryption keys, the KES 10 is adapted to generate PKI keys for each bi-lateral relationship. The encryption key generator 395 generates PKI encryption key pairs when two users establish a bi-lateral relationship on the KES 10 (e.g., using Link records 426). In one embodiment, the key pair is generated at the KES 10 key generation functionality 395 and each encryption key is stored in the data storage 400 immediately after the relationship is established and remains in the respective Link EK records 427 until they are retrieved by the network devices of the corresponding parties. In one embodiment, retrieval of an encryption key by the network device of the corresponding party removes the encryption key from its Link EK record 427. In an alternate embodiment, the party has the option of storing a copy of the encryption key in the Link EK record 427, preferably encrypted by a symmetric cipher and passphrase. An ordinary person skilled in the art will appreciate that one benefit of centrally generated keys is that users may facilitate requests using composite application methods irrespective of whether the network device or application making the request has key generation or encryption/decryption capabilities (e.g., a social network, an online bank application). The present invention via "request-replication" synchronization can facilitate the subsequent distribution of keys to network devices that support encryption and decryption modules.

The network devices 30 and 32 associated to User A and User B may retrieve via a secure connection (e.g., SSL/TLS) encryption keys in the manner illustrated in FIG. 12a, wherein the system is modified to retrieve a key from an EK record 406 (e.g., a public key), Link record 426, or Link EK record 427. The KES 10 is adapted to retrieve at least one key from a record containing an encryption key and provide the at least one key in an EK reply (FIG. 7b). An ordinary person skilled in the art will appreciate that an encryption key request (FIG. 7a) may result in an encryption key reply (FIG. 7b) that contains the corresponding party's key (e.g., a public key from the EK record 406), or the corresponding key generated exclusively for the use of the requester (e.g., from the Link EK 427). An EK Reply Container (FIG. 7c) may contain multiple EK Reply records, each with encryption key information. One advantage of the present invention is that a request for a public key may be subject to the key owner's approval, and is transmitted over a secure connection. Another advantage of the present invention is that a key pair that is generated for the exclusive use of the two parties improves security.

In one embodiment, when a network device makes an EK request to establish a relationship between two users of the KES 10, the network device of the requesting party generates a key pair using its key generation functionality 548. The encryption key generated for the exclusive use of the party receiving the request is transferred via the EK request (FIG. 7a) from the network device through the network using a secure connection to the KES 10. In one embodiment, a request type indicates that the request includes a key for the exclusive use of the party receiving the request, and the request handler 370 establishes a Link record 426 and a Link EK record 427. The key is stored in a Link EK record 427 in the data storage 400 until it is retrieved by the network device of the corresponding party.

In one embodiment, a relationship is established such that the network devices 30 and 32 of both users generate key pairs for the exclusive use of the two parties. The first key pair is generated by the requester's network device 30 when making a request to the KES 10 to establish a relationship. The request contains an encryption key for the exclusive use of the party receiving the request. The second key pair is generated by the network device 32 of the party notified by the KES 10 about the request. The key generation occurs when approving the request received from the requesting party. The key generated for the exclusive use of the party who made the request is transmitted from the network device 32 to the KES 10, and stored in a Link EK 427 until it is retrieved by the network device 30 of the user that requested the relationship. An ordinary person skilled in the art will appreciate that each party may encrypt their communications using the key generated and retained by their network device, and the KES 10 does not retain a copy of the key used to send a communication. Neither party can purport to represent themselves as the other party by utilizing a key generated for the other party (e.g., sending a message encrypted by a key, wherein the encryption key was intended to be used only by the other party; access to the encryption key having been gained by generating it on one's own network device).

In one embodiment, a relationship is established between two users, and each party retrieves a public encryption key from the EK record 406 of the corresponding party (i.e., subject to the improvements of approving the request for encryption keys, and secure transmission of the keys). Each party may then subsequently generate a pair of encryption keys for the exclusive use of the two parties as described, but with this difference: when the exclusive encryption key for the corresponding party is transmitted from the network device to the KES 10, it is first encrypted with the corresponding party's public key. When the other party retrieves the encrypted key from the KES 10, the network device may decrypt it with the corresponding private key before it is configured for use. An ordinary person skilled in the art will appreciate even though the exclusive encryption key may be transmitted securely (e.g., SSL/TLS), some users of encryption technologies may not trust a key exchange facilitator such as the KES 10 with an unencrypted key—even temporarily.

An ordinary person skilled in the art will appreciate that key pairs generated exclusively for the two parties provides several advantages. For example, each user may sign/encrypt and verify/decrypt a communication using the same key. One advantage is that a single key pair facilitates signing, message integrity, and encryption/decryption. Receipt of a communication signed and encrypted with a key in possession of the other party could only have come from the other party. Another advantage of this embodiment is that when parties use key pairs generated exclusively for the use of the two parties instead of using public keys, only communications between the two parties can be breached if a cryptographic adversary cracks the encryption key; by contrast, if a public key is breached, the communications of all parties using the public key are compromised. In one embodiment, one party pays a fee to generate the exclusive encryption key pair, and the other party gains use of the key free of charge. An ordinary person skilled in the art will appreciate that regulated persons such as financial institutions and healthcare providers are more incented to incur a cost in order to comply with regulations and to streamline the signup process for individuals with whom they must communicate in a secure manner.

In one embodiment, the KES 10, the network devices 30 and 32 and their corresponding communication applications 520 are adapted to facilitate the generation and exchange of one-time pads. The key generation functionality of the network device 548 is adapted to generate a onetime pad for a particular communication using the well-known methods for generating a onetime pad (e.g., the key must be at least as long as the communication, generated by a truly random number source such as thermal noise, and used only once). The encrypting/signing modules 534 and the decrypting/verifying modules 536 are further adapted to support onetime pad encryption and decryption. Once a relationship is established on the KES 10 between two users, and each party has retrieved at least one encryption key for sending an encrypted communication to the other party, the parties may send and receive communications using onetime pads. When the communication sender wishes to send a communication 24 encrypted via a onetime pad, the encrypting/signing module 534 retrieves an encryption key for the recipient from the key ring manager 528 and invokes the generation of a onetime pad 548 for the communication 24 prior to sending it to the recipient. The encrypting/signing module 534 encrypts the communication with the onetime pad, and the communication is sent to the recipient. The encrypting/signing module 534 encrypts the onetime pad using the encryption key retrieved from the key ring manager 528; then, the communication application 520 is further adapted to send the encrypted onetime pad to the KES 10 via a secure connection (e.g., SSL/TLS), where it is stored in a Link EK 427 until it is retrieved by the network device of the communication recipient (i.e., there is no option for long-term storage). Upon receipt of the communication encrypted by the onetime pad, the network device may retrieve the encrypted onetime pad from the KES 10, and the decrypting/verifying module 536 may decrypt the encrypted onetime pad using the corresponding encryption key (e.g., the private key, or corresponding key from the exclusive key pair). Finally, the decrypting/verifying module 536 may decrypt the communication using the onetime pad. An ordinary person skilled in the art will appreciate that onetime pads are theoretically unbreakable. Encrypting the onetime pad with a PKI key and sending it to the KES 10 over a secure connections (e.g., SSL/TLS) is an effective means of transmitting a onetime pad—i.e., the only way to crack the encrypted communication is to retrieve the onetime pad itself such as by gaining access to the encrypting/verifying module, intercepting the encrypted onetime pad by cracking the SSL/TLS connection or hacking into the KES 10 to retrieve the encrypted onetime pad; then, cracking the PKI encryption to yield the onetime pad).

Network Device

Figure 11A:
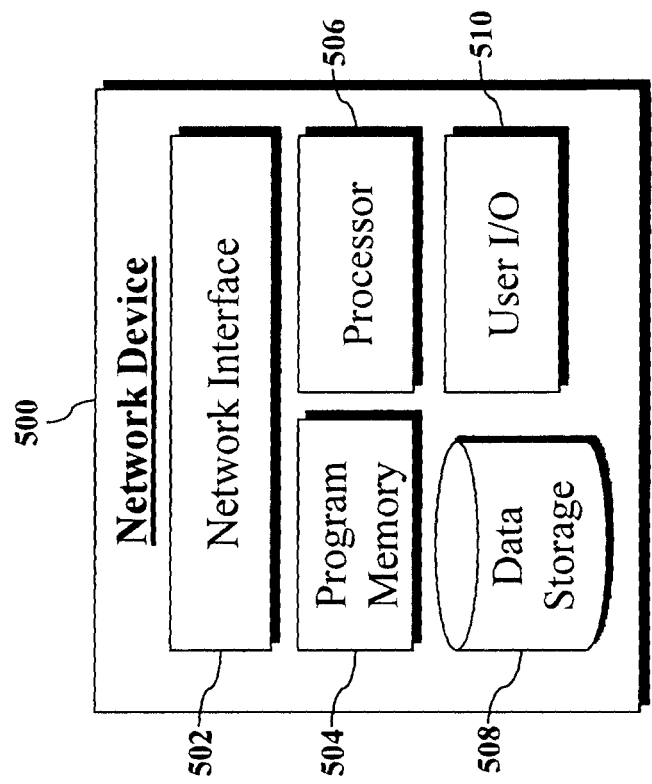
FIG. 11a illustrates an exemplary network device as utilized with the KES of the present invention.

An exemplary network device 500 is illustrated in FIG. 11a. The network device 500 may be any device adapted to communicate with the KES 10, such as a personal computer, a personal digital assistant (PDA), a wireless phone, a VoIP phone, a router or hub, a Session Initiation Protocol (SIP) module or another type of network-enabled device. The network device 500 includes a network interface 502, providing access to the KES 10 through the network, a program memory 504 and processor 506 for controlling the network device 500, a data storage 508 and a user input/output mechanism 510, such as a display and keyboard.

Referring to FIGS. 11a-11e, the program memory 504 includes a communication application 520 which includes, or is enhanced with, KES information 522 (i.e., network addresses) and login information 524, which enable the communication application 520 to access the KES 10. A serial number validation function 526 checks the validity of a serial number format entered by a user. In the exemplary embodiment, the serial number validation function 526 verifies that the error detection code appended to a serial number 22 is accurate. A key ring manager function 528 provides an interface allowing a user or other application components to add, edit, delete and view a plurality of EK records with at least one encryption key ring accessible by encryption/decryption functionality. An EK request manager 530 enables a user or other application components to request EK records from the KES 10. The EK request manager 530 retrieves the network address of the KES 10 from the KES information 522, generates an EK request message and transmits the message to the KES 10 via the network device's network interface 502, the network 20, and the KES's 10 network interface 302. In one embodiment, the EK request manager can make a plurality of requests in one network call (e.g., HTTP Post) by adding each EK Request to an EK Request Container (FIG. 7d), and the request processor 373 of the request handler 370 on the KES 10 is adapted to process each EK Request within the EK Request Container. An EK cross reference function 532 maintains a cross reference table 562 mapping the serial numbers of retrieved EK records to the keys stored by the network device. In one embodiment, an EK Request results in a persistent relationship between the person making the request and the person whose information is requested. In another embodiment, a request may be for the EK records of all users associated to an exclusive service level, and the request is automatically approved and does not result in a persistent relationship between requester and the users associated to the requested service level. An ordinary person skilled in the art will appreciate that a user via the network device may request an encryption key by entering a serial number 22, and the network may receive an encryption key as requested or offered, and configure the encryption key for use without the user having to know anything about encryption technology.

The encrypting/signing module 534 is any logic that enables the user of the communication application to sign and/or encrypt a communication with an encryption key and/or signing key. The communication application 520 may be adapted to provide the encrypting/signing module 534 functionality, or adapted to enable the present invention to interact with the encrypting/signing functionality of the communication application or a another application on the network device 30. The encrypting/signing module 534 retrieves encryption keys via the key ring manager function 528.

The decrypting/verifying module 536 is any logic that enables the user of the communication application to verify and/or decrypt a communication with a public key and/or private key. In one embodiment, the decrypting/verifying module 536 may also invoke a verify service level 538 function and invoke the presentation of a sender verification panel 950 when a communication is verified. The communication application 520 may be adapted to provide the decrypting/verifying module 536 functionality, or adapted to enable the present invention to interact with the decrypting/verifying functionality of the communication application or another application on the network device 30. The decrypting/verifying module retrieves encryption keys via the key ring manager function 528.

An important aspect of the present invention is to identify particular classes of persons, organizations or entities during the process of decrypting a signed communication 24. The communication application 520 is adapted to provide a verify service level 538 function such that the communication application, upon receiving a signed communication 24 may identify the key required to decrypt the communication 24, and associate the key to a particular user of the KES 10. The KES 10 may be adapted via the service level manager 385 and/or the registration manager 330 to provide a similar 'verify service level' function. The communication 24 may contain unique identifiers such as a serial number 22, a "from" communication address (e.g., an email address, a phone number of the person initiating a call or another unique identifier) that enables the communication application 520 to rapidly associate the sender of a communication with a user of the KES 10. Then, the communication application 520 verifies the service level using the verify service level 538 function either by retrieving and validating the service level field (FIG. 12a) in the local copy of the EK record, or by sending a request to the KES 10 to invoke the verify service level 538 function, the request providing a serial number, the key, a fingerprint of the key or some other validating criteria; and, the reply indicating whether the user is a member of the service level. To prevent 'spoofing,' EK reply can be validated with its message digest 566 (i.e., digests are generated by the KES 10's digest generator 375 for the EK reply). Requests and replies are sent using an encrypted communication protocol such as SSL or TLS. An ordinary person skilled in the art will appreciate that when the communication application has an EK record with a validated message digest, the communication application can verify the service level without contacting the KES 10 (e.g., reducing network traffic, or 'offline' mode) or a certificate authority.

In other embodiments, any application on the network device providing encrypting/signing and/or decrypting/verifying modules may be adapted to identify when a key contains an attribute identifying a particular class of person, organization or entity associated with the key and may verify the service level by communicating with the certificate authority in the same manner as keys are validated with a certificate authority (CA) using SSL or TLS, the CA validating both the key and the type of person, organization or entity associated with the key. In another embodiment, an encryption key ring in an encryption/decryption application on the network device is adapted to identify when a key on the ring is accessed to decrypt a communication, the key ring containing only keys of particular classes of persons, organizations or entities, such as doctors, lawyers, depository institutions, government agencies, utilities, or retailers among other classes. An ordinary person skilled in the art will appreciate that fraud perpetrators may use legitimate businesses to commit fraud against other classes of business entity, such as a bank, a municipal corporation, etc. and may have valid certificates from a certificate authority. Certificates that can verify a class of a person, organization or entity may help a potential fraud victim to positively identify the type of entity they are communicating with electronically (e.g., if the certificate says "US bank," one infers that a communication purporting to be from a US bank is valid).

In one embodiment, a communication application 520 on a network device is further adapted with logic (FIG. 11b, 550) to retrieve a private key from the local data storage or from the KES 10. In one embodiment, receipt by the communication application of a communication 24 encrypted with the recipient's public key invokes a decryption process (FIG. 21a, 854), which requires the user's private key. The private key retriever (FIG. 11b, 550) logic may accesses the key ring manager 528 to retrieve the private key from the data storage 508, which is stored in encrypted form using a symmetric cipher and the user's passphrase (FIG. 11d, 570). In another embodiment, the private key retriever 550 logic may access the data storage directly. Upon retrieving the encrypted private key, the logic 550 is further adapted to request a passphrase for decrypting the encrypted private key data to retrieve the private key. Using the same cipher used to encrypt the private key, the private key retriever decrypts the encrypted private key. In another embodiment, the logic 550 requires the entry of a passphrase prior to retrieving a private key. In one embodiment, the logic 550 is adapted to retrieve a private key from the KES 10, the process of retrieving the private key requiring at least user authentication. In one embodiment, the KES 10 is adapted to retrieve the private key with a private key manager 399, which retrieves the encrypted private key data from the private key table 432 in the data storage 18 of the KES 10, and returns the result to the communication application, which decrypts the encrypted data using a passphrase and a symmetric cipher to yield the private key.

In one embodiment, the communication application 520 is adapted to generate PKI key pairs. In one embodiment, the private key is encrypted with a symmetric cipher and passphrase and stored in the private key table 570, and the public key is sent to the KES 10 and stored in an EK record associated to the user. An ordinary person skilled in the art will appreciate that in this embodiment, the KES 10 has no access to the private key.

In one embodiment, the communication application 520 is adapted to invoke a key rotation policy, such that it directs either the communication application or the KES 10 (and potentially the KES 10's third party CA) to generate PKI key pairs. In one embodiment, the key rotation module 552 invokes the EK generator 548 on the communication application 520. In another embodiment, the key rotation module 552 invokes the key generator/rotator 397 in the certificate authority/encryption key generator 395 of the KES 10. An ordinary person skilled in the art will appreciate that encryption keys may expire and need to be regenerated and redistributed securely on a regular basis. Some network devices may generate the keys locally and update the KES 10, and some network devices may request the KES 10 to generate the keys, update the EK record of the KES 10, and the network device retrieves the private key or the encrypted private key and stores it in the private key table 570.

In one embodiment, the communication application 520 is adapted with logic to update key policies on the KES 10. The key policy updater 554 logic retrieves the at least one communication address of the communication application 520; then, determines if a retrieved communication address may receive a signed and/or encrypted communication. In another embodiment, the key policy updater 554 logic is adapted to identify the communication application's type and capabilities (e.g., a web based email application, a desktop email application, an instant messenger, etc.). In another embodiment, the key policy updater is adapted to determine the preferred method of sending and receiving an encrypted communication (e.g., S/MIME, OpenPGP, etc.). The key policy updater 554 updates the EK record corresponding to the user on the KES 10. An ordinary person skilled in the art will appreciate that automating the key policy process to the extent possible reduces perceived complexity for users and enhances user adoption.

Synchronization, Updates, Backup & Key Rotation

In operation, a user may operate a plurality of network devices, and may need to have similar information on different devices. An ordinary person skilled in the art will appreciate that the present invention enables a novel and non-obvious form of synchronization that does not require extracting the contents of a network device database.

Figure 17:
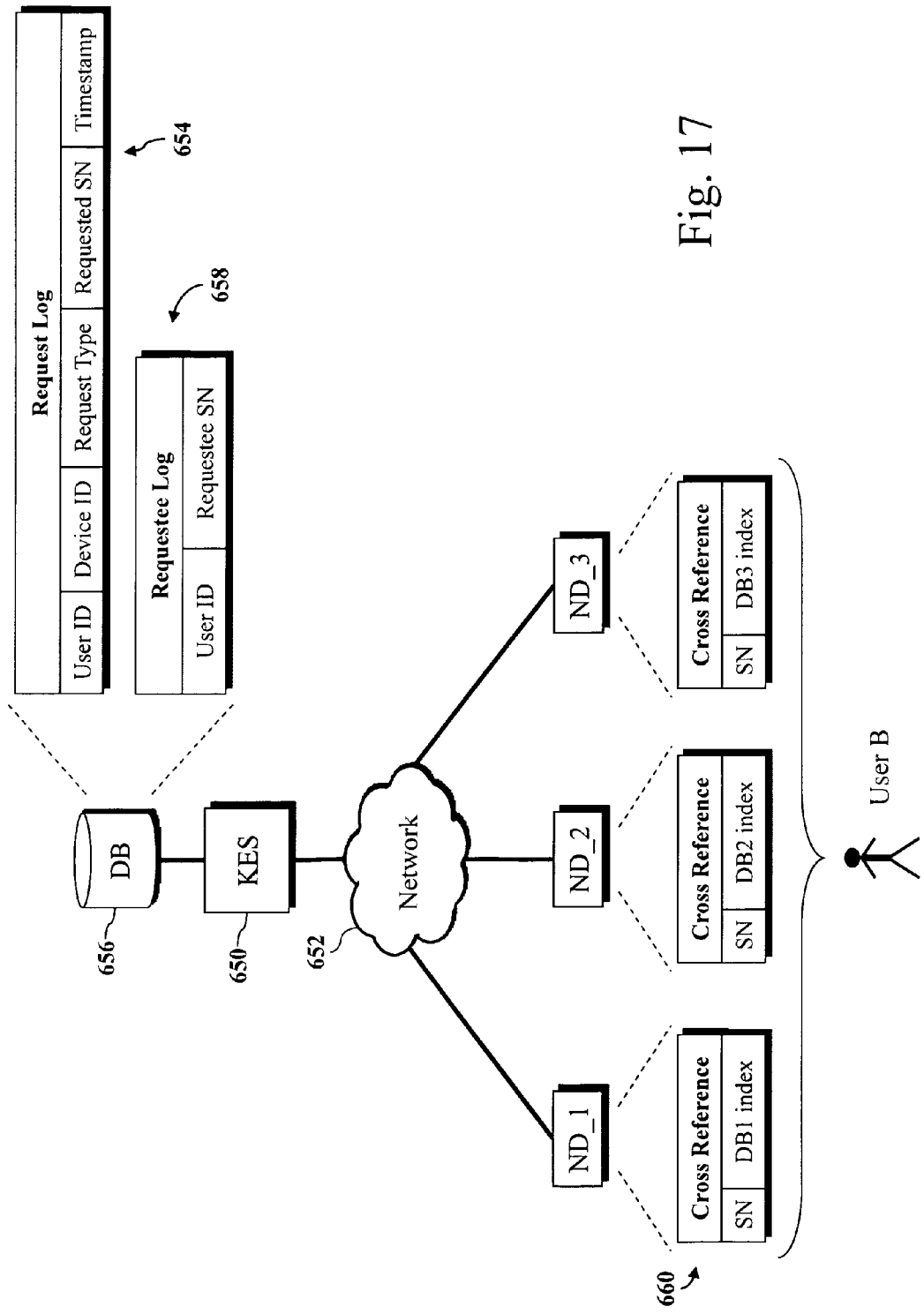
FIG. 17 illustrates an alternative embodiment of the KES and method of the present invention as used with multiple network devices of a user.

Referring to FIG. 17, in one embodiment, User B operates a plurality of network devices ND_1, ND_2 and ND_3, such as a personal computer, mobile phone, PDA device, enterprise application or network router. In operation, User B enters a serial number in a first network device ND_1, which transmits an EK request to a key exchange server (KES) 650 through a network 652. The KES 650 returns an EK reply to ND_1 including the requested encryption key information. The KES 650 also creates an entry in a request log 654 (or alternatively a link 426) in the database (DB) 656, logging the time the encryption key request from ND_1 was processed. ND_1 receives the requested EK record from the KES 650 and stores the received encryption key information locally in a memory or other data storage associated with the ND_1.

The request log 654 (or link table 426) tracks EK record requests and may include a user ID, a device ID, a request type, the requested serial number, and a timestamp for the request. The user ID uniquely identifies the requesting user and may include one of the user's personal serial numbers assigned by the KES 650, a login name or other identifier. The device ID uniquely identifies the requesting network device, and in one embodiment a unique identifier is provided in each copy of the network device software before it is deployed on a network device. The KES 650 may associate a request log with one of the requesting user's categories when the request log includes the serial number for the requesting user's EK record. In this manner, a user with more than one serial number, for example, a work serial number and a personal serial number, may manage the synchronization of separate EK lists. In an alternate embodiment, the request may contain a category attribute that enables the user to synchronize only a subset of the EK records requested by various devices (e.g., only synchronize EK records in the "work" category). In another embodiment, the request may contain a list of network device identifiers to synchronize only a subset of the EK records requested by various devices (e.g., only certain devices should synchronize the requested EK record). In another approach, the network device software requests a unique identifier from the KES 650. Alternatively, the MAC address associated with the network device hardware may be used. Identifying each device facilitates the synchronization of EK records across multiple devices. For example, if a person requests an EK record with one device, another network device can request the same record without additional user effort.

The request type includes a code identifying whether the received request is for a new EK record, an update to a previously requested EK record (e.g., an automated means of 'key rotation'), a request to delete an EK record associated with User B or other type of request. When User B requests User A's serial number, the EK record is received and may be inserted as a new record into User B's communication application database. User B may later re-request User A's serial number, in which case the EK record is received, the corresponding record in the network device data storage 508 is located and the stored encryption key information is updated with any changes. User B may also issue a request to delete User A's encryption key information, which causes the encryption key information record to be deleted from the communication application database. Each of these requests corresponds to common database functions that may be implemented in this manner.

Initially, the requested encryption key information (stored on ND_1) is not stored on network devices ND_2 and ND_3. User B may separately enter the serial number into the communication applications of ND_2 and ND_3 to retrieve the encryption key information from the KES 650. In one embodiment, the network devices ND_1, ND_2 and ND_3 include a synchronization process that is automatically invoked when the respective network devices have made an EK request to the KES 650. The network devices may also be configured to periodically (e.g., daily, weekly, monthly, etc.) invoke the synchronization process to regularly check for updates, or to operate in conjunction with the key rotation module 552 to remove expired keys and update them with newly generated keys. Further, it is contemplated that a user may manually invoke the synchronization process through the communication application when desired.

The request log 654 (or link) enables User B to initiate a synchronization request to the KES 650 from a network device to download new encryption key information, remove deleted encryption key information and update modified encryption key information. In this manner, User B is not required to reenter serial numbers 22 into each device. In one embodiment, the log's timestamp is used to limit synchronization to records that have been added, updated or deleted since the device's last synchronization request. The network device may be identified through a device ID and the request log stores the timestamp of the last synchronization for each device ID.

Figure 19:
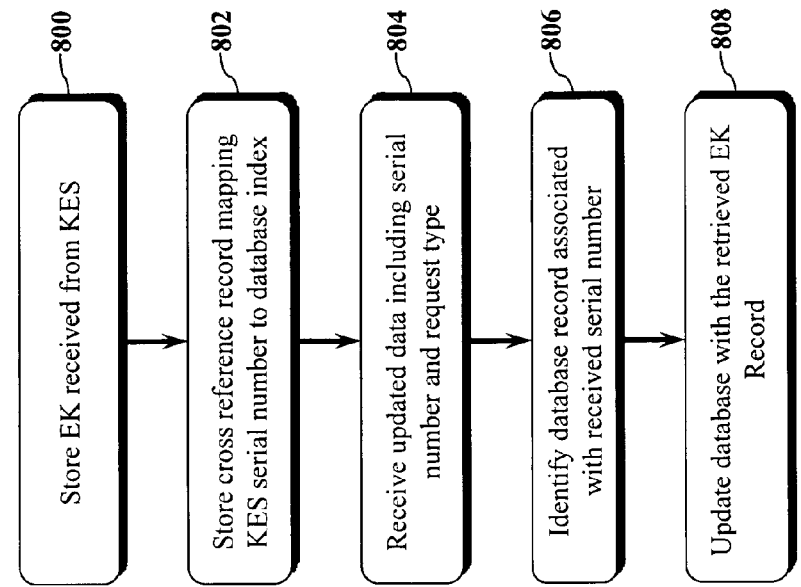
FIGS. 18 and 19 illustrate a synchronization and update process of the present invention.
Figure 18:
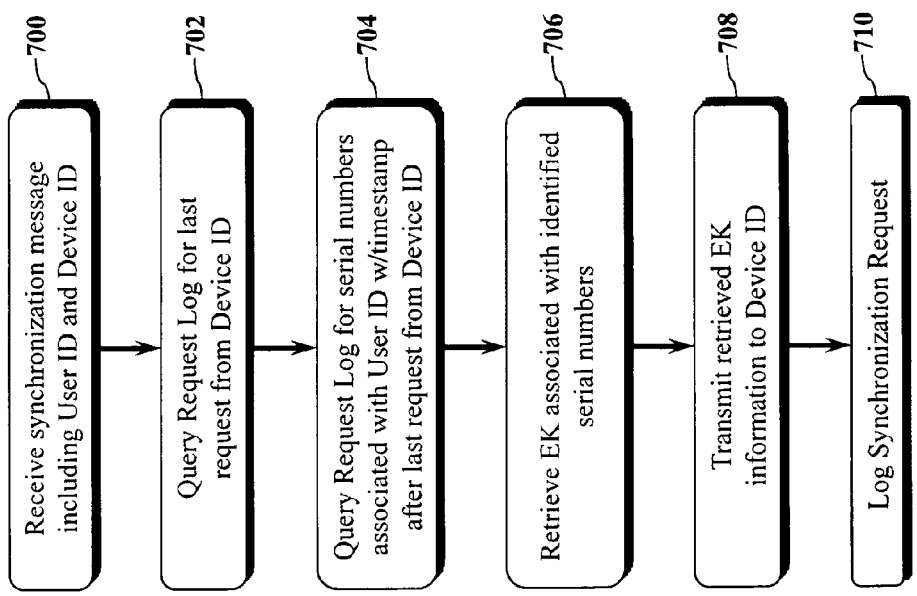

Referring to FIGS. 18 & 19, the synchronization process will be described. When the synchronization process is invoked, a synchronization request message, including the user ID and device ID, is transmitted from the ND_2 to the KES 650. In one embodiment, the request message may include a serial number associated to an EK record of the requesting user or a category. The KES 650 receives the request in step 700 and queries the Request Log 654 to find the last time that ND_2 contacted the KES 650 in step 702. In step 704, the KES 650 retrieves all the request types and serial numbers from the request log entries associated with requests by User B subsequent to ND_2's last communication with the KES 650, which may be measured by a timestamp field in each entry or some other serial field. In step 706, the KES 650 retrieves the encryption key information for each serial number (not needed for request type "delete") and generates encryption key reply messages to transmit the encryption key information to ND_2 in step 708. In this case, since User B entered User A's serial number in ND_1, there is a request log entry for User A's serial number. When ND_2 transmits a synchronization request, it receives User A's serial number and encryption key information from the CSR 650 in the reply. Finally, in step 710, the synchronization request from ND_2 is added to the Request Log 654, along with a current timestamp.

The network device ND_2 updates the encryption key information stored on ND_2 in accordance with the received request type. In the exemplary embodiment, a serial number/database record cross-reference table facilitates the update of EK records. An embodiment of an update process with a cross-reference table will now be described with reference to FIG. 19. When User B enters a serial number into the communication application of a network device, a request is transmitted to the KES 650, which returns associated encryption key information. A new EK record is created in the local encryption key information database and the received encryption key information is stored (step 800). When a new EK record is created, the communication application assigns a local record identifier (or database index), which is stored as part of the record. In step 802, an entry in a cross-reference database 660 is added, mapping the local record identifier to the serial number associated with the encryption key information.

The cross reference table allows the communication application 520 to update EK records 560 on the network device 30 with information stored at the KES 650. For example, a single EK record stored on ND_1 can be updated by querying the cross-reference table for the associated local record identifier, identifying the associated serial number and specifying the serial number in an update request transmitted to the KES 650. In step 804, encryption key information is received from the KES 650, and the serial number is used to retrieve the local record identifier from the cross-reference table in step 806. Next, in step 808, the EK record associated with that local record identifier is retrieved from the communication application. The EK record stored on the network device may then be updated with new information (or deleted as required).

The EK records are updated according to the received "request type" associated with the encryption key information. Request types include "new record," "update" and "delete" (among other possible request types). When a network device ND_3 synchronizes its encryption key information with the KES 650, a "delete" request from ND_1 will be invoked, and during synchronization the encryption key reply to ND_3 will have a "reply type" of "delete" and the associated serial number. The EK record associated with the received serial number is then deleted from the encryption key information database and the cross-reference database.

In one embodiment, when records are added and then subsequently deleted before synchronization can take place, program logic at the KES does not include the records in the replies to avoid unnecessary work by the network device. In another embodiment, the KES further includes an approval log so that synchronization requests do not require User B to approve subsequent requests for every single network device that User A uses. For example, if User A has the serial number of User B, User B may have the option to disallow subsequent requests or updates from User A by removing User A from the Requestee log until User B approves the request subsequently.

An exemplary encryption key reply data structure is illustrated in FIGS. 7b and 7c. An encryption key reply message includes a reply type, serial number and encryption key information fields. A plurality of updates may occur between sessions and the reply message may have more than one encryption key reply. To accommodate multiple EK records in a reply message, an encryption key reply container includes at least one encryption key reply message and facilitates the transmission of reply messages as a batch. A single encryption key reply container may include reply messages having different types, such as an EK record or a message to the user (e.g., "awaiting approval").

In one embodiment, when sending a reply message to the network device, the message is encrypted in a common encryption protocol such as SSL/TLS. Using encryption for messaging and storage makes it more difficult for unauthorized users of the KES to gain access to information by eavesdropping packet-switched network connections.

Referring back to FIG. 17, in one embodiment a requestee log 658 is used to track and control access to user records. When User B requests User A's encryption key information, for example, a new record is added to the requestee log 658 that indicates that User B has User A's encryption key information. An alternate embodiment may use a 'link' record 426. As illustrated, the "user's serial number" is the serial number for User A and serves as a primary key in the database, and the "requestee serial number" is the serial number for User B. When User A makes a change to his or her EK record, the key manager sends an internal update to each user linked to User A through the requestee log or link record. The internal updates may be maintained in a database table such as that illustrated in FIG. 9a item 422 or the link record's 'updated date' attribute. Where an internal update table is used, records are retrieved as part of the user's synchronization and converted to an entry in the request log to be downloaded the next time User B accesses the KES 650.

In another embodiment, a new device (e.g., ND_4) registers with the KES 650. Since it is a new device, there are no previous requests; thus, the synchronization process will retrieve all previously requested serial numbers and populate the new device with EK records. In an alternate embodiment, by specifying a new type of request such as "restore," the KES 650 may be adapted to override the timestamp of the last synchronization for the device, and thereby retrieve all previously requested serial numbers to update and repopulate the device. An ordinary person skilled in the art will appreciate that the KES 650 provides a means of backing up requests such that new devices, or devices that have malfunctioned may retrieve all EK records associated to the user's account.

In one embodiment, the network device is adapted to ensure that the 'request replication' method of synchronization does not conflict with traditional methods of synchronization (e.g., the SyncML standard) that may operate concurrently. Prior to initiating a 'request replication' synchronization request, the network device searches each EK record in a communication application that does not have a corresponding entry in the cross-reference record to determine if the record contains a serial number and/or other digest information. If the network device finds a records that contains information generated by the KES 10 (e.g., a serial number or digest), the network device may infer that the record corresponds to a records in the KES 10. The network device may then create an entry in the cross-reference record to prevent the synchronization process from creating a duplicate record.

An ordinary person skilled in the art will appreciate that the synchronization process described herein does not require retrieving and uploading the network device data storage, nor does it require coordination between two different devices. In fact, network devices can synchronize with the KES completely independently of each other.

Communication Header Attributes

Referring to FIG. 16, a communication header, such as an email message, typically contains a message header with attributes indicating the sender and recipient communication addresses, a subject, a communication address for sending a reply and other attributes.

In one embodiment, a communication application 520 in receipt of a communication 24 is adapted to detect the type of communication application that sent the communication by accessing a header attribute (e.g., SMTP X-Mailer), and the communication application may associate the sender communication address with a type of communication application (e.g., Microsoft Outlook) and store it in the communication application data storage or send it to the user account on the KES 10 where it is stored in the KES 10 data storage. In another embodiment, the KES 10 contains a list of application types that are compatible for use with the KES 10. A communication application 520 or the KES 10 may match a communication-address/communication-application-type pair to determine if the prospective invitee uses an application compatible with the KES 10. The communication application 520 may use this determination to send an encrypted communication to a non-user with instructions on how to decrypt the communication (i.e., sign up and download an appropriate plug-in module).

In one embodiment, a communication application 520 adds the type of plug-in, network device, or other mode of operation 680 the communication application uses to communicate with the KES 10. The communication application 520 of the communication recipient may use the attribute to determine if the sender is a KES 10 user, and to determine what capabilities the communication sender may possess.

In one embodiment, a communication application adds the sender's serial number 22 to a communication 24 header with a header extension 682.

In one embodiment, a communication application adds the sender's KES 10 provider to a communication 24 header with a header extension 684. A communication application may use this attribute to determine if it is necessary to utilize namespace prefixes when making requests to a KES 10 provider. In one embodiment, the communication header may also contain a namespace attribute 686 for use when requesting the serial number 22 embedded into the communication header 682. In another embodiment, the communication header may contain a network address 688 of a KES 10 provider. An ordinary person skilled in the art will appreciate that provider names, namespaces, and provider addresses may facilitate discovery of a service provider, which is useful for registering with a service and for interacting with a plurality of services either by maintaining a user account with each service provider or by using namespaces (see FIG. 10) with a single service provider, the service provider redirecting requests and facilitating responses to other service providers on behalf of the requester.

In one embodiment, the communication application 520 that sends a communication 24 to a recipient may indicate whether the sender and recipient have a persistent relationship on the KES 10 using a communication header extension 690, and whether the sender has pre-approved a subsequent request from the recipient 692. The communication application in receipt of a communication 24 may use the relationship attribute 690 and the pre-approval attribute 692 to determine whether or not to request the serial number 22 embedded in the communication header 682.

In one embodiment, the communication application 520 that sends a communication 24 to a recipient may indicate whether the contents of the communication are encrypted 694. In one embodiment, the communication header may also contain a key ID 696 to be used for retrieving the appropriate key from the key ring manger 528 and decrypting a communication or a digital signature using the decrypting/verifying module 536. An ordinary person skilled in the art will appreciate that these indicators in the communication header may expedite the process of decrypting a communication 24.

In one embodiment, the communication application 520 that sends a communication 24 to a recipient may include an RSA style signature 698 in the communication header. In another embodiment, when the communication application 520 in receipt of a communication validates a digital signature, it may include a validation attribute 699 in the communication header, which may be used in the presentation of a sender verification panel 950.

Composite Application Methods

In one embodiment, third party web sites and applications are adapted for use with the present invention using composite application methods popularly known as "Web 2.0" or "mashup." Technologies such as Asynchronous JavaScript and XML (AJAX), JavaScript Object Notation (JSON) and the Document Object Model (DOM) facilitate the incorporation of data and functionality available from the KES 10 into the web user interfaces of third party applications. For a general discussion of developing applications with AJAX, refer to *Ajax: The Definitive Guide*, by Anthony T. Holdener, O'Reilly Media 2008.

Referring to FIG. 15*a*, a Third Party Application (TPA) 620 resides on at least one third party application server 600, which serves the application interface to a client browser 650 and accepts requests (and posts) from the browser 650 via a network 20. The third party server 600 may provide the browser 650 with Hypertext Markup Language (HTML) data 602 to render a user interface, Extensible Markup Language (XML) data 604 to render application data in the user interface, Cascading Style Sheet (CSS) data 606 to aid in rendering the HTML data, and JavaScript data 608 to manipulate and govern the behavior of the user interface and application data (among other uses). The browser 650 may process and render the data accordingly using the Document Object Model (DOM) and a JavaScript interpreter among other technologies.

The TPA 620 may have at least one Application Programming Interface (API) 610 that enables other applications to interact with the TPA 620. Similarly, the KES 10 has an API 60 capable of presenting the functionality of the KES 10 (FIG. 8*a*-8*d*) to third party application servers 600, third party applications 620, browsers 650, or other network devices 30-32 (FIG. 1). A client application may send a requests via the API 60, and the KES 10 functionality may process the request and provide a response to the client application via the API 60.

In one embodiment, the TPA 620 is able to retrieve HTML data 52, XML data 54, CSS data 56, and JavaScript data 58 from the KES 10. Using composite application techniques, the TPA 620 is adapted to serve web pages containing HTML (52 and 602), XML (52 and 604), CSS (56 and 606) and JavaScript (58 and 608) such that it is able to present functionality from the TPA 620 and the KES 10 in a single web page. The TPA 620 is further adapted to receive requests intended for the KES 10 from the browser 650 via the network 20; then, the TPA may redirect requests to the KES 10 via the API 60; and finally, receive responses from the KES 10, which are sent to the browser 650.

Referring to FIG. 15*a*-15*b*, in one embodiment, the TPA 620 is able to serve HTML data 602 containing an XML data map 672, and EK record information formatted in XML 674. Using various script programming techniques, a script is able to detect the presence of a data element by its ID within the HTML 602 (e.g., 'company'); then, determine if a corresponding target ID exists within the data map 672. If a corresponding target ID exists in the data map 672, the script retrieves a source ID. Finally, the script retrieves a value from EK record information 674 and resets the value of the target ID within the HTML data 602. Through these and other methods, the KES 10 and third party applications are capable of presenting KES 10 functionality to third party web applications, and providing third party applications with EK record information from the KES 10.

In one embodiment, a web page for a TPA 620 is adapted to accept a username or serial number (in lieu of the username) and password, which is sent to the KES 10 to authenticate the user of the TPA 620 with the KES 10. In one embodiment, the KES 10 responds with an access token, which authenticates the user in subsequent requests to the KES 10 until the access token expires or the user logs out. In another embodiment, when the user of a TPA 620 is authenticated with the TPA, the first access of the KES 10 via the TPA 620 involves the exchange of single sign-on credentials between the KES 10 and the TPA 620 such that authenticating with the TPA 620 in subsequent visits enables the user to access the features of the KES 10.

The TPA 620 is further adapted to retrieve serial numbers 22 and the corresponding EK records that User A requested. User A may create, edit or delete his or her serial number via the TPA's user interface. In one embodiment, the TPA 620 is adapted to present User A's serial numbers to other users of the TPA.

In one embodiment, a TPA 620 user interface is adapted to accept serial numbers, send requests to the KES 10 and receive responses from the KES 10. In an exemplary embodiment, User B enters User A's serial number into the user interface of the TPA 620 and receives an EK record from the KES 10, which is rendered in the user interface of the TPA 620. In another embodiment, User B enters search criteria and receives a list of serial numbers which match the search criteria in a search result, and User B may further request a specific serial number (an encryption key request) from among the search results and receive an encryption key reply.

In another aspect of the present invention, the KES 10 contains a list of EK records User B requested from other users. A TPA 620 is adapted to retrieve User B's list of EK records from the KES 10 and present the list of EK records to User B within the user interface of the TPA 620.

In another aspect of the present invention, the KES 10 contains a list of requests for User A's at least one serial number 22 and EK record. A TPA 620 is adapted to retrieve the pending requests for User A's serial number 22 and EK record from the KES 10 and present the list of requests to User A within the user interface of the TPA 620. User A may approve or decline each request for an EK record within the user interface of the TPA 620, and the TPA 620 is adapted to communicate the result to the KES 10 accordingly.

In another embodiment, User A may offer at least one serial number to User B via the user interface of the TPA 620, and User B may accept or decline the offer. If User B accepts the offered serial number, the TPA 620 requests the offered EK record from the KES 10. In one embodiment, User B offers User B's serial number to User A simultaneously—establishing a bi-lateral relationship.

In another aspect of the present invention, a TPA 620 with electronic commerce capability (e.g., retail, online bill pay, banking or brokerage; social network) is adapted to present KES functionality that enables User A to register with the KES 10, create a serial number 22 and EK record, and if necessary to transmit the serial number and EK record back to the TPA 620 for further use. In one embodiment, the TPA 620 provides the KES 10 with authentication credentials uniquely identifying the TPA 620; and, the KES 10 contains logic to record User A's activity. The KES 10 is able to analyze User A's activity for future billing to the owner of the TPA 620. In another embodiment, the TPA 620 is adapted to present the KES 10's credit card billing fields, and to transmit billing information from the TPA 620 to the KES 10 securely. An ordinary person skilled in the art will appreciate that these methods enable third party e-commerce applications to sell KES 10 services to their customers.

Figure 22:
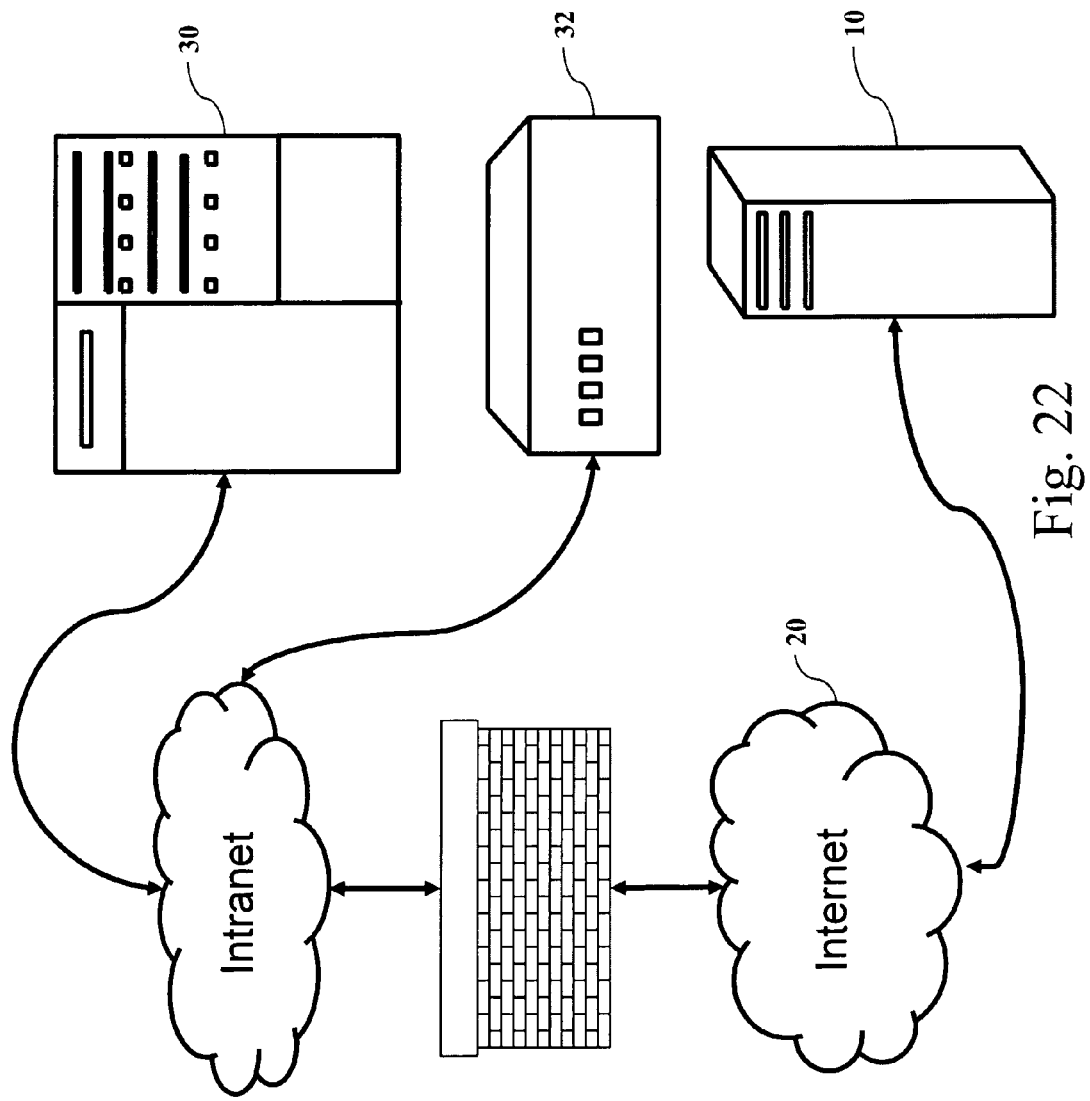
FIG. 22 illustrates exemplary network devices as utilized with the KES of the present invention.

Referring to FIG. 22, in another embodiment the TPA 620 is a web-based banking or financial services application operating on at least one network device 30 which is further adapted so that User A may request at least one serial number 22 associated to the banking or financial services institution and User A may offer User A's serial number 22 simultaneously such that User A and the banking or financial services institution may subsequently sign and/or encrypt electronic communications (e.g., email messages and instant messages using asymmetric keys, voice communications using VoIP and/or SIP and symmetric keys, etc.).

In one embodiment, a TPA 620 is a social network (e.g., Facebook, LinkedIn, etc.), and the functionality of the KES 10 and/or a network device may interact with the TPA 620 using the foregoing methods and popular social network APIs (e.g., OpenSocial, Facebook API including hypertext process (PHP) tags). An ordinary person skilled in the art will appreciate that a social network is an ideal environment for exchanging serial numbers 22, and using "friend of friend" functionality and other methods of discovering and connecting with other users as a means of exchanging encryption keys. For a general discussion of developing applications for use with social networks, refer to *Facebook Cookbook: Building Applications to Grow Your Facebook Empire*, by Jason Goldman 2009 and *OpenSocial Network Programming*, by Lynne Grewe, Wiley Publishing 2009.

In one embodiment, a TPA 620 operating as a social network (e.g., Facebook, LinkedIn, etc.), provides indicia such as a picture or logo of a user to the KES 10, and the KES 10 may store the picture or logo in the data storage 400 associated to a user 402 or EK Record 406, such that the KES 10 may provide the picture or logo in a sender verification panel 950 and 956. In an alternate embodiment, the TPA 620 may provide a link to a picture or logo, the link pointing back to the TPA. An ordinary person skilled in the art will appreciate that a user may prefer to use the profile picture on a TPA for use with a sender verification panel 950, and an automated procedure for providing this information to the KES 10 saves the user time.

Exemplary embodiments of the present invention may include integrating KES 10 functionality with third party applications such as online email applications, social networks, online web meeting applications, retail web sites, auction sites, online banking sites, online brokerage sites, online healthcare provider sites (e.g., providing health insurance coverage information, portable health records, etc.) among others. An ordinary person skilled in the art will appreciate that people may utilize or otherwise may establish relationships to exchange encryption key information when using these types of third party applications, and people may benefit substantially from the foregoing exemplary embodiments. By contrast, traditional methods of key exchange such as Open-PGP do not provide a means of invoking the secure exchange of encryption keys as an incident of using third party applications such as the types of applications described herein.

Various implementation techniques may include 'toolbar' extensions to web browsers, portlets (e.g., JSR-168) within web pages, or fields and page areas "mashed up" into the user interface of the third party application. Other implementations may use XML derivations such as Simple Object Access Protocol (SOAP) and web services to facilitate interaction with third party applications. For a general discussion of service-oriented architecture (SOA), refer to *Service-Oriented Architecture (SOA): Concepts, Technology, and Design*, by Thomas Erl, Pearson Education 2005.

In an alternate embodiment, an online meeting application (e.g., WebEx) is adapted to authenticate a first meeting attendee with the KES 10, retrieve the first attendee's serial number(s), and present the serial number to second attendees. These other attendees may select the first attendee's serial number and thereby request the encryption key information of the first attendee. If the requesting attendee is authenticated with the KES 10, the request is recorded in the KES 10 along with the attendee's authentication credentials automatically. If the attendee is not authenticated, the KES 10 may prompt the attendee to provide a name, e-mail address and note via the third party user interface to facilitate approval and update processes.

Referring to FIG. 22, a network device 32 adapted primarily to act as a network appliance as described in the embodiments herein may reduce the effort necessary to use the present invention with existing enterprise applications. An ordinary person skilled in the art will appreciate that the 'request replication' method of synchronization described herein when coupled with composite application methods and special embodiments such as network appliances may enable large scale organizations such as national banks, communication providers, social networks and other large entities to adapt their applications for use with the sending and receiving of signed/encrypted messages without requiring them to resort to more expensive methods of system modification and system integration; and, may further facilitate secure and verifiable communications between large organizations with custom enterprise-class applications in a complex heterogeneous environment and individuals who use simpler network-based homogeneous communications applications (e.g., web-based email, desktop email clients like Outlook, or VoIP phones).

Verifying Identity Via Third Party Applications

A method of verifying a user's identity via composite applications methods and exclusive service levels will now be described. In one embodiment, an individual is a customer of an institution and is also a user of the KES 10. The institution is also a user of the KES 10 and is validated by the KES 10 as a member of an exclusive service level (e.g., a depository institution). The customer relationship between the individual and the institution may serve to positively identify the individual's identity with the KES 10.

In one embodiment, an institution's customer (e.g., a bank customer) signs up as a user of the KES 10—either at the KES 10, or potentially via a composite application method on the institution's web application. In another embodiment, using composite application methods disclosed herein, an institution adapts the customer facing web application with a means to enable an authenticated user of the institution's web application to request an encryption key relationship with the institution via the KES 10. The user establishes a relationship on the KES 10 with the institution while in an authenticated session within the institution's web application by executing the composite application method to request an EK record. In one embodiment, the composite application method provides a means of enabling the user to request the institution's serial number and EK record on the KES 10. After authenticating with the KES 10, the user may offer the user's serial number and EK record to the institution via the KES 10. In an alternate and preferred embodiment, the execution of the composite application method creates a bi-lateral relationship between the individual and the institution on the KES 10 in one step.

In one embodiment, the EK request spawned by the composite application method contains an attribute (e.g., an attribute within a URL) that the KES 10 may recognize to ensure that the request occurred in an authenticated session with the institution's application. The request processor 373 is adapted to recognize this attribute. In one embodiment, the attribute value is signed by the institution's private key—the KES 10 having a corresponding public key so that the request processor 373 may decrypt and verify the attribute value. In one embodiment, the attribute value is a string containing the institution's SN 22 and the user's SN 22 and is signed by the institution's private key. In alternate embodiments, the user may enter his/her SN 22 manually to the composite application method; and the institution may submit the user's SN 22 and assert that the user is a customer of the institution.

When the relationship is established between the individual user and the institution on the KES 10, the KES 10 may thereby infer that the individual is strongly authenticated for the following reasons: the institution is validated to be a member of an exclusive service level; and the individual is authenticated as a user of a customer facing web application operated by the institution. An ordinary person skilled in the art will appreciate that certain types of institutions such as banks require various forms of identification, which must be validated and in some cases a physical presence test in order to establish a customer account. For example, a bank may require at least one of a driver's license or passport, and at least one of a social security number or birth certificate; proof of residential address, such as a utility bill; and, they may notarize a signature card for the new account holder, et cetera; and, these institutions implement additional security measures when registering users for their online web sites. Similar customer verification processes may be required for brokerage accounts, health insurance, employment, credit card accounts, and other services where strong authentication of an individual is either required or incidental to creating an account or other business relationship. When issuing digital certificates, it is easier for the user and far more economical to reuse the verification process already conducted by an existing entity such as an online banking application rather than requiring a prospective customer to fax or mail images of driver's licenses, notarized signatures, etc., which typically must be processed manually.

In other embodiments, to complete the execution of the composite application method, the institution's web application may implement additional security checks to ensure that the user's account with the institution has not been hacked prior to verifying the user's identity, and to ensure that the composite application doesn't wrongly confirm identity (e.g., a joint account). For example, the user or the institution's application may include the user's email address when processing the composite application method; and the KES 10 matches the submitted email address with the email address for the user account or EK record on the KES 10; if there is a match, the KES 10 may verify the user's identity, or further condition the confirmation of the user's identity with an email confirmation message. In an alternate embodiment, the institution's web application requests additional information such as a mother's maiden name, a favorite book, the last four digits of a Social Security Number, the last four digits of a bank card number, an ATM pin, or another shibboleth to ensure that the currently logged-in user is not a hacker and is associated properly associated to the user's identity. In other embodiments, the institution and/or the KES 10 may suspend confirmation and send a confirmation code via regular mail, and the user must enter the confirmation code before activating encryption keys. An ordinary person skilled in the art will appreciate that such steps may be necessary in the event of a successful phishing attack against a user.

Additional Implications of Encryption Key Relationships

The existence of a bi-lateral relationship between two users of the KES 10 may imply more than an encryption key relationship. In one embodiment, a communication application 520 may detect the existence of a key relationship and automatically deliver a communication to its recipient such that the communication may bypass spam and other Bayesian filters. In one embodiment, the relationship may also be associated to a trust level where the communication application or network device may preclude or allow certain types of content within a communication based upon trust levels. In one embodiment, a trust level may preclude or allow the delivery of a communication that contains content such as hyperlinks and network addresses, graphics, hypertext tags, and attachments. An ordinary person skilled in the art will appreciate that a key relationship is a more robust method of guaranteeing email delivery compared to sender communication address-based white lists; and that user authentication levels on the KES 10 may be associated to trust levels between parties to a relationship.

Network Appliances

It is an object of the present invention to provide large organizations such as multi-national corporations and web-based or hosted email providers with the ability to encrypt, sign, verify and decrypt communications without requiring end users to have to install or configure any software on personal computers in order to benefit from these functions.

Referring to FIGS. 20-23*d*, it is a further object of the present invention to provide organizations with network devices 30 and 32 adapted to operate as network appliances, wherein at least one network appliance is deployed within a network topology behind an organization's firewall and may be connected to the network via Ethernet, Fibre Channel or other protocols using common cabling such as Category 5-7, etc. Communication traffic such as email traffic routed to and from an email server passes through the network appliance. The network appliance is adapted to process the traffic such as by analyzing the byte stream for SMTP formatted data. A network appliance may also be a physical hub, router, gateway, proxy server or other computing device containing a communication application 520, which is further adapted to act as a communication encrypting and signing module and a communication decrypting and verifying module in addition to other services it provides (e.g., spam filtering, routing, etc.). The program memory 504 of the network device 30 includes at least one encryption key ring containing at least one private key of the person, organization, or entity operating the network appliance, or at least one public key of a person, organization or entity. In one embodiment, the network appliance is adapted to communicate with a plurality of KES 10 servers operated by different service providers and with different namespaces. An ordinary person skilled in the art will appreciate that such a network appliance may be easily installed within a network topology by a network engineer without significant disruption to the network environment, while providing services to a large number of end users.

In various embodiments a network appliance is equipped with encrypting/signing modules 534 and decrypting/verifying modules 536 such that they may encrypt and decrypt; and, sign (i.e., encrypt with a private key) and verify decrypt with a public key) communications using network hardware components containing queuing or caching if necessary and hardware acceleration technology (e.g., nCipher, VIA Padlock, SSE or Streaming Single Instruction Multiple Data Extensions) so that encryption and decryption in a high traffic environment does not materially adversely affect system performance or require significant system modifications. Additionally, encrypting/signing and decrypting/verifying modules may be adapted with encryption technologies such as Elliptic Curve Cryptography (ECC) in lieu of or in addition to the use of hardware acceleration technologies. For a general discussion of ECC, refer to *Comparing Elliptic Curve Cryptography and RSA on 8-bit CPUs*, by Nils Gura, Arun Patel, Arvinderpal Wander, Hans Eberle and Sheueling Chang Shantz, Springer Berlin/Heidelberg 2004 and *Guide to Elliptic Curve Cryptography*, by Darrel Hankerson, Alfred J. Menezes, Scott Vanstone, Springer-Verlag New York, Inc. 2004.

Figure 20A:
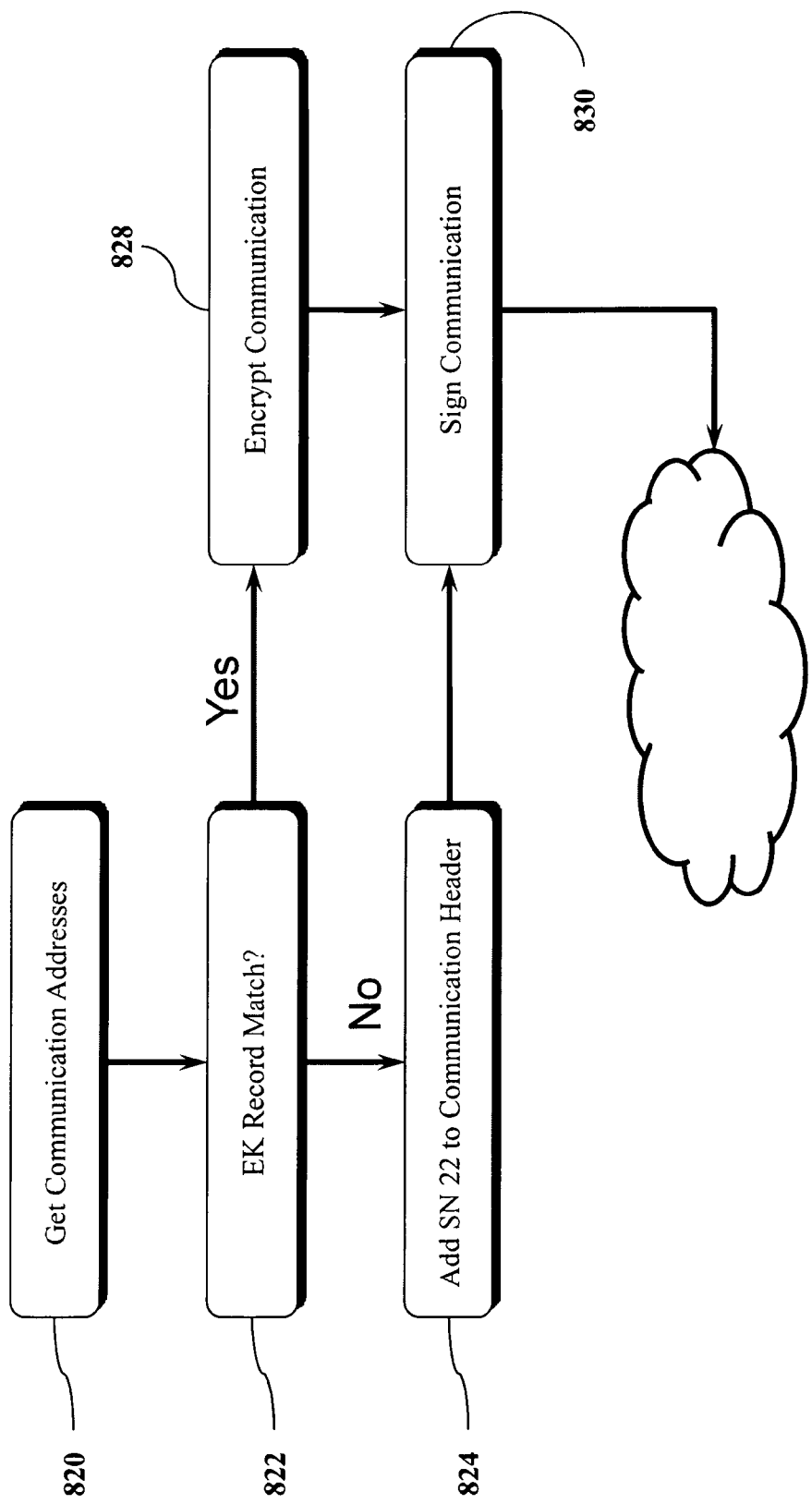
FIGS. 20a-20b illustrate an embodiment of a communication encryption/signing process of the present invention.

In another embodiment of the present invention, a communication application 520 operating on a network device 30, including a network appliance, is further adapted to detect if an intended recipient of a communication has an established (pre-existing) relationship with the sender on the KES 10. Referring to FIG. 20a, this determination may be made by methods such as using the communication address 820 of the intended recipient to perform a reverse-lookup to determine if the sender has a serial number 22 for the intended recipient; by matching keys, key IDs or key fingerprints; by a serial number 22 included in the communication header; by a combination of the sender and recipient communication addresses or by other methods. If the intended recipient and the sender have a pre-existing relationship 822, the communication application 520 may retrieve the EK record associated to the intended recipient, encrypt the communication with the intended recipient's public key 828; then, may sign the communication with one of the sender's private keys 830. If the intended recipient and the sender do not have a pre-existing relationship on the KES 10, the communication application 520 may sign the communication with one of the sender's private keys 830. In one embodiment of the present invention, the private key used to sign a communication where there is no pre-existing relationship between the sender and the intended recipient differs from the private key which would be used to sign a communication where there is a pre-existing relationship between the sender and the intended recipient so that the receiving application has at least one means of distinguishing communications that involve a pre-existing relationship from those that do not. In another embodiment, the communication application is adapted to associate the CNAME of the user's domain to a particular private key (e.g., jdoe@support.bigbank.com).

Referring to FIG. 20a, the program memory contains logic for identifying the at least one destination/recipient communication address 820 of an outbound communication and a means to perform a reverse lookup in the list of EK records 822 to determine if a match exists; and, if a match exists in the list of EK records 822, determining if the matching address has an associated public key 828, and encrypting the communication with the associated public key and further signing it with an appropriate private key 830 of the user. If a match does not exist, the logic selects an appropriate private key and signs 830 the communication 24. In one embodiment, the encrypting/signing module 534 or another module of the sending communication application 520 indicates that the communication 24 contains important metadata (e.g., using SMTP headers according to RFC 5322) and appends the SN 22 to the communication header 824. In another embodiment, when there is no EK record match 822, the encrypting/signing module or another component within the communication application 520 is adapted to send a message to the KES 10 to pre-approve a request from the recipient. Finally, the communication is sent via the network 20 to the recipient (or to the next component within the path to the recipient).

Figure 21A:
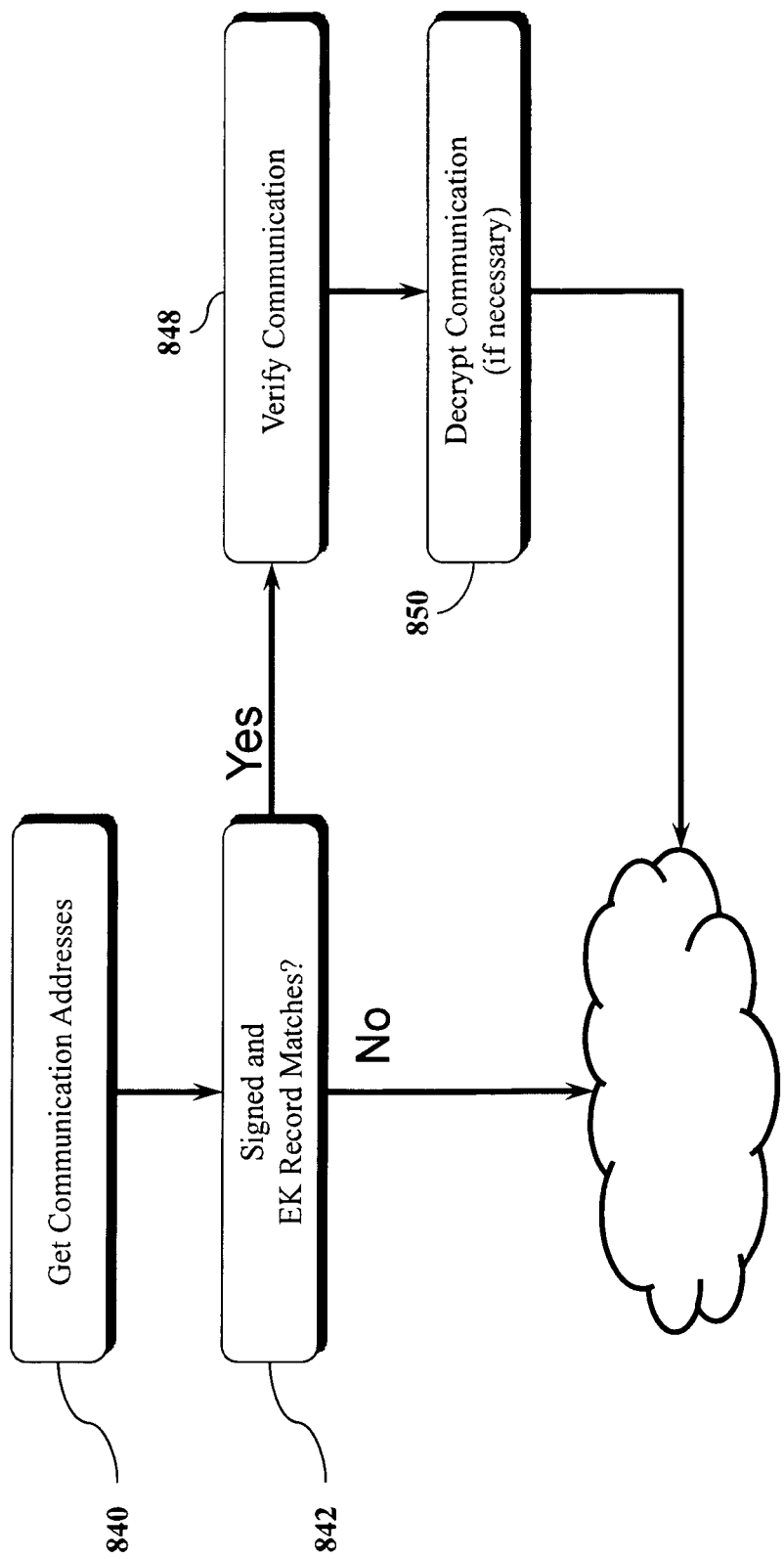
FIGS. 21a-21b illustrate an embodiment of a communication decryption/verifying process of the present invention.

Referring to FIG. 21a, the program memory contains logic for identifying the at least one sender communication address 840 of an inbound communication and a means to perform a reverse lookup in the list of EK records 842 to determine if a match exists; and, if a match exists in the list of EK records 842, determining if the matching address has an associated public key 848, and decrypting the signature with the associated public key and further decrypting it with an appropriate private key 850 of the user as necessary. If a match does not exist, the logic looks for a SN 22 in the communication header and makes a request for the SN 22 contained in the communication header or a recommendation to request the SN 22 contained in the communication header (i.e., a EK request with a 'recommend' request type that the user may convert into an actual request subsequently). Finally, the communication is sent via the network 20 to the recipient (or to the next component within the path to the recipient).

Figure 23A:
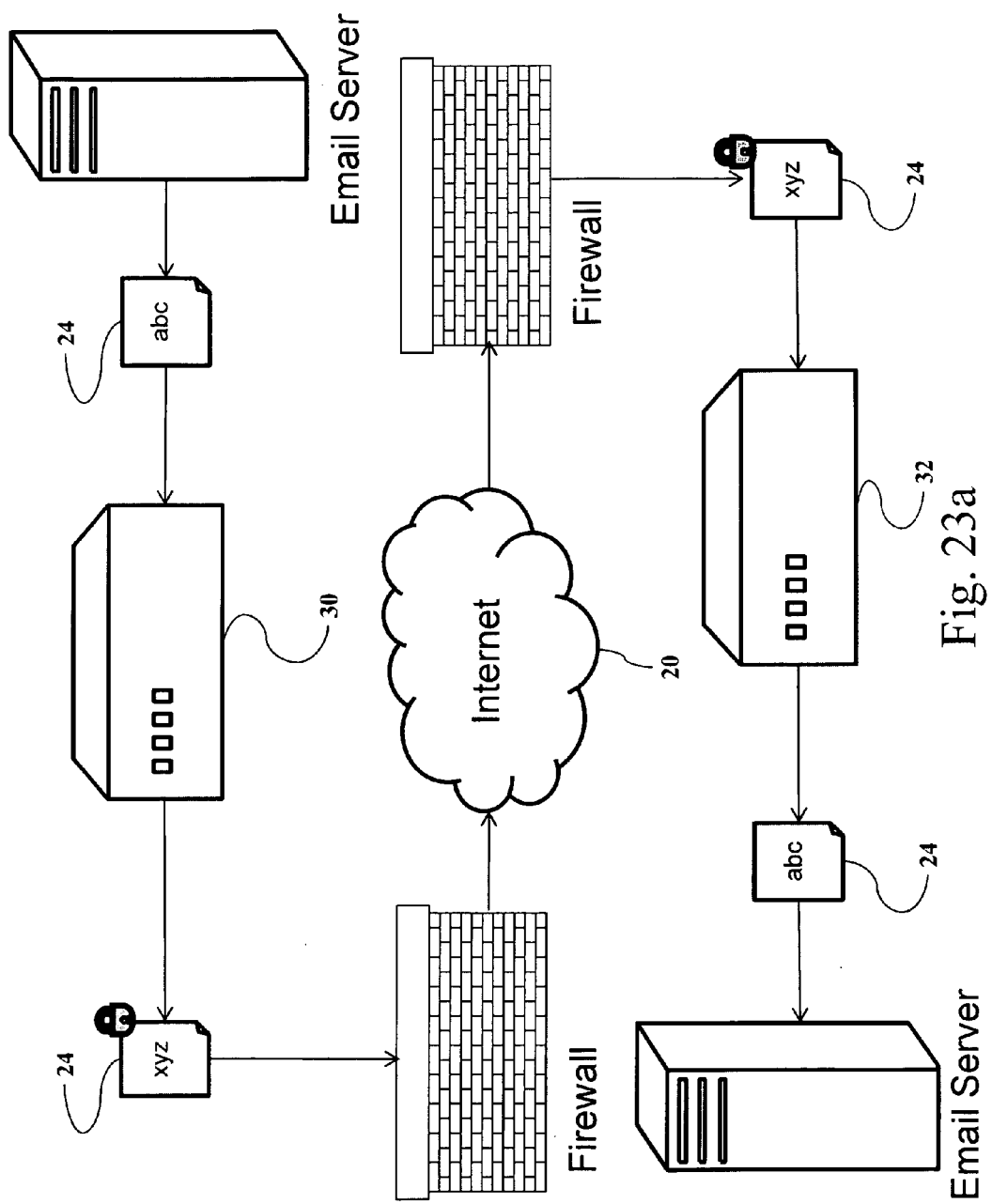
FIG. 23a-23d illustrates exemplary network devices as utilized with the KES of the present invention.
Figures 23B, 23C:
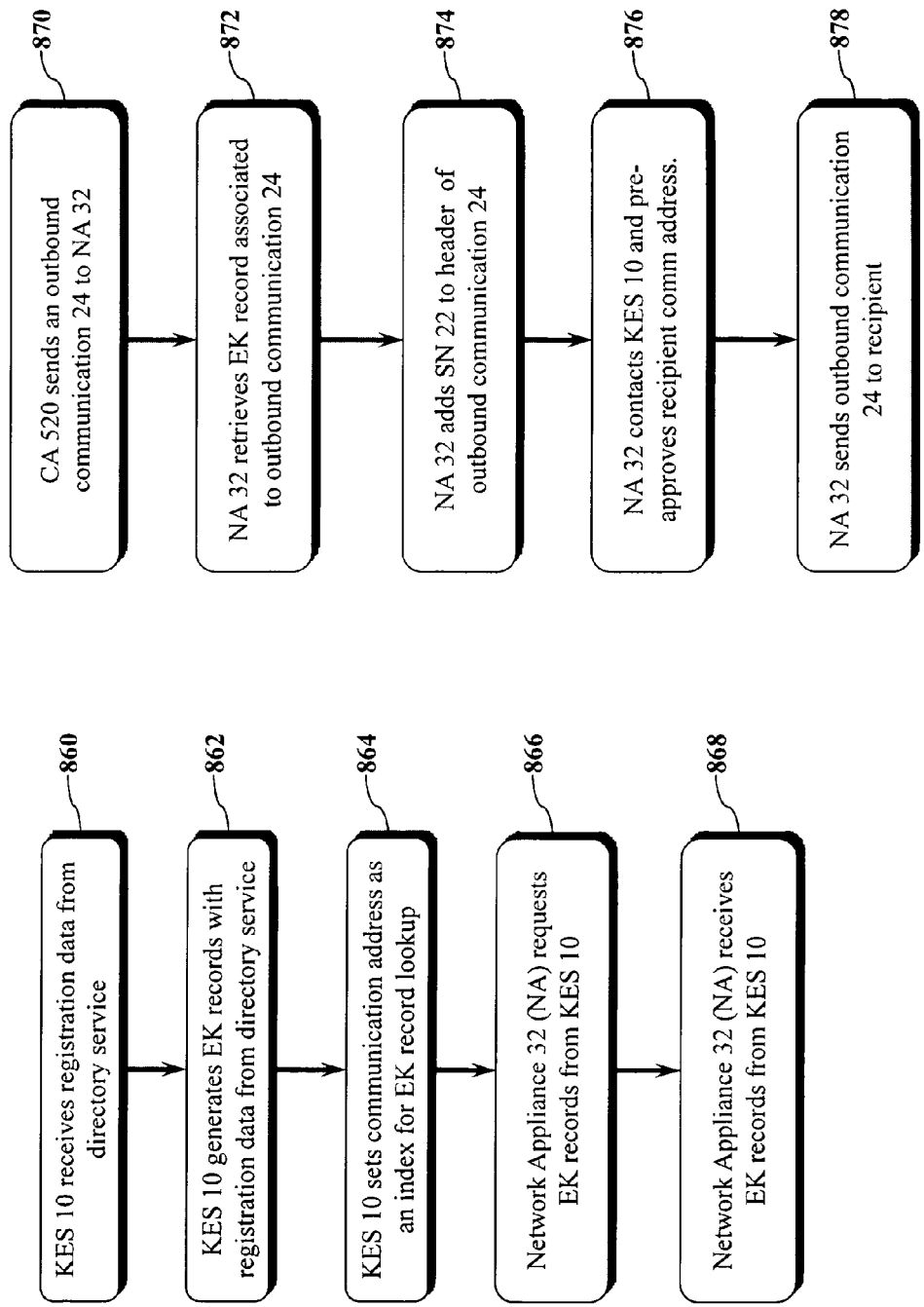

Referring to FIG. 23a and FIG. 23b, a process for registering users in a large organization using a network appliance (NA) 30 and 32 will now be described. In step 860, the KES 10 uses a batch registration process to receive registration data from a large organization, the registration data received from a database, file, directory service or other source. In step 862, for each EK records and serial numbers 22 for each person or entity included in the batch registration data. In step 864, a communication address associated to the EK record and serial number 22 is indexed so that the record may be retrieved by its unique communication address. In step 866, a network appliance 32 deployed within the large organization requests the newly created serial numbers and EK records. In step 868, the network appliance receives the EK records and serial numbers and stores them accordingly.

Referring to FIG. 23a and FIG. 23c, a process for sending a communication through a network including a network appliance will now be described. In step 870, a communication application such as an email server sends a communication 24 to a recipient such that it is received by a network appliance 30 within the sender's organization in step 872. At step 874, the network appliance 30 adds the serial number 22 of the sender to the header of the communication 24, and preferably the network address of the KES 10. In one embodiment, if the network appliance doesn't detect a pre-existing relationship between the sender and recipient, the network appliance may add data to the communication 24 header indicating that the sender and recipient do not have a pre-existing relationship. In step 876, the network appliance 30 contacts the KES 10 to pre-approve the recipient so that the recipient automatically receives the EK record if the recipient subsequently requests the sender's serial number 22 and EK record. In step 878, the network appliance 30 sends the communication 26 to the recipient. An ordinary person skilled in the art will appreciate that the methods of FIG. 14 are adapted for use in a network appliance 30 at steps 874 and 876 so that the recipient's network appliance 32 may request the sender's serial number 22 and establish a relationship with the sender.

Figure 23D:
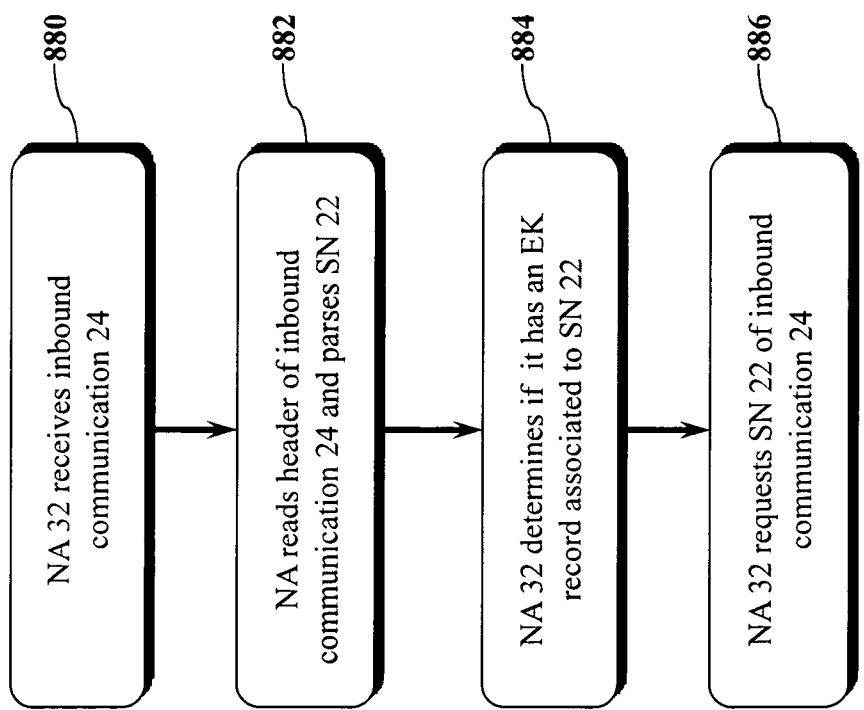

Referring to FIG. 23a and FIG. 23d, a process for receiving a communication through a network including a network appliance will now be described. In step 880, a network appliance 32 receives a communication 24. In step 882, the network appliance 32 reads the communication 24 header and detects the sender's serial number 22. In one embodiment, the network appliance may also detect the KES 10's network address. In step 884, the network appliance 32 determines whether the recipient and sender have a pre-existing relationship. In one embodiment, step 884 involves accessing the data storage of the network device 32 using the communication address of the recipient. In another embodiment, step 884 involves using an indicator incorporated within a communication 24 header indicating whether the sender and recipient have a pre-existing relationship. In step 886, the network appliance 32 requests the serial number 22 and EK record associated to the sender of the communication 24.

An ordinary person skilled in the art will appreciate that the process of batch registration, including using directory servers (e.g., LDAP); the process of enabling a system administrator to register multiple serial numbers with the same user account; the process of associating a communication address to an EK record such that the SN 22 and the EK record can be retrieved by reverse lookup using search functionality; the process of adding a SN 22 to a communication header and pre-approving a request by the recipient; and, the process of retrieving a SN 22 from a communication header and making a request for the SN 22 may facilitate an automatic and secure exchange of encryption keys. When the network device 30 and 32, including a network appliance, synchronizes with the KES 10, the network device retrieves the associated encryption key records securely. As shown in FIG. 23a, network appliances may provide signing, encryption, verifying and decryption services within the network in a manner that is seamless and transparent to end users.

The present invention provides the advantages of registering and verifying a user with the KES 10; establishing relationships between users, where the establishment of a relationship may involve a request by one user and an approval by the user receiving the request. Other advantages include the ability to exchange keys using a secure network connection; the ability to exchange asymmetric key pairs for the exclusive use of two parties; the ability to adapt the KES 10 as a social network or adapt a social network to utilize the KES 10 functionality to establish relationships among users; the ability of people to exchange personalized serial numbers 22 in lieu of exchanging encryption keys; and, the ability to verify a relationship before decrypting an encrypted message. An ordinary person skilled in the art will appreciate that developing a key exchange service with registered users is a prerequisite to many of the features of the present invention.

A Network Device as a Proxy

Figure 24:
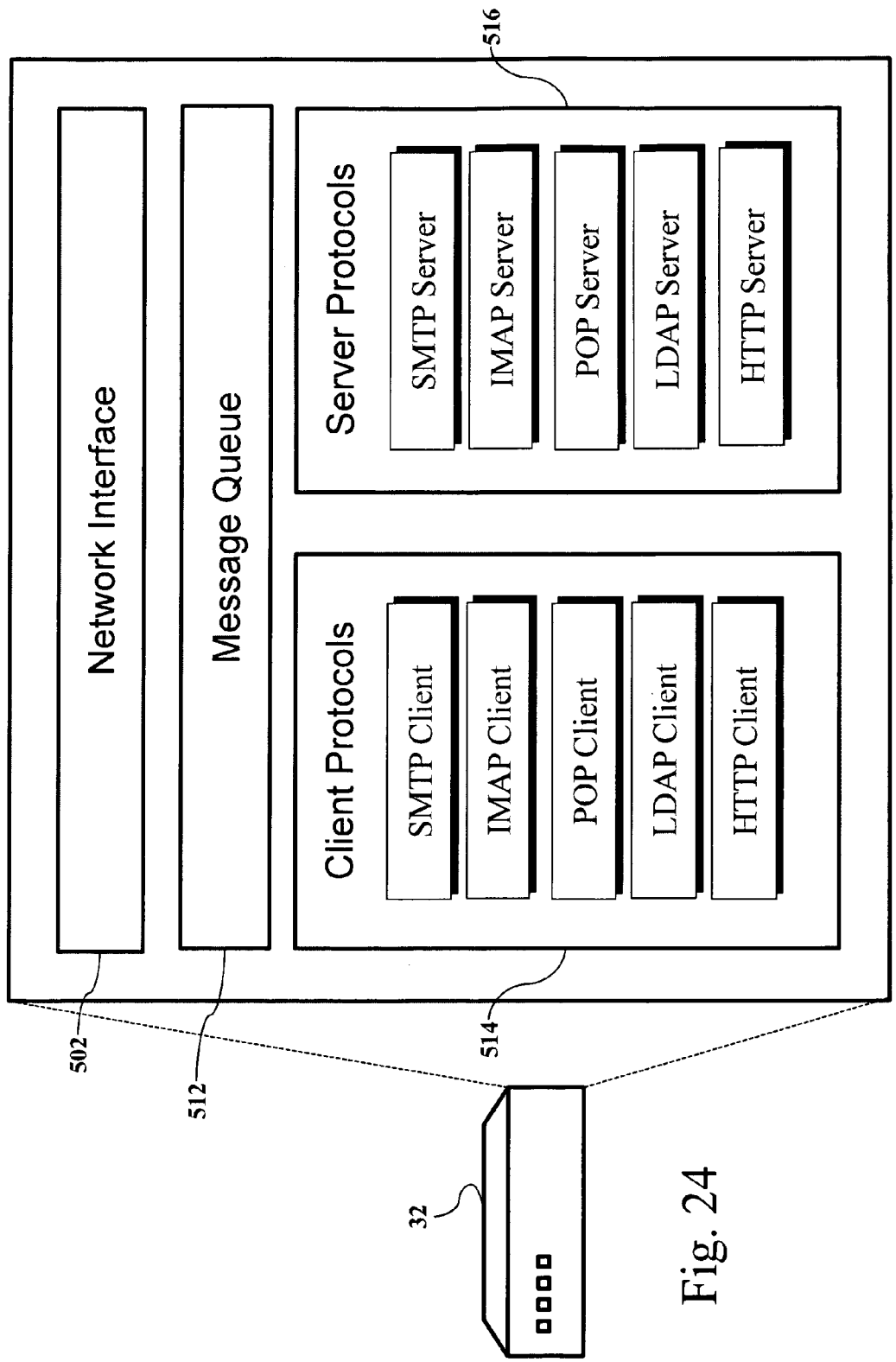
FIG. 24 illustrates an exemplary network device capable of operating as an email relay, Message/Mail Transfer Agent (MTA) or 'bridge'.

In one embodiment, network devices and/or their communication applications 520 are further adapted to operate as secured (e.g., behind a corporate firewall and requiring authentication) email relays, MTAs, proxies, gateways or bridges or otherwise capable of acting as clients and servers using various protocols such as SMTP, IMAP, POP, LDAP, HTTP, etc. Referring to FIG. 24, a network device 32 is adapted with a message queue 512 to ensure that inbound and outbound communications are not lost due to network errors or CPU bottlenecks among other faults; various client protocols 514 and various server protocols 516 such that the network device may operate as a proxy server, email relay or MTA capable of at least encrypting/signing and decrypting/verifying a communication 24 as described herein; and, system administration functionality 517 for setting ports, and Internet Protocol (IP) addresses, and generating or monitoring Simple Network Management Protocol (SNMP) messages among other features. For a general discussion on programming using email-based protocols including email relays, refer to *Programmer's Guide to Internet Mail: SMTP, POP, IMAP, and LDAP*, by John Rhoton, Butterworth-Heinemann 2000 and *Internet e-mail: Protocols, Standards, and Implementation*, by Laurence Hughes, Artech House 1998.

An ordinary person skilled in the art will appreciate that this embodiment may be deployed as software installed on a user's network device (i.e., separate from a browser or email client), a network appliance installed within a network environment behind a firewall, or as a cloud-based service.

Web Browsers, HTTP Proxies and HTTP Servers

In one embodiment of the present invention, a communication application such as a web browser or an HTTP proxy server is adapted with functionality to add, update or delete digital certificates retrieved from the KES 10 for use with the communication application. In another embodiment of the present invention, a communication application such as a web server is adapted with functionality to add, update or delete digital certificates retrieved from the KES 10 for use with the communication application.

The digital certificates may be Digital ID certificates to positively identify the users of the communication applications to other persons or entities (e.g., a bank server requests a personal certificate to authenticate the user), or digital ID certificates that identify other persons or entities to the user of the communication application (e.g., a class-1 digital ID); server certificates for positively identifying a server (i.e., rather than a domain name, because the DNS is vulnerable), using a pre-exchanged set of exclusive or public-private key pairs to establish a secure connection (e.g., SSL/TLS); certificates for identifying certificate authorities, including the KES 10 as a certificate authority; and other certificates, including code signing certificates.

A communication application such as a web browser may be adapted using techniques that enable a user to download an 'add on' or 'plug-in' and install it for use with the communication application (e.g., Mozilla APIs for Firefox). In one embodiment, the functionality prompts the user for a username and password to identify the user with the KES 10. Once the user is authenticated with the KES 10, the functionality may add, update or delete certificates (or keys). In one embodiment, the functionality prompts the user to identify if the network device running the communication application belongs to the user. If the user answers "No," the functionality may delete all added or updated keys automatically based upon at least one of the following events: a timed expiration of the login credentials, logging out from the KES 10 session (or expiring the access token) manually, or when the user closes the browser. An ordinary person skilled in the art will appreciate that a user may wish to use a network device and communication application belonging to a third party (e.g., a computer with internet access that belongs to a coffee shop) without the risk of leaving digital certificates for use by a subsequent user. If the user answers "Yes," the communication application may persist the certificates and keys for use by a particular user profile on the network device. The certificate functionality may periodically prompt the user to authenticate with the KES 10 before granting access to locally stored certificates and keys.

For a more complete discussion of developing modules for web servers or application servers, see *The Apache Modules Book: Application Development with Apache* by Nick Kew, Peachtree Press 2007; *Apache Security* by Ivan Ristic, O'Reilly; and, *Tomcat 6 Developer's Guide* by Damodar Chetty, Packt Publishing.

An ordinary person skilled in the art will appreciate that ordinary users are typically unfamiliar with configuring keys in browsers. Automated key exchange would also simplify tasks for system administrators. Simplifying exchange and configuration increases use of security enhancing keys. The ability to configure browsers, HTTP proxies and HTTP servers automatically streamlines the process of using certificates exchanged out-of-band such as Digital IDs, encryption and signing keys, server identification certificates, certificate authority identification, code signing, and other certificates.

Multi-User Network Appliances

Figure 25:
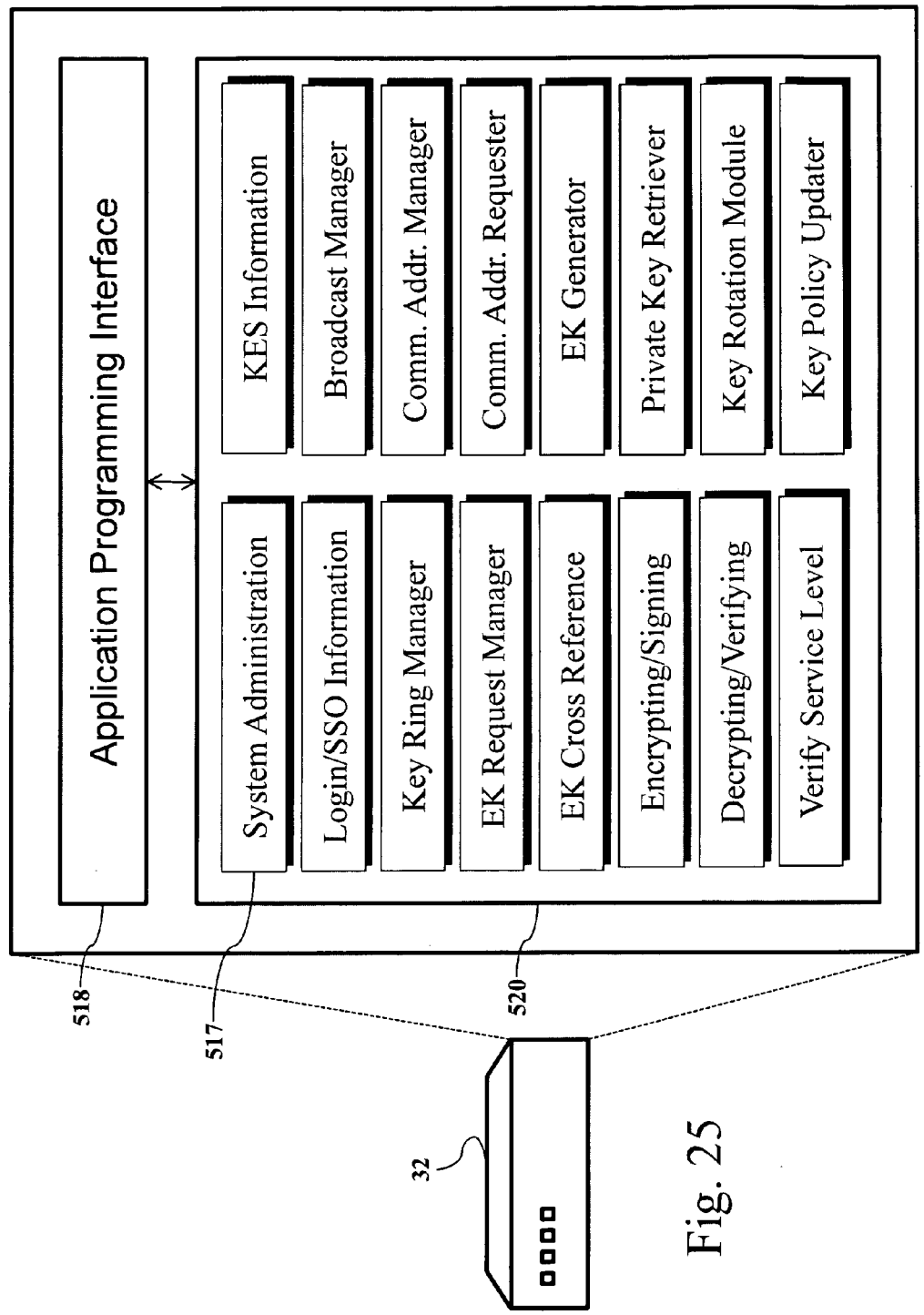
FIG. 25 illustrates an exemplary network device capable of supporting multiple users and an API.

Referring to FIG. 25, an embodiment of a network device 32 operating as a network appliance, or email relay or MTA for a plurality of users (i.e., users stored in the user table 402) will now be described. A network device 32 is adapted to provide an Application Programming Interface (API) 518 with at least the following functionality: a secure network communication interface (e.g., SSL/TLS) enabling a client application including a communication application 520 operating on a network device 30 to interact securely with the network device 32; a method to register the user via the API with the network device 32, the method accepting a login and authentication criteria for the KES 10, authentication criteria or preferably single sign on criteria for the network device, and the network device 32 returning the result of the method and preferably including any single sign on credentials or tokens to be used for subsequent sessions between the client and the network device 32 via the API; preferably a function for storing the user's login and authentication credentials for the KES 10 so that the network device 32 may request and receive updates from the KES 10 on a scheduled basis, and returning the result of the function to the API client; a method that takes a string argument containing an encrypted communication that was encrypted with the recipient's public key (i.e., the communication may contain data wherein a subset of the data contains encrypted data; or, the entire payload contains encrypted data), a username/login and authentication credentials and/or single-sign on credentials, and a passphrase for decrypting the user's private key, and returning decrypted communication data to the client; a method for invoking the retrieval of updates of EK records from the KES 10; a method of sending an unencrypted communication (e.g., a clear text string) and a username/login and authentication credentials and/or single-sign on credentials, and returning an encrypted communication (e.g., an encrypted string or a partially encrypted string); and a method for rotating the user's own public/private keys.

In one embodiment, the network device 32 and the API client application are adapted to support Single Sign On (SSO) so that users do not need to provide user name and password each time the client application accesses the services of the network device 32. In another embodiment, the KES 10 is also adapted to support single sign on. For a description of single sign on technologies, see *Kerberos: The Definitive Guide* by Jason Garman, O'Reilly Media, 2003.

In response to requests from the API 518, the network device 32 is further adapted to: create a user account and store the user's login information for accessing the KES 10, and the ability to authenticate the user when sending requests from an API client, including login and password or using SSO technology (e.g., Kerberos); to retrieve user account information from the KES 10 and store it in the data storage of the network device 32; to retrieve EK records and EK record updates of other users requested by the current user from the KES 10 and store it in the data storage of the network device 32; to retrieve the encrypted data of the user's private key from the KES 10 and store it in the data storage of the network device 32; to generate PKI pairs for the user, storing one key in the data storage of the network device 32, as encrypted with a symmetric cipher and a passphrase, and updating the user's personal EK record on the KES 10 with the other key; to rotate keys by invoking the generation of PKI pairs on the network device 32 as described, or by invoking the generation of PKI pairs on the KES 10, the network device retrieving the encrypted data of the key from the KES 10 as encrypted by a symmetric cipher and the user's passphrase; functionality to receive an encrypted or partially encrypted communication and a passphrase, retrieve and decrypt the user's key using a passphrase and a symmetric cipher, decrypt the communication or the encrypted portions thereof with the key, returning a fully decrypted communication, and the ability to flush the key from physical Random Access Memory (RAM) after decryption, or to enable the key or its encrypted variant to remain in memory for a limited time for reuse with a valid access token or passphrase (i.e., to improve performance, whereby the key or its encrypted variant is automatically flushed from RAM after the access token expires); functionality to receive an unencrypted communication (e.g., a clear text string), to retrieve a key from a key ring and/or the data storage, the key corresponding to the destination communication address of the communication, encrypting the communication or a subset thereof; and to retrieve a key from a key ring and/or the data storage, the key corresponding to the sender of the communication, signing the communication, and returning the encrypted and signed communication; and, the ability to issue or validate SSO tickets.

In one embodiment, the process of decrypting a communication encrypted with the recipient's key (FIG. 21*a*, 850) generates a warning in lieu of returning the decrypted communication if the decrypting/verifying module can decrypt the communication with the user's key at step 850, but there is no EK record match at step 842. An ordinary person skilled in the art will appreciate that exchanging keys 'out-of-band' with the present invention implies a relationship, and if no relationship is detected at step 842, it is possible that the key was used by a non-authorized person (e.g., a spammer) to bypass spam filters, etc. An ordinary person skilled in the art will also appreciate that establishing a bi-directional relationship between two users on the KES 10 is a means of establishing criteria for so-called 'white list' functionality.

Referring to FIG. 16 and FIG. 20*a*, an encrypting/signing module may be further adapted at step 828 to add metadata to an encrypted communication 24 (e.g., using SMTP headers according to RFC 5322), the metadata indicating that the message is encrypted 694.

In another embodiment, the communication application 520 of a network appliance is adapted to hold keys of a plurality of different users and uses a fully qualified unique communication address associated to the user's at least one EK record to lookup the EK record and retrieve encryption keys. In this embodiment, users employ the services of a third party application such that different users using the third party application can encrypt, sign, verify and decrypt their communications. For example, a major organization may utilize third party services, and communications 24 sent from these third party services to an intended recipient may be identified by the fully qualified email address of the sender (e.g., majorbank1@support.com; majorbank2@support.com), via a canonical name (e.g., support@majorbank1.support.com). An ordinary person skilled in the art will appreciate that industry trends toward outsourcing create market conditions where senders may not use their own domain name to send a valid communication.

The network device 32 for a plurality of users is adapted to provide a user ID for each table (FIG. 11*d*) in the data storage 508, and the communication application 520 is adapted to enable each user to invoke the functionality of the communication application (i.e., functions 522-554) for the user's account such that the network device 32 may support multiple users invoking the functionality and/or accessing the data storage simultaneously. In one embodiment, an EK Reply is adapted with a user ID and the EK Request Container (FIG. 7*d*) may process requests from a plurality of users, and the EK Reply Container may contain multiple replies associated to a plurality of users. The various functions of the EK request handler 370 are further adapted to process requests from different users in a single request from a network device 32 and to provide a response to a plurality of users on one network device 32 in a single response.

The network device 32 for a plurality of users may be further adapted for optimal performance in an embedded system or special purpose environment. For example, various tables of the data storage 508 in such as the EK record of table 560 may be a reference or unique key ID to a key record, where multiple users may reference the same key for faster lookup and more efficient data storage and the public keys are stored in a separate table. Additionally, the program logic may optimize the use of the processor 506 and program memory 504 such that the most recently used or most frequently used keys (and/or their encrypted variants) remain in memory and the least frequently or least recently used keys are removed from program memory 504 and retrieved later from the data storage 508 as needed. In other embodiments, certain keys used for verifying signed messages remain in program memory 504 for fastest performance (e.g., public keys that verify communications sent by users of an exclusive service level such as national banks remain in program memory). It should be appreciated by an ordinary person skilled the art that the exemplary embodiment is intended to describe the various processes and that implementation with various database technologies and optimization techniques may lead to more optimal configurations.

An ordinary person skilled in the art will appreciate that the present invention provides methods of signing and encryption that involve user accounts and provide a means of securing encryption keys in multi-tenant environments.

Network Appliances Adapted for Storage Area Networks

In one embodiment, a network device 32 for a plurality of users operates with other network devices 32 in a high traffic environment, and are further adapted to keep most-frequently-used user accounts, EK records and keys in program memory 504 for fast performance, and to remove least-frequently-used user accounts, EK records and keys from the program memory 504 and store them in the data storage 508. The network device 32 may be further adapted with a database server to address the needs of concurrent users. In one embodiment, the network device 32 is adapted for use with a storage area network (SAN), including a virtual SAN. In one embodiment, the most-frequently-accessed records may remain in the local data storage 508 for faster retrieval and the least-frequently-accessed records may be removed from the local storage 508 and stored in the SAN or virtual SAN. In one embodiment, connectivity between the network device and the storage area network uses Fibre Channel over Ethernet. An ordinary person skilled in the art will appreciate that an environment with a plurality of network devices 32 and a very large number of users may need to keep the data of current users in memory, the data of frequent users in the local storage, and the data of infrequent users in a SAN. In one embodiment, a session between a communication application 520 via an API 518 with another network device 32 enables the user via the communication application 520 to make multiple calls to a particular network device 32 in an array of network devices 32 in order to realize the speed advantage of fast in-memory or cache access to a user's account information and EK records. For a general discussion of storage area networks and storage virtualization, refer to *Storage Virtualization: Technologies for Simplifying Data Storage and Management*, by Tom Clark, Pearson Education, Inc. 2005; or *Designing Storage Area Networks: A Practical Reference for Implementing Fibre Channel and IP SANs*, by Tom Clark, Addison-Wesley 2003.

Network Appliances Adapted for Cloud Computing

In one embodiment, network devices described herein to work primarily as signing/encrypting or decrypting/verifying modules (i.e., as network appliances, routers, hubs, proxies, etc.) are further adapted with virtualization technology (e.g., IP over InfiniBand (IPoIB), VMWare or other virtualization technologies) such that one network device can appear on the network as a plurality of network devices. An ordinary person skilled in the art will appreciate that small firms may not be able to justify the expense of dedicated hardware-based network devices if their utilization needs aren't high, but may find it attractive to share the functionality in a hosted data center. For a discussion of virtualization technologies and cloud computing architectures, see *Cloud Application Architectures: Building Applications and Infrastructure in the Cloud*, by George Reese, O'Reilly Media 2009.

Network Appliances Adapted for Multicasting

Figure 11B:
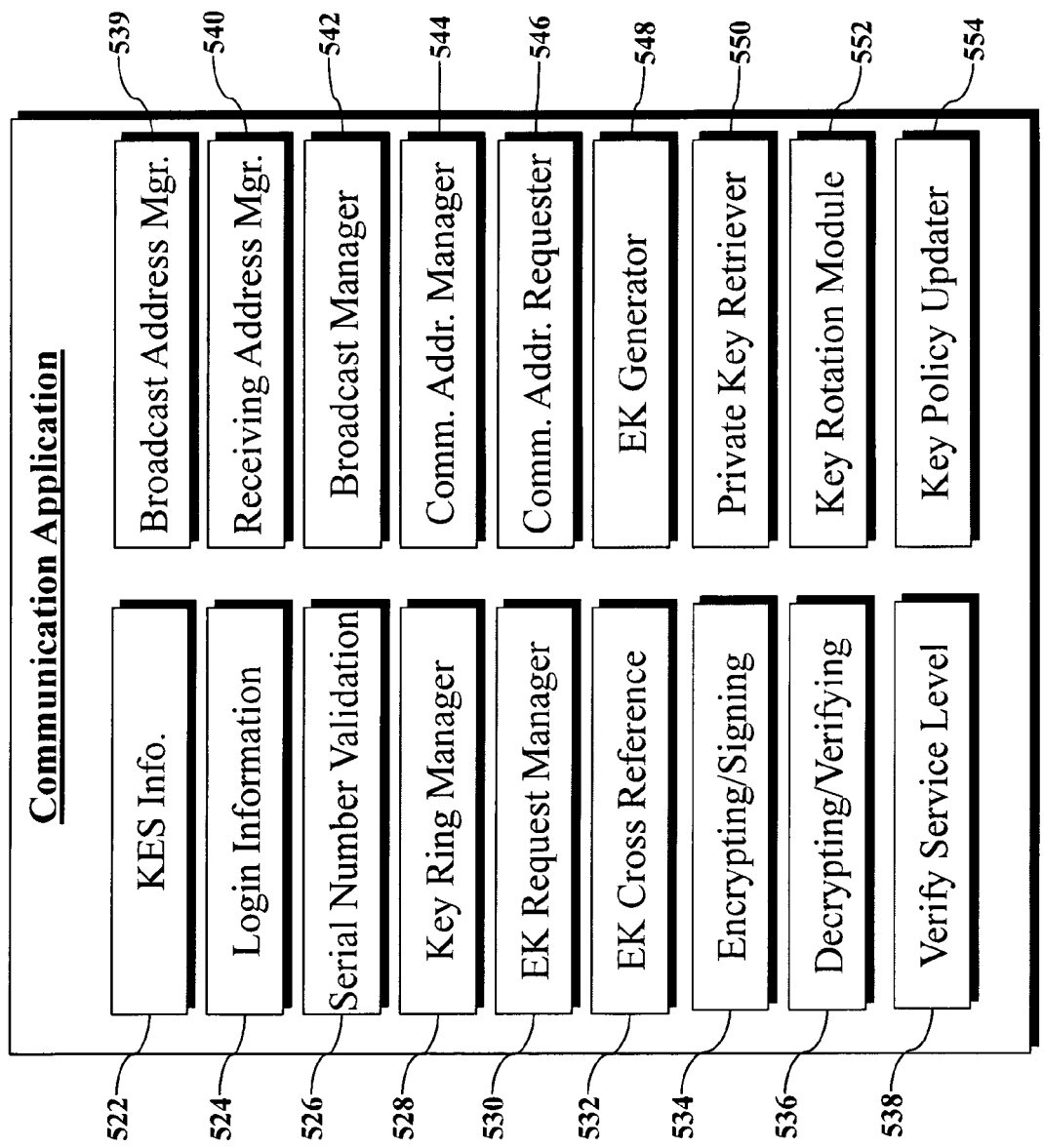

Referring to FIG. 11*b*, a network device 32 with a communication application 520 may be further adapted with broadcast functionality 539-542 to transmit data retrieved from the KES 10 to other network devices 32 similarly adapted and operating within the same network environment (e.g., in the same data center and behind the same firewall; within the same WAN environment, etc.). In one embodiment, a network device 32 is adapted to store a list of IP addresses or domain names and at least one port number or channel to which the network device may 'broadcast' or send data 539 retrieved from the KES 10. In one embodiment, a network device 32 is adapted to store a list of IP addresses or domain names and at least one port number or channel to which the network device may receive 'broadcasts' or sent data 540 retrieved by another network device from the KES 10. In one embodiment, a network device 32 contains logic for broadcasting information 542 recently retrieved from the KES 10 by retrieving at least one IP address or domain name and port number, and formatting data retrieved from the KES 10 in a format suitable for broadcasting to another network device, such as a User Datagram Protocol (UDP) datagram, and may send information using UDP, the Transmission Control Protocol (TCP), Stream Control Transmission Protocol (SCTP) or other suitable data format or transmission protocol (e.g., XML, message queuing, Java Reliable Multicast Services (JRMS), etc.).

An ordinary person skilled in the art will appreciate that prior art technologies such as DNS Zone Transfer and more modern methods of database replication such as JRMS may be adapted for use with the present invention such that in an environment employing a plurality of network devices 32, a first network device 32 may request information from the KES 10 and broadcast the information received from the KES 10 to a plurality of third network devices 32 in the same operating environment. The advantages of this embodiment include reducing the number of network devices that must communicate with the KES 10.

Variable Order of Operations for Decrypting/Verifying

Figure 27:
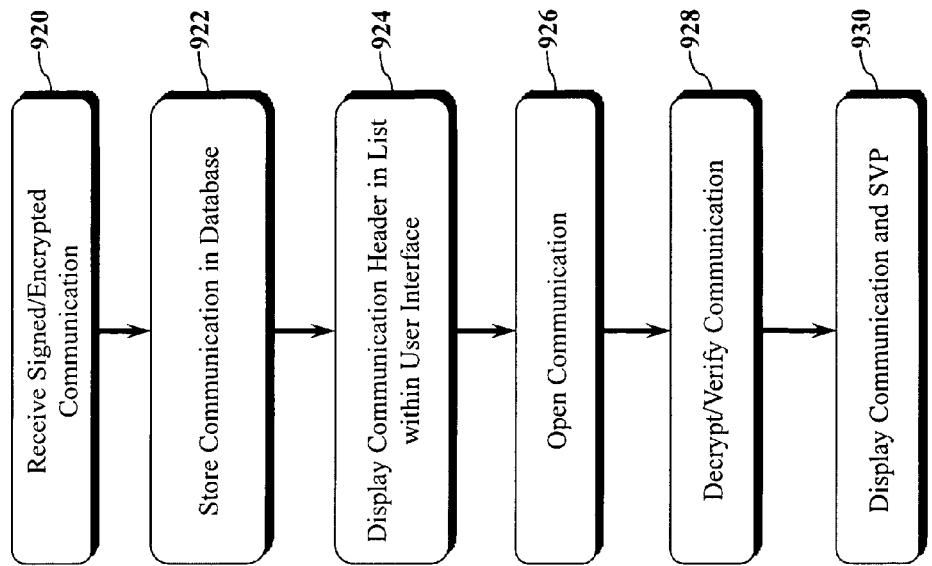
FIG. 26 and FIG. 27 illustrate alternate embodiments of receiving communications, decrypting them and presenting verification information.
Figure 26:
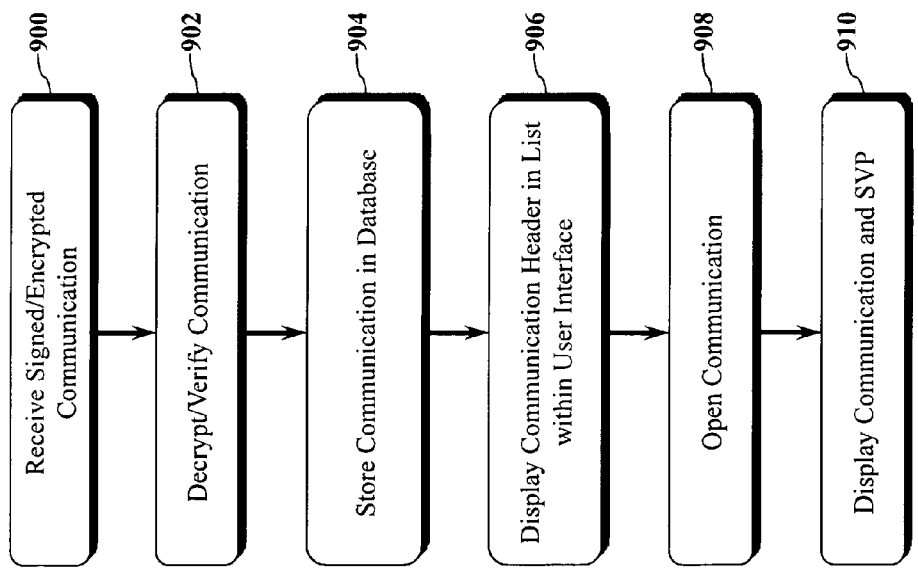

Referring to FIG. 26-27, a communication application 520 may receive a signed/encrypted communication at steps 900 and 920. The communication application may decrypt the message at step 902 and store it in the data storage at step 904, or it may store it in the data storage at step 922 without decrypting the communication 24. The communication application's user interface may display an entry for the received communication in a list at steps 906 and 924. The user may open the communication at steps 908 or 926. In the embodiment of FIG. 27, the communication is decrypted and verified after the user executes the "open" function at step 928. When a communication 24 is displayed, the communication application also presents a sender verification panel 950 at steps 910 and 930. An ordinary person skilled in the art will appreciate that various environments may require different embodiments for decrypting and verifying; for example, spam filters typically do not work on encrypted messages, so decrypting the message and processing it with a spam filter may be advantageous.

Adapting Webmail Applications

A multi user network appliance 32 may provide its services via the API 518 or a cloud computing service to a communication application 520 operating on a network device 30 (e.g., a web-based multi-user email application such as YahooMail, GMail, AOL, MS Hotmail, etc.) adapted to work directly with the network appliance or a cloud computing service interface. A user interacting with the communication application 520 via a web browser may benefit from the present invention without further requiring the user to install any additional software.

Figure 21B:
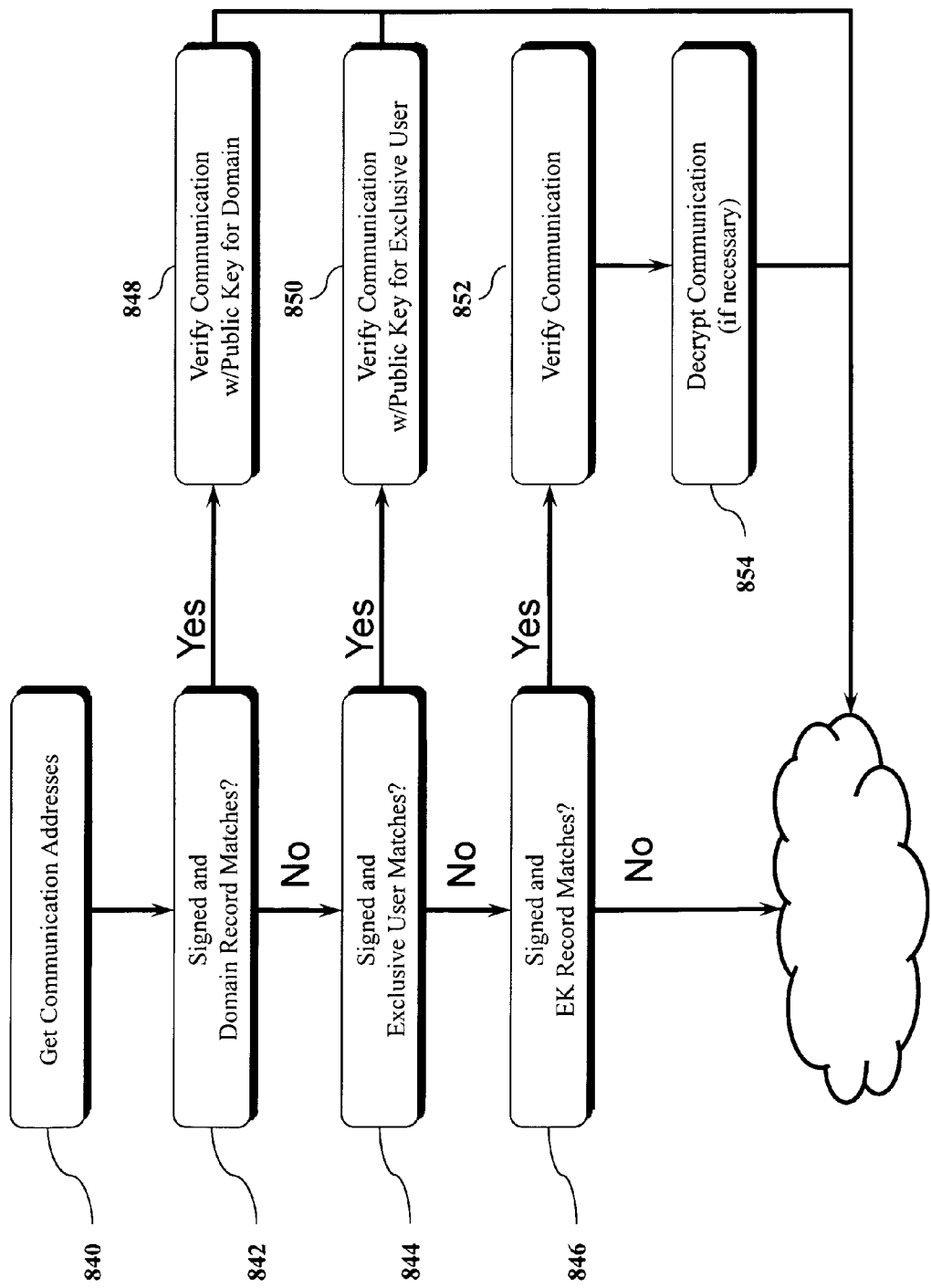

Referring to FIG. 21a-21b, in one embodiment the decrypting/verifying module verifies the sender of a communication at step 848 upon receipt of the communication, but may bypass decrypting the communication at step 850 until the user attempts to open the communication (FIG. 27, 926), the process of decrypting the communication requiring the user's passphrase to access and decrypt the corresponding key and thereafter decrypt the communication.

Figure 28:
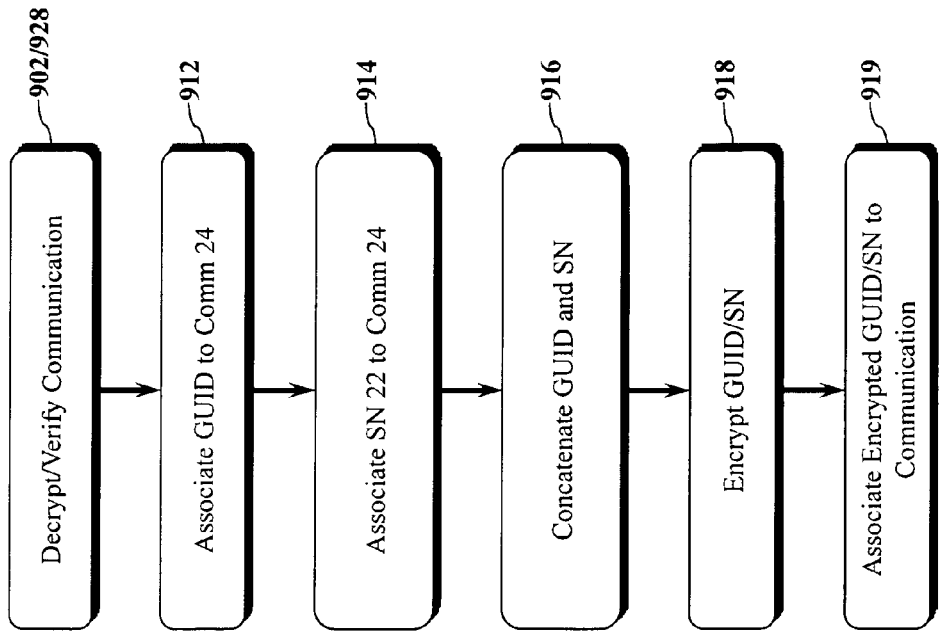
FIG. 28 illustrates an embodiment of associating verification attributes to a communication.

Referring to FIG. 22 and FIG. 28, an online email application may be a distributed computing environment such that decrypting and verifying occurs in a network appliance 32 and the presentation of a sender verification panel occurs in a communication application 520 on a separate network device 30. At step 902 or 908, the decrypting/verifying module is further adapted to decrypt and verify the communication 24; then, associates a unique identifier to the communication at step 912 (a GUID, message ID, etc.); then, preferably associate the sender's serial number 22 to the communication header at step 914, if it isn't already in the header (e.g., FIG. 16, 682); then, concatenate the unique identifier and serial number 22 and/or key ID at step 916; then, encrypt the concatenated unique identifier and serial number at step 918 using one key of a key pair; and finally, associate the encrypted unique identifier and serial number 22 to the communication 24 (e.g., such as adding it to an SMTP header). The program memory 504 is further adapted to route the decrypted and verified communication to the appropriate component of the instant network device 32 or another network device 30 within the communication provider's environment. In another embodiment, the encrypted concatenated string is associated to the communication by storing it in a column in a database record which contains the communication 24. An ordinary person skilled in the art will appreciate that a fraud perpetrator may not simply add a similar encrypted concatenated string to a communication header or envelope in order to "spoof" the decrypting/verifying module 536 or other modules within the communication application without access to the same encryption key; and, that the communication application 520 may open the communication, retrieve the encrypted unique identifier, serial number and/or key ID and decrypt it with the corresponding encryption key; then, the communication application 520 may compare the unique identifier associated to the message to ensure that they match, and use the decrypted serial number 22 and/or key ID to retrieve sender verification indicia for presentation within a sender verification panel 950. By this method, a fraud perpetrator may not merely add a serial number or key ID to a communication header in order to invoke the presentation of a sender verification panel 950. An ordinary person skilled in the art will also appreciate that this embodiment may be employed with the proxy described herein where a communication application (e.g., MS Outlook) accesses the proxy when sending or receiving a communication, and the proxy handles encryption and decryption.

Figure 29:
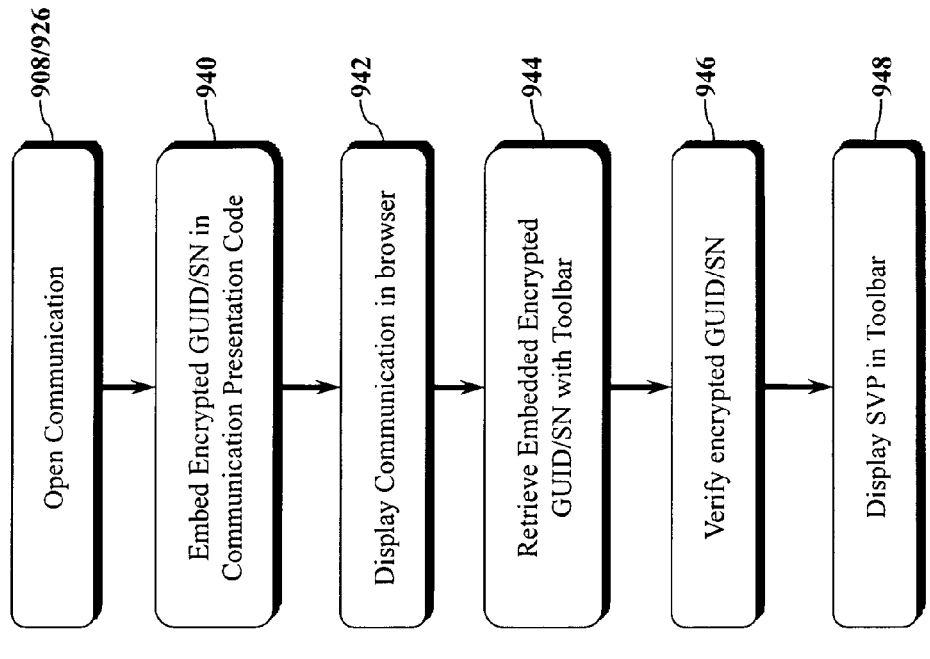
FIG. 29 illustrates an embodiment of verifying a message sender using a toolbar and presenting verification information; and, FIGS. 30a-30d illustrate embodiments for verifying a sender of a communication to its recipient in a user interface.

Referring to FIG. 29, an online email application may be a distributed computing environment such that decrypting and verifying occurs in a network device 32 such as a network appliance and the presentation of a sender verification panel occurs in a toolbar for a web browser by retrieving hidden information from a presented communication 24. At step 908 or 926, a user invokes the opening of a communication 24, and the communication application 520 is adapted to embed the encrypted unique identifier and serial number 22 and or key ID at step 940 into the presentation code (e.g., an HTML input tag of type 'hidden'). When the communication 24 is displayed in a web browser at step 942, the browser or a plug-in module for the browser may retrieve the embedded information. The toolbar may send the embedded information to the communication application 520 for decryption and verification and retrieve the sender verification indicia; then, display the sender verification panel 950 in the browser's tool bar or browser plug-in. An ordinary person skilled in the art will appreciate that the presentation of the sender verification panel in a toolbar may thwart malware that attempts to modify a Document Object Model (DOM).

In an alternate embodiment, a communication 24 may be sent to a recipient including a serial number 682, potentially a key ID 696 and an RSA signature 698 embedded in the communication header (see FIG. 16). In one embodiment, the communication application 520 of the communication recipient associates the foregoing attributes to the communication 24 by retrieving the attributes from the header and storing them in a database record which contains the communication 24. When the recipient invokes the communication application 520 to open the communication 24, the communication application 520 includes the serial number 682, potentially a key ID 696 and an RSA signature 698 either in the communication header, or in hidden hypertext form tags (e.g., <input type='hidden'/>). The toolbar is adapted to traverse the DOM tree and retrieve the attributes, and to recompute a hash code for the contents of the communication. In one embodiment, the toolbar invokes a script method to retrieve complete header information from the communication application 520. Once the toolbar has retrieved the attributes, the toolbar sends the retrieved attributes and the recomputed hash code to the KES 10, where the RSA signature 698 is decrypted by the corresponding public key to retrieve the original hash code. Then, the original hash code and the recomputed hash code are compared for equality; in this embodiment, the KES 10 contains a decrypting/verifying module 536 and the ability to retrieve the public key via the serial number 682, the key ID 696 or other matching criteria. Once the RSA signature 698 is validated, the KES 10 replies to the toolbar indicating that the signature is valid. In one embodiment, the KES 10 provides sender verification indicia in the reply. The toolbar may then present the sender verification panel 950 with the sender verification indicia. An ordinary person skilled in the art will appreciate that in this embodiment, the email application requires little or no modification and no hardware, and presentation of the sender verification panel 950 does not modify the DOM tree.

Figure 30A:
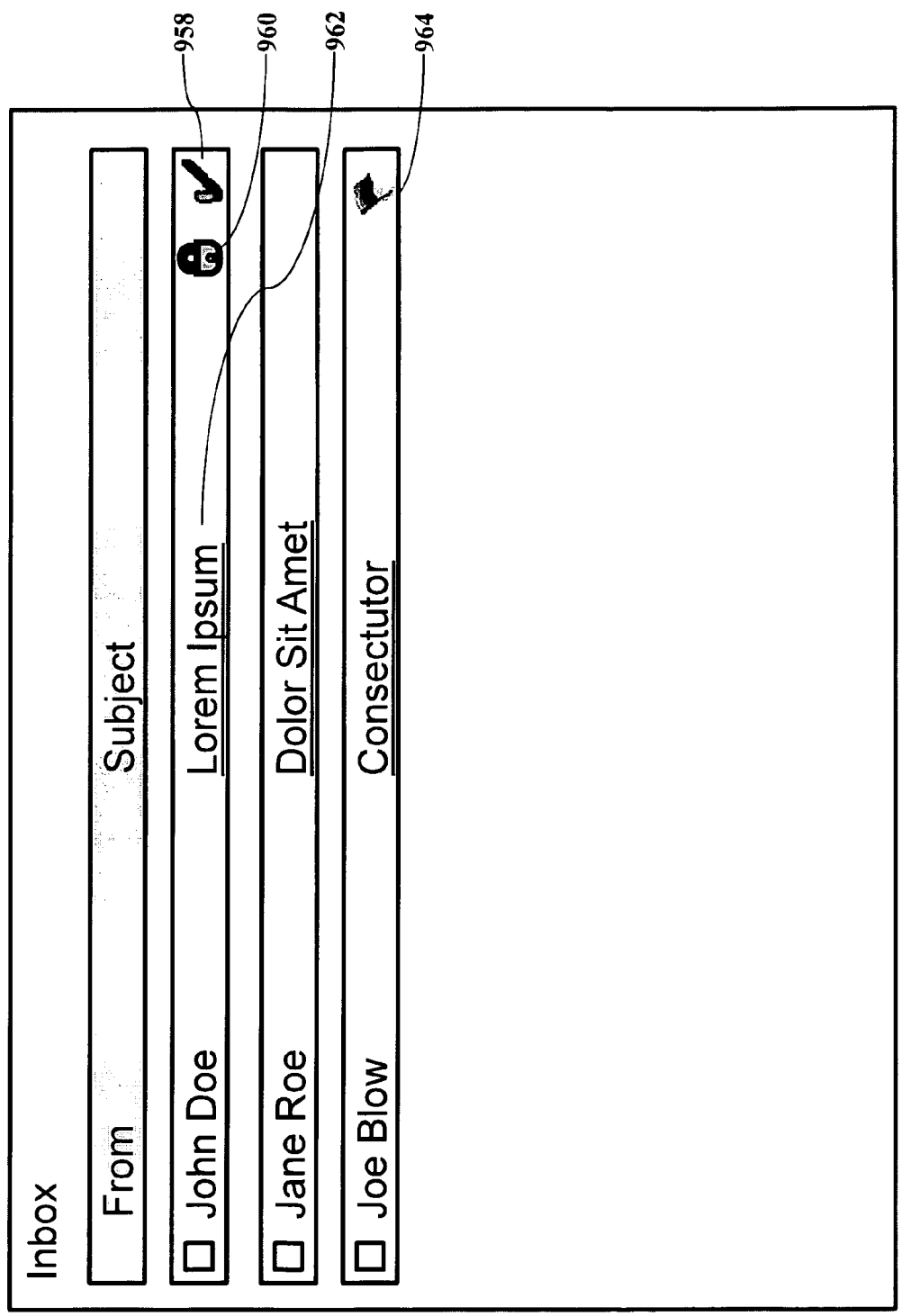

In some embodiments, such as email applications, attributes of a received communication's header may be displayed in a list of a user interface (FIG. 27, 924) as illustrated in FIG. 30a. In one embodiment, a communication displayed in the list of communications may be adapted to present an icon indicating that the message is signed/verified 958 or encrypted 960 or both before it is opened. In one embodiment, the link 962 for opening the communication 24 is adapted to establish a secure connection (e.g., HTTPS, SSL/TLS). When the user selects the link 962 to open the message, the browser establishes a secure connection to the communication application and presents a web user interface prompting the user to input the user's passphrase in order to decrypt the communication. In response to the user inputting the passphrase corresponding to a key and submitting it along with an identifier of the communication 24 to the communication application 520, the communication application 520 takes the received passphrase, retrieves the encrypted communication 24 from the data storage and generates a request to the network device 32, the request providing the user's login and password or SSO credentials, the passphrase, and the encrypted communication. The network device 32 via the API returns a decrypted communication 24 to the communication application 520 and presents it to the user via the secure connection. The network device 32 may operate in an environment separate from the communication application, and may be accessed via cloud computing technologies. In an alternate embodiment, when the user selects the link 962 to open the message, the browser establishes a secure connection to the communication application and presents a web user interface prompting the user to input the user's passphrase in order to decrypt the communication, and the web page contains hidden input fields or other attributes containing the contents of the encrypted communication and SSO credentials or access tokens for the network device 32; and, in response to the user inputting the passphrase corresponding to a private key and submitting it along with the encrypted communication 24 and SSO credentials directly to the network device 32; and, the network device 32 via the API returns a decrypted communication 24 to the user's browser via the secure connection and presents it to the user. An ordinary person skilled in the art will appreciate that various implementation methods may be used to decrypt and present the communication to the user (e.g., AJAX, a web server on the network device, etc.), and that the alternate embodiment precludes the decrypted communication residing in the program memory 504 of the communication application 520. In one embodiment, the hypertext code for presenting the communication contains 'no cache' meta tags instructing the browser not to cache the hypertext code, and code to expire the access tokens or SSO credentials. When the user closes the communication, it may still be retrieved from the data storage of the communication application 520 using the same method (i.e., a preferred embodiment for web-based services is to leave the communication encrypted in the data storage). The foregoing methods do not modify the DOM tree after the browser retrieves the communication contents in a hypertext document.

The communication application 520 is also adapted to present web pages for other functionality of the KES 10 or the network device 32, including requesting the user's login and password when registering with the network device 32, and updating a password in the network device 32 if it was changed on the KES 10. The communication application 520 may also be adapted to provide a "decrypt" button or link after a communication 24 is displayed (FIG. 27, 930) as an alternate embodiment to clicking on a hyperlink (FIG. 30a, 962). The communication application 520 may also be adapted to modify a "New Message" function, wherein the browser establishes a secure connection with the communication application, and the button or link to transmit the communication is adapted to route the communication from the browser to the communication application 520, and the communication application is adapted to route the communication to the network device 32 wherein the network device may encrypt the message using methods described herein (e.g., FIG. 20a, 822, 828, 830), returning the encrypted message to the communication application 520 and the communication application sending it to the recipient. In one embodiment, the inability to locate an appropriate encryption key returns an error message to the user, and the user has the option to send the message using an alternate encryption method (e.g., Iron-Port PXE). In another embodiment, upon receiving an encrypted communication, the communication application is adapted to present "Reply" functionality so that when it is invoked, it is configured to send the communication to the recipient in encrypted form (i.e., the user does not need to indicate a preference to encrypt the communication) using the methods described herein.

Using Desktop Clients with Webmail Applications

In an alternate embodiment, a communication recipient may use a web-based provider (e.g., YahooMail, etc.), and may alternatively receive a communication via a browser or by downloading the communication to a desktop application (e.g., MS Outlook). An ordinary person skilled in the art will appreciate that the present invention may require functionality enabling the sender and recipient to communicate in web-based, desktop-based or other modes.

In an alternate embodiment, if a match exists between a communication 24 and an EK record 560 within the list of EK records at step 846 during the encryption/signing phase, different processing instructions may apply (e.g., the message may be encrypted with a key). In one embodiment, if the intended recipient retrieves the communication 24 from the communication provider using a local network device (e.g., MS Outlook via POP3) the hosted communication application may decrypt and verify the communication during the retrieval process at steps 852 and 854; or, the hosted communication application may forward the communication 24 without any processing such that the local network device 32 of the intended recipient verifies the sender of the communication 24 and decrypts the communication if necessary. In one embodiment, alternate processing instructions are determined by the intended recipient setting preferences associated to the account on the communication provider's system. In another embodiment, the communication provider provides alternate access methods (e.g., a SOAP call with a processing instruction; a plurality of POP3 or IMAP access points each of which process the message differently, etc.).

At step 828, the encrypting/signing module may be further adapted to determine if the recipient uses a web-based email application by accessing the utilization restriction and policy associated to the public encryption key to determine if the communication application associated to the communication recipient is a browser-based application. In one embodiment, EK records on the KES 10 are adapted to provide a means to set the type of communication application associated to a communication address within a set of data fields for indicating public key utilization restrictions and policies.

Anti Phishing Embodiments

It is a significant object of the present invention to develop methods and processes to defeat electronic communication fraud by presenting a user in receipt of an electronic communication with a means of identifying the sender of the communication using well known industry standards for signing a communication 24 and a means of presenting sender verification indicia. In the most basic embodiment, a set of public/private PKI encryption keys are associated to the sender of a communication. The sender maintains the private key, and the recipient retrieves and maintains the public key. The public key for verifying a signed communication is associated to a data source containing sender verification indicia such as text strings describing the sender (e.g., name, description, etc.) and preferably a graphic or logo that may help identify the sender of a communication to its recipient. A process of the present invention includes receiving a signed communication (e.g., signed via private key), verifying the digital signature with the corresponding public key, preferably verifying the key; preferably verifying the type of person, organization or entity that sent the communication; retrieving attributes and indicia associated to the key from the data storage, and presenting the attributes and indicia associated to the sender in a presentation that is separate from but in juxtaposition to the received communication such that the recipient may compare the attributes and indicia verifying the sender with the contents of the received communication.

An ordinary person skilled in the art will appreciate that while prior art (e.g., Open PGP; see IETF RFC 4880) can verify a digital signature, and may verify a certificate with a certificate authority, the present invention provides a means of presenting sender verification indicia within a hypertext page, and provides a means of verifying the class of the sender (e.g., a government entity, a depository institution, etc). When presenting sender verification indicia with a communication 24 such as email, the indicia must be retrieved and displayed when the communication is displayed in a user interface. An ordinary person skilled in the art will appreciate that a plurality of methods may be used to actuate the presentation of attributes and indicia in a sender verification panel 950.

In various embodiments, a Communication Application 520 is any network-enabled application or device 30 modified or adapted to operate with the present invention, including email applications, web browsers, web-based email applications, enterprise applications, CRM applications, call center applications, online banking applications, online brokerage applications, medical practice management applications, cell phones, VOIP phones; and, network hardware and software such as routers, hubs, spam filters, email gateways, network appliances, etc.

In one embodiment, a network device 30 is a network appliance, email relay, MTA, proxy or bridge adapted to sign an outbound communication with a private key. A process of the present invention includes receiving at the network device 30 an outbound email (i.e., as identified by the destination/recipient's communication address), normalizing the contents of the message (if necessary), hashing the contents of the email (e.g., using MD5), encrypting the hash with a private key in the manner of RSA (Rivest, Shamir, and Adleman) signing, appending the encrypted hash to the email header, and sending the outbound message to the recipient. An ordinary person skilled in the art will appreciate that the communication may be signed using a network device adapted for use with the present invention or any other device capable of signing a digital communication 26; however, in the latter scenario, alternate methods for key generation, secure key exchange, key rotation, and associating indicia to a key must be developed separately.

In one embodiment, the KES 10 is adapted to enable a network appliance or communication application to request one or more EK records containing one or more public keys for verifying a digital signature from one or more users of an exclusive service level. In one embodiment, a network appliance 32 or communication application 520 is adapted to download all EK records of one or more exclusive service levels to a network device 30 in order to verify the identity of a user of an exclusive service level (e.g., a bank) in the event that the user of an exclusive service level sends a signed communication 24 to a recipient operating a network appliance or communication application 520 adapted for use with the present invention. An ordinary person skilled in the art will appreciate that a pre-existing relationship between the sender and recipient isn't required.

In an alternate embodiment, each user downloads a partial EK record including the serial numbers and other identifying criteria such as key IDs or key fingerprints and relevant communication addresses necessary to perform a matching operation (FIG. 21a 844); then, retrieves a full EK record only when receiving a communication that requires the encryption key and other information in the EK record to verify the sender (FIG. 21a 850). In one embodiment, if the decryption process of FIG. 21a fails, the communication application requests an update from the KES 10 and runs the process again to see if it can retrieve EK records or other matching criteria. An ordinary person skilled in the art will appreciate that while every user of the system may retrieve all EK records associated to the users of an exclusive service level (e.g., 5000 FDIC-insured US depository institutions), they may not have a pre-existing relationship with each user of an exclusive service level. Therefore, they may not wish to download all attributes of the EK records until they are needed.

In an alternate embodiment, a public/private key pair or the EK record is adapted so that the public key or EK record may programmatically enable the presentation of a sender verification panel 950 and/or routing to a 'trusted inbox.' The issuer of the key pair may thereby implement a licensing model such that the sender receives the right to present a sender verification panel 950 to the recipient or route communications to a 'trusted inbox' as part of a license agreement. In one embodiment, the public/private key pair or the EK record is adapted so that the public key or EK record may programmatically guarantee the delivery of a communication (e.g., verifying with the public key automatically 'white lists' the communication so that it will not be trapped by a spam filter). In one embodiment, the encrypting/signing module and the decrypting/verifying module may be adapted to track the number of times a key was utilized to sign or verify communications 24. In another embodiment, the network devices and/or the communication application may be adapted to send the utilization information to the KES 10, and the KES 10 is adapted to receive and store the utilization information. An ordinary person skilled in the art will appreciate that the ability to license the presentation of a sender verification panel and/or route communications to a 'trusted inbox' may generate substantial revenue to the issuer of the key pair.

Advantages of using a KES 10 and network devices of the present invention include but are not limited to the following: the KES provides a secure means of requesting and receiving public keys with key rotation capability; the EK records of the KES 10 and the network devices of the present invention are adapted to associate indicia to a key using the structure of the EK record. Even if the key uses IETF RFC 3709 to associate a logo, the communication application of the network device still must have a means of storing or otherwise retrieving indicia for presentation in a sender verification panel. A centralized KES 10 provides a single source for retrieving keys, so network devices do not need to contact a plurality of DNS servers. Finally, the present invention provides a means of determining if the sender and recipient have a pre-existing relationship and a means of determining the type or class of the sender.

Anti Phishing User Interface Modifications

Referring to FIG. 30a-FIG. 30d, a communication application 520 is adapted to present visual information to the recipient of a communication in a sender verification panel 950 (e.g., a console, panel, banner, pane, etc.). The visual information may include a textual verification, a graphical or video verification, or an audio verification of the type of sender; and, the name of the sender, and potentially a graphical, video, and audio verification of the identity of the sender (e.g., a company logo is displayed that is substantially similar to or identical to a company logo displayed in a received communication). The communication application 520 is adapted to display a sender verification panel 950 using technology appropriate to the type of device, such as Java Swing, MFC, .Net, HTML, Flash, or other technologies. In other embodiments, other types of communication applications 520 may be adapted by incorporating the foregoing embodiments with third party services such as virus scanning, anti-spy, or anti-phishing solutions.

In another aspect of the present invention, when a communication has been verified, the communication application is further adapted with a Sender Verification Panel 950 (FIG. 30b-30c) to display a visual icon or picture and descriptive text indicating the service level 952, and a visual icon or picture and descriptive text indicating the identity of the user (e.g., a corporate logo and company name) 956. If the recipient of the communication 24 has a persistent relationship in the KES 10 with the sender, the communication application may also be adapted to display a message or icon and descriptive text indicating that the sender and receiver have a persistent relationship 954. The communication application is adapted to provide a text message indicating the name of the service level and a description of the service level. In one embodiment, text messages may be substituted in foreign languages depending upon the language code selected by the user of the communication application, the communication application maintaining a table or resource bundle of display messages mapped to each language code using a language identifier such as ISO 639 or a combination of ISO 3166 and ISO 639 codes. In another embodiment, the communication application is adapted to present a hyperlink to information where the user of the communication application may learn more about the service level, its members, requirements and restrictions for members of the service level, and other information. The hyperlink may also be substituted according to the language preferences of the user.

In the exemplary embodiments, the communication 24 is encrypted with the sender's (e.g., User A's) private key located on network device 30 and sent to the recipient (e.g., User B) over the network 20, and it is decrypted by the recipient's communication application 520 with the sender's public key to verify the sender's identity and the message's integrity.

In one aspect of the present invention, a communication 24 contains indicia that match indicia included within an EK record. When the communication indicium is presented in juxtaposition to or transparently overlaid with the indicia 956 presented in a sender verification panel 950, a user may verify that the communication is truly from the sender. In one embodiment, indicia is a fixed pixel aspect ratio for presenting a company logo or icon (e.g., 64px by 64px) 956. In another embodiment, the communication indicium represents one piece of a logo or icon, and the verifying indicium contains another piece of a logo or icon such that when the two are shown in juxtaposition, they complete a whole logo or icon. In one embodiment, the pieces of a logo or icon are presented in the manner of puzzle pieces, and when overlaid they appear to complete a puzzle, the cutout preferably disappearing thereafter. In this embodiment, the communication application is adapted to retrieve the indicium from the communication; the communication containing a means of identifying the indicium (e.g., in an HTML email message, an '<img>' tag containing a unique ID within an 'id' attribute or CSS class name). In one embodiment, upon registration or confirmation of registration, the user of the service level manager ensures that the indicium is a registered trademark of the registrant. In other embodiments, the EK record may support a plurality of indicia sizes to account for the differences in display sizes and other presentation capabilities (e.g., black and white, color palette limitations, etc.).

In one embodiment, a communication application 520 such as an email application is further adapted with a communication preview list such as a 'trusted inbox' (FIG. 30*d*), where the list is configured to display only verified communications 24 or communications where the sender and the recipient have an established relationship on the KES 10. The process of displaying an encrypted communication in a preview list such as an inbox (FIG. 27, 924) is further adapted to determine if the communication is verified from a user of an exclusive service level or from a sender with whom the recipient has a relationship on the KES 10, and is routed to the 'trusted inbox' using routing rules. In one embodiment, step 902 of FIG. 26 is adapted to use the method of FIG. 28, and the method of step 906 of FIG. 26 is adapted with routing rules such that a decrypted/verified communication appears in a 'trusted inbox.' In another embodiment, the communication application's communication preview list is adapted to sort or filter (i.e., show by communication type) communications 24 according to whether or not they are signed by a user of an exclusive service level or sent by a sender with whom the recipient has a relationship on the KES 10. An ordinary person skilled in the art will appreciate that like a 'spam' or 'junk' folder that contains communications likely to be untrustworthy, a 'trusted inbox' folder that contains communications likely to be trustworthy may reduce the effort necessary to identify valid communications and increase the confidence of the user that they are interacting verified communication senders.

Sender Verification for Web-Based Email

A method of displaying a sender verification panel in a web-based email application will now be described. In one embodiment, a received communication 24 that was signed by an encrypting/signing module 534 potentially operated by a user of an exclusive service level is decrypted/verified by a decrypting/verifying module 536 potentially operated by communication provider. Referring to FIG. 21*a*, in one embodiment the receipt of a signed communication involves the decrypting/verifying module 536 retrieving a public key for verifying the inbound communication 24 from the data storage 508 of the network device 32 by first matching the "sent from" communication address 840 or some other identifying criteria associated to the key. Other criteria may include the key ID or fingerprint, the associated serial number 22, or a combination of the sender and recipient communication addresses. If the retrieved public key is capable of decrypting and verifying the communication, the decrypting/verifying module 536 decrypts and verifies the communication.

Figure 30B:
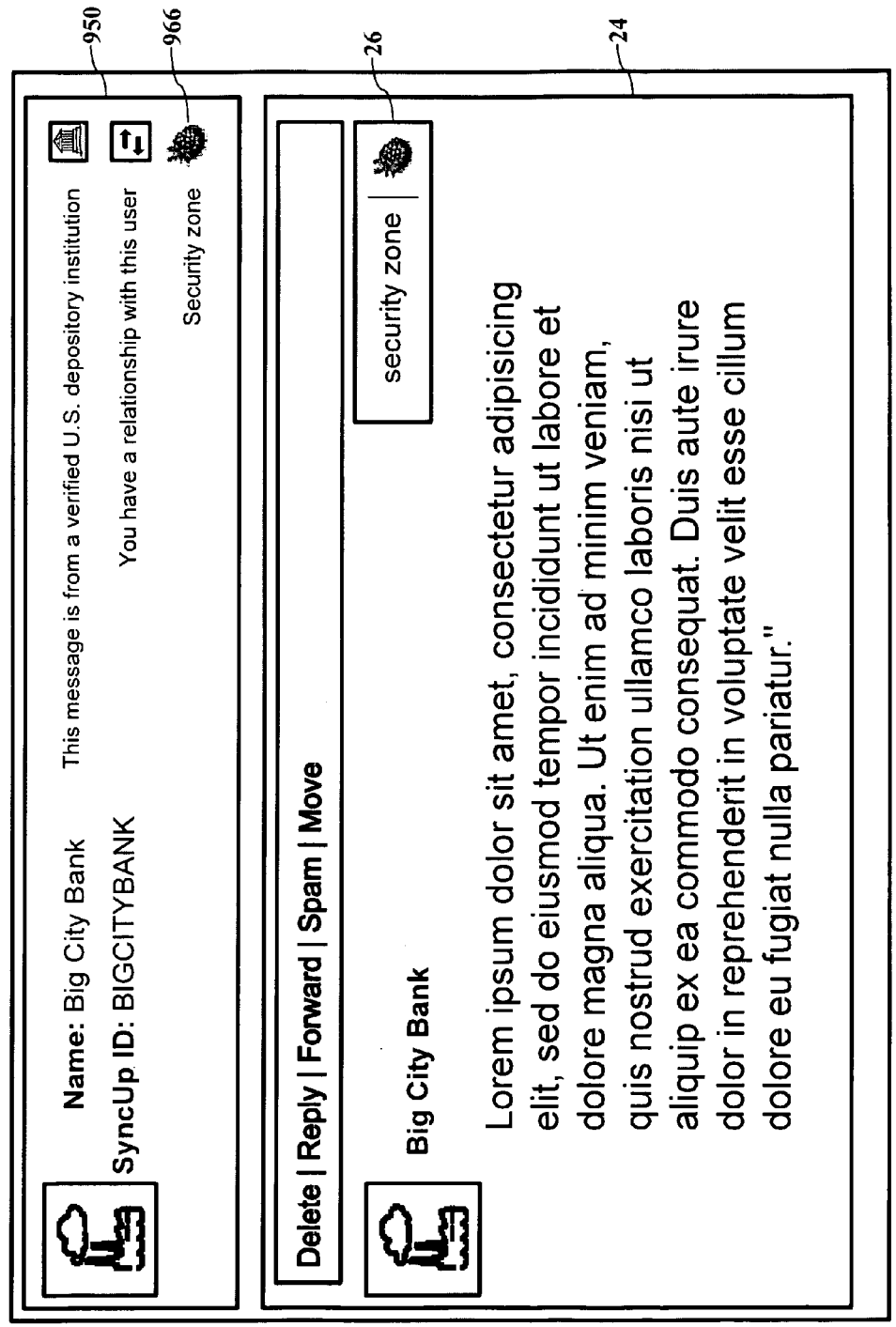
Figure 30C:
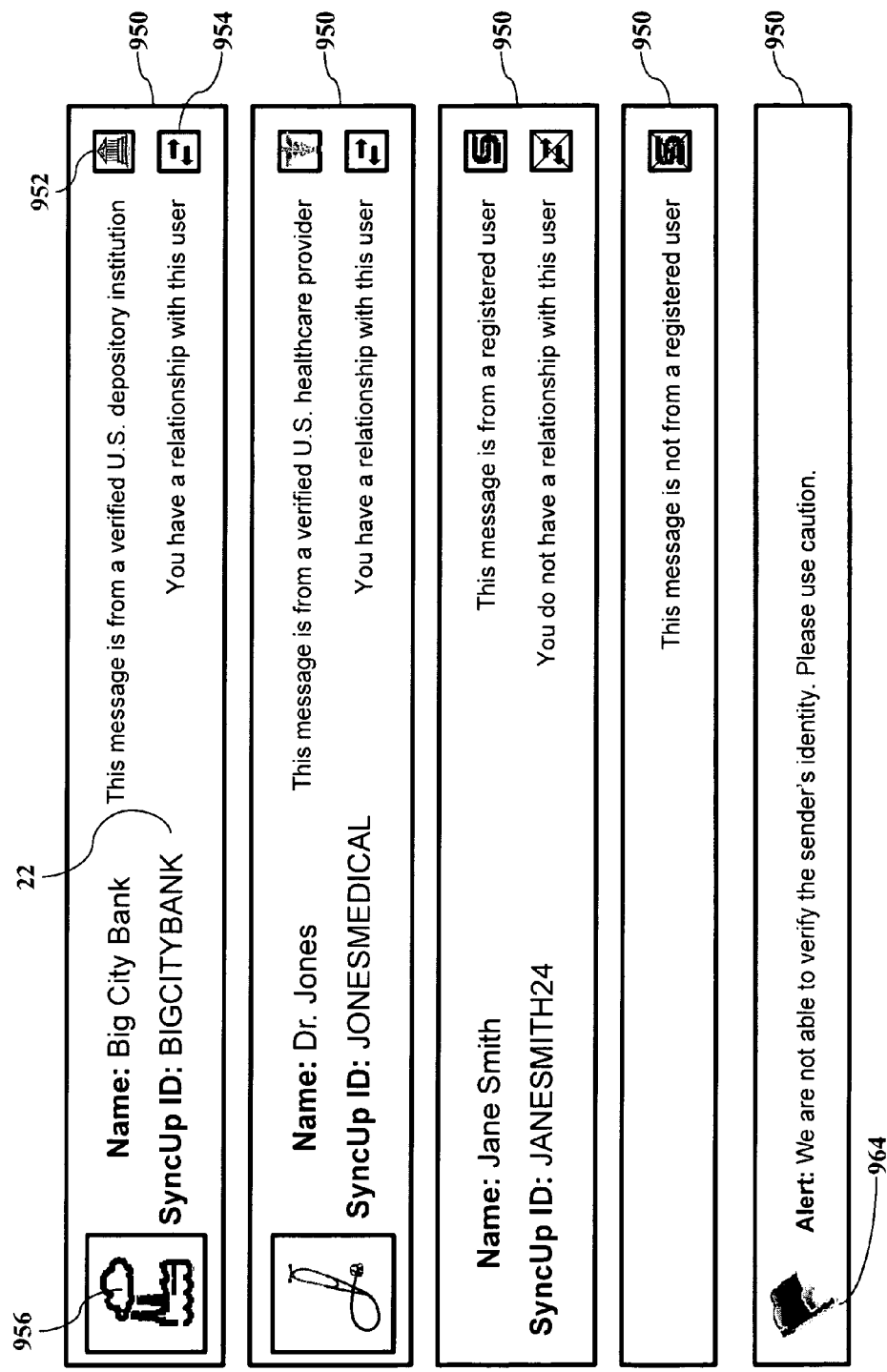
Figure 30D:
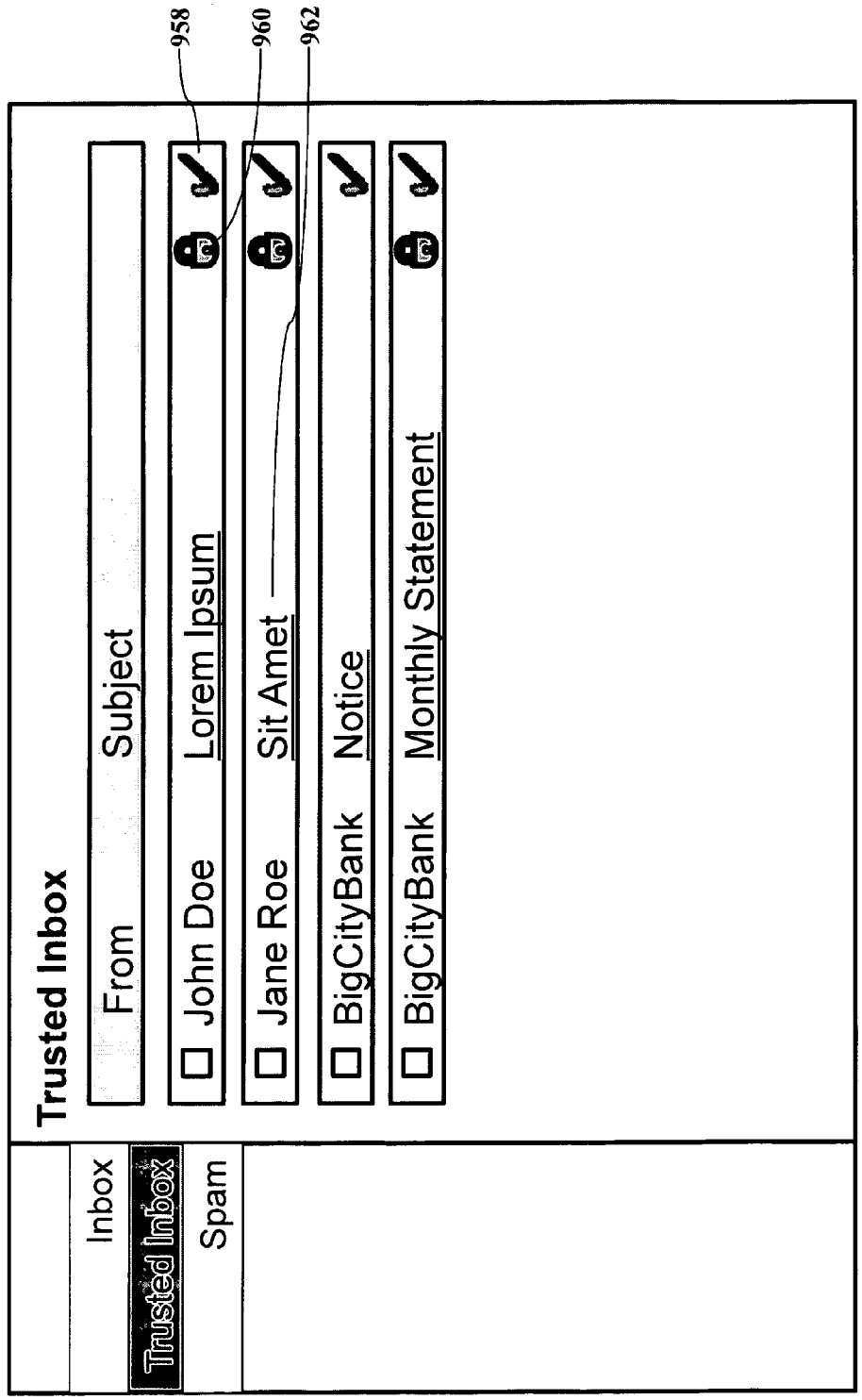

In one embodiment, the logic for retrieving and displaying the communication 24 includes retrieving the encrypted concatenated string associated to a communication using the process of FIG. 28, and decrypting the concatenated string to render a serial number 22, a unique identifier and preferably a key ID. The logic uses the serial number 22 to retrieve the appropriate indicia from the data storage 508 of the instant network device, another network device, or from the KES 10; then, it presents a sender verification panel 950 with the appropriate indicia. The sender verification panel may be presented in a hypertext document (e.g., XHTML) when the communication 24 is rendered (FIG. 30*b*).

In one embodiment, the sender verification panel 950 is presented in the toolbar of a browser. The browser may be adapted with a toolbar capable of presenting a sender verification panel 950, or the communication provider may provide a 'plug-in' or extension that provides a toolbar adapted to present a sender verification panel 950. When the communication 24 is to be presented in a hypertext browser, the hypertext contains the encrypted data. In one embodiment, the hypertext contains the communication header information. In another embodiment, the hypertext contains a hidden data field (e.g., <input type='hidden' value='encryptedConcatenatedString' id='encryptedData'/>). Other embodiments may incorporate the encrypted concatenated string too.

The toolbar may retrieve the encrypted concatenated string from the hypertext document using the Document Object Model (DOM). In one embodiment, the toolbar uses regular expressions to identify the header label of the encrypted concatenated string. In another embodiment the toolbar uses a scripting language such as JavaScript (e.g., document.getElementById('encryptedData')) to retrieve the encrypted concatenated string.

The toolbar or the browser is adapted to send an authenticated request to the web mail server, the request containing authentication criteria of the user and the encrypted concatenated string. The web mail server is adapted to decrypt the encrypted concatenated string to render a serial number 22, a unique identifier and preferably the key ID using the key corresponding to the one used by the decrypting/verifying module 536 (i.e., either symmetric or asymmetric keys may be used). In one embodiment, the web mail server contains a communication associated to the user by matching the unique identifier. The web mail server is further adapted to retrieve indicia associated to the serial number 22 from its data storage (e.g., if it is adapted with the functionality of a communication application 520 and network device as described herein), from another network device 32 or from the KES 10 and provide it in a reply to the browser toolbar. In one embodiment, if the server contains an associated communication, the reply may contain a Boolean attribute indicating that the server has an associated communication 24. Upon receipt of the reply, the toolbar is adapted to present the sender verification panel with the appropriate indicia and an indicator that the server has an associated communication.

In another embodiment, the hypertext contains a clear text copy of the unique ID and the encrypted concatenated string. A public key associated to the KES 10 or a certificate authority is used to generate the encrypted concatenated string, and the toolbar or browser is adapted to send the encrypted concatenated string and the unique ID to the KES 10 or a certificate authority. The KES 10 or a certificate authority may decrypt the encrypted concatenated string rendering a unique identifier, a serial number 22 and preferably a key ID. If the clear text unique identifier matches the decrypted unique identifier, the KES 10 or the certificate authority may validate the communication, retrieve indicia associated to the serial number 22 and/or the key ID from the instant network device, another network device or the KES 10 and transmit the indicia and verification status back to the browser wherein the indicia may be rendered in a sender verification panel.

In another embodiment, the decrypting/verifying module may associate the decryption key or certificate to the communication. The hypertext contains the decryption key or certificate (e.g., in the header, in a hidden input field, etc.). The toolbar or browser is adapted to retrieve the key or certificate from the communication 24 (e.g., from a hidden input field or a communication header) and send it to the KES 10 or a certificate authority, wherein the key or certificate is validated as belonging to a particular user in a manner similar to SSL/TLS. Upon validating a key or certificate, the KES 10 or a certificate authority may provide a reply to the browser or toolbar indicating the status of the verification procedure and appropriate indicia for rendering in an SVP 950.

Embedded Security Zones and Sender Verification

In one embodiment, a communication application 520 is adapted such that for each outbound communication 24, the communication application 520 selects and embeds a 'security zone' 26 (see FIG. 30b) into the outbound communication 24. The communication application 520 is further adapted with a set of varying indicia for the security zone, and may send each communication 24 with different indicia embedded in the security zone 26 (i.e., a set of 10 indicia, where the first communication uses indicium number 1, communication number 10 uses indicium number 10, and communication number 11 uses indicium number 1 in a repetitive cycle).

The encrypting/signing module 534 is adapted to recognize the security zone 26 and its indicium. In one embodiment, the method of recognizing the security zone 26 and indicium involves the encryption/signing module evaluating the outbound communication 24 with regular expressions, each regular expression identifying a particular 'security zone' and then recognizing the indicium therein. In one embodiment, each regular expression for recognizing a security zone 26 and its indicium is associated to a particular signing key or certificate. The encrypting/signing module is further adapted to select the signing key or certificate that matches the indicium 26 contained in the outbound communication. The corresponding signing key within the EK record 406 on the KES 10 is further adapted to associate a corresponding indicium 966 to the key so that the verifying security zone indicium 966 may be distributed with the key to other communication applications 520 and their decrypting/verifying modules 536.

The decrypting/verifying module 536 is adapted to associate a security zone 26 indicium with a particular public key or certificate used to verify a signed communication 24. The method of associating a unique identifier, a serial number 22, and an encrypted concatenated string of the two at step 919 of FIG. 28 is further adapted to incorporate a means of identifying the key used to verify the message or the security zone verification indicium 966 to present in a sender verification panel 950. In one embodiment, the decrypting verifying module appends the key ID or key fingerprint to the unique identifier and serial number 22, and the communication application 520 of the communication provider is further adapted to decrypt the encrypted payload and retrieve the verification indicia 952-956 and the security zone verification indicia 966 for presentation within the sender verification panel 950. The SVP 950 is further adapted to present the verification indicia 966.

Warning Messages and Sender Verification

In one embodiment, an EK record 406 on the KES 10 is adapted to store a matching criteria such as a regular expression wherein the matching criteria identifies at least one character, word, phrase or other sequence of characters within a communication; and, the EK record 560 on the network device 30 is also adapted to store the matching criteria; and, the communication application 520 is adapted with logic to retrieve matching criteria stored within a plurality of EK records associated to different user accounts; and, the communication application is adapted with logic to apply the retrieved matching criteria to an inbound communication to look for a matching string of characters if the message is not signed or encrypted as determined by steps 842-846 of FIG. 21a. For a general discussion of regular expressions, refer to *Mastering Regular Expressions*, by Jeffrey Friedl, O'Reilly Media 2006. In one embodiment, the communication application is further adapted to add a warning indication to the communication header using a method similar to that defined in FIG. 28: more specifically, the communication application adds a GUID and a warning flag to the communication header; concatenates the GUID and warning flag and encrypts the concatenated string; and, associates the encrypted concatenated string to the communication header. In one embodiment, the communication application is further adapted to present a warning message in a sender verification panel using a method similar to that defined in FIG. 27 and FIG. 29. In one embodiment, the communication application decrypts the encrypted concatenated string and identifies the warning flag; and, the logic to display the sender verification panel 950 is adapted to display a warning message with warning indicia 964 and a descriptive text message. An ordinary person skilled in the art will appreciate that the preferred anti-phishing embodiment is to positively identify the sender of a communication; however, a communication recipient may also benefit from a warning if a communication whose sender cannot be verified contains a character, word, phrase or other sequence of characters (e.g., a company name, trademark, etc.) that would suggest that the communication was sent by a user of an exclusive service level.

Content Delivery Networks for SVP Indicia

In one embodiment, a network device 32 and/or a communication application are adapted to utilize Content Delivery Network (CDN) functionality with edge servers to improve performance when retrieving verification and security zone indicia. For a general discussion of CDNs, refer to *Content Delivery Networks: Web Switching for Security, Availability, and Speed*, by Scott Hull, McGraw-Hill 2002.

Signing a Message and Omitting Clear Text

Signing messages using the RSA method adds the signature to an SMTP header, which provides the advantages of fast signing and verification and inclusion of the clear text message in the communication. The RSA method enables a person to receive a signed communication whether they have the decryption key or not, because the clear text is readable irrespective of the signature. The disadvantage of this method is that anyone with sufficient skill to operate a protocol analyzer or other tool on the network between the sender and recipient may retrieve the byte stream and read the contents of the email. While signing differs from encryption in that anyone may theoretically retrieve the public key and decrypt the signature, signing a communication without inclusion of the clear text and without the decryption key provides the additional advantage of frustrating an eavesdropper by forcing the eavesdropper to retrieve the public key and decrypt the message in order to read the clear text. However, to send a signed message without clear text, the sender of the communication must know that the recipient can decrypt the message by virtue of the recipient having both the decryption cipher and the public key. By the following methods of the present invention, a sender may sign a communication without inclusion of the clear text and send it to a recipient known to be able to decrypt the communication, verify the sender and read the decrypted clear text.

In one aspect of the present invention, a network device and communication application (e.g., a plug-in for Microsoft Outlook, or an application for a SmartPhone) provides logic to retrieve the at least one communication address associated to the network device and communication application; then, sends the retrieved at least one communication address to the KES 10 where the at least one communication address may be stored in a key usage policy record such that a sender may have a means of knowing that the recipient may receive a signed communication.

The recipient of a signed communication may be a user of a web-based email application, and the web-based email provider must have a means of enabling the sender to sign a communication to a recipient. In another aspect of the present invention, a service level manager 385 provides an administrator of the KES 10 with the means to create, modify or remove service levels for particular types of entities, such as communications providers (e.g., web-based email providers, broadband providers, wireless providers, etc). One object of such a service level is to provide a means for users of exclusive service levels to identify communication providers to whom they may send signed communications, even when there is no pre-existing encryption key relationship between the sender of a communication and the intended recipient.

In one aspect of the present invention, the service level manager 385 may create a service level for a communication provider such that a relationship established between the communication provider and a user of an exclusive service level (e.g., a depository institution) indicates to the user of the exclusive service level that the user may send signed communications without clear text to any recipient within the communication provider's communication domain (e.g., a domain name, a range of IP addresses, etc.). For example, a particular user (e.g., a national bank) may send a signed communication (e.g., an email signed by a private key) to a communication provider (e.g., a web portal) by recognizing the at least one communication address (e.g., domain name, IP address) associated to the communication provider.

Figure 20B:
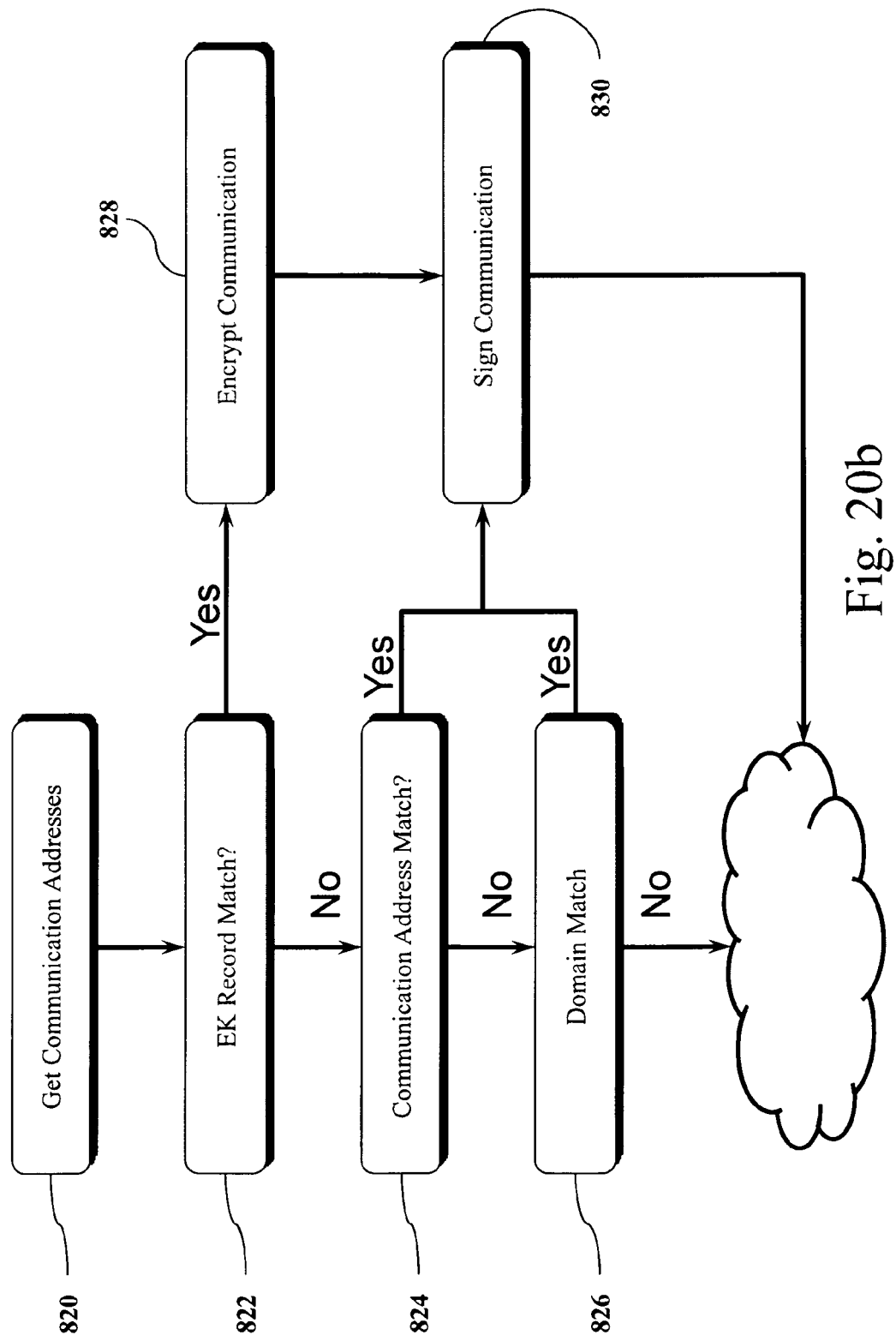

In another embodiment of the present invention, the communication application 520 located on a network device 30 associated to a user of an exclusive service level is further adapted to detect if an intended recipient of a communication has an established (pre-existing) relationship with the intended recipient on the KES 10. Referring to FIG. 20b, this determination may be made by methods such as using the communication address 820 of the intended recipient to perform a reverse-lookup to determine if the user has a serial number 22 for the intended recipient; by matching keys, key IDs or key fingerprints; by a serial number 22 included in the communication, by a combination of the sender and recipient communication addresses or by other methods. If the intended recipient and the sender have a pre-existing relationship 822, the communication application 520 may retrieve the EK record associated to the intended recipient, encrypt the communication with the intended recipient's public key 828; then, may sign the communication with one of the sender's private keys 830. If the intended recipient and the sender do not have a pre-existing relationship on the KES 10, the communication application 520 may sign the communication with one of the sender's private keys 830. In one embodiment of the present invention, the private key used to sign a communication where there is no pre-existing relationship between the sender and the intended recipient differs from the private key which would be used to sign a communication where there is a pre-existing relationship between the sender and the intended recipient so that the receiving application has at least one means of distinguishing communications that involve a pre-existing relationship from those that do not. In another embodiment, the communication application is adapted to associate the CNAME of the user's domain to a particular private key (e.g., jdoe@support.bigbank.com). In another embodiment, the communication application 520 is adapted to hold private keys of a plurality of different users using a fully qualified unique communication address such that different users using the same application can be authenticated. An ordinary person skilled in the art will appreciate that industry trends toward outsourcing create market conditions where a major organization may utilize third party services, and that communications sent from these third party services to an intended recipient may be identified by the fully qualified email address of the sender (e.g., majorbank1@support.com; majorbank2@support.com), via a canonical name (CNAME) (e.g., majorbank1.support.com; majorbank2.support.com), or via other methods.

In other embodiments, a communication provider may set a status flag in the provider's user account on the KES 10 indicating when the communication provider will accept signed emails—enabling the communication provider with a means of stopping users of exclusive service levels from sending signed communications without clear text when, for example, the communication provider needs to conduct system maintenance or upgrades.

In one embodiment, the KES 10 is adapted to provide a means of identifying who may receive a signed communication in the following manner: the KES 10 is adapted to support a communication list 428 containing communication address records for each exclusive service level. The KES 10 is further adapted with a communication address list updater 360 to identify each user who made a request using a network device 30 for all EK records associated to one or more service levels, retrieve each communication address of the requesting user where the communication application 520 of the network device 30 associated to the communication address is capable of decrypting/verifying a signed communication; then, creating a communication address record, and further storing the communication address record in the communication list 428 associated to the service level. In one embodiment, the requesting user's serial number 22 is also stored in the communication address record. In another embodiment, the type of the communication address (e.g., VoIP phone number, email address, etc.) is also added to the communication address record. The KES 10 is further adapted to be able to update the list of communication address records 430 when a user changes a communication address or changes the use permissions related to a communication address (e.g., the user no longer uses a communication address, the KES 10 finds out that the address is no longer valid (SMTP 500 error), the user no longer has the ability to verify a signed communication, etc.).

When a user makes a change to an EK record that is material to at least one communication list, the KES 10 determines which exclusive service levels the user requested. For each service level requested, the KES 10 queries the communication list associated to the exclusive service level using the serial number 22 as the primary key; then, makes any change necessary.

A communication application 520 on a network device 32 associated to a user of an exclusive service level and the KES 10 may be adapted to utilize the communication list 428 functionality in the following way: when the communication application user is authenticated by the KES 10 to be a member of an exclusive service level, the communication application 520 authorizes the user to utilize the communication list 428 functionality associated to that service level.

Figure 11C:
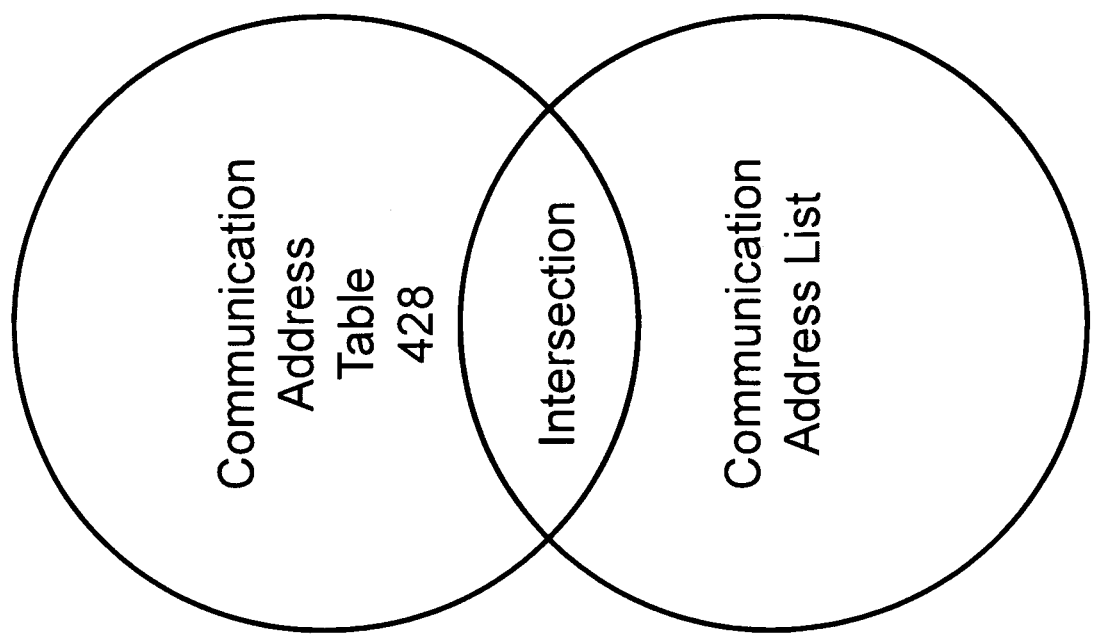
FIG. 11c illustrates generated an intersection of communication addresses at the KES 10.
Figure 11D:
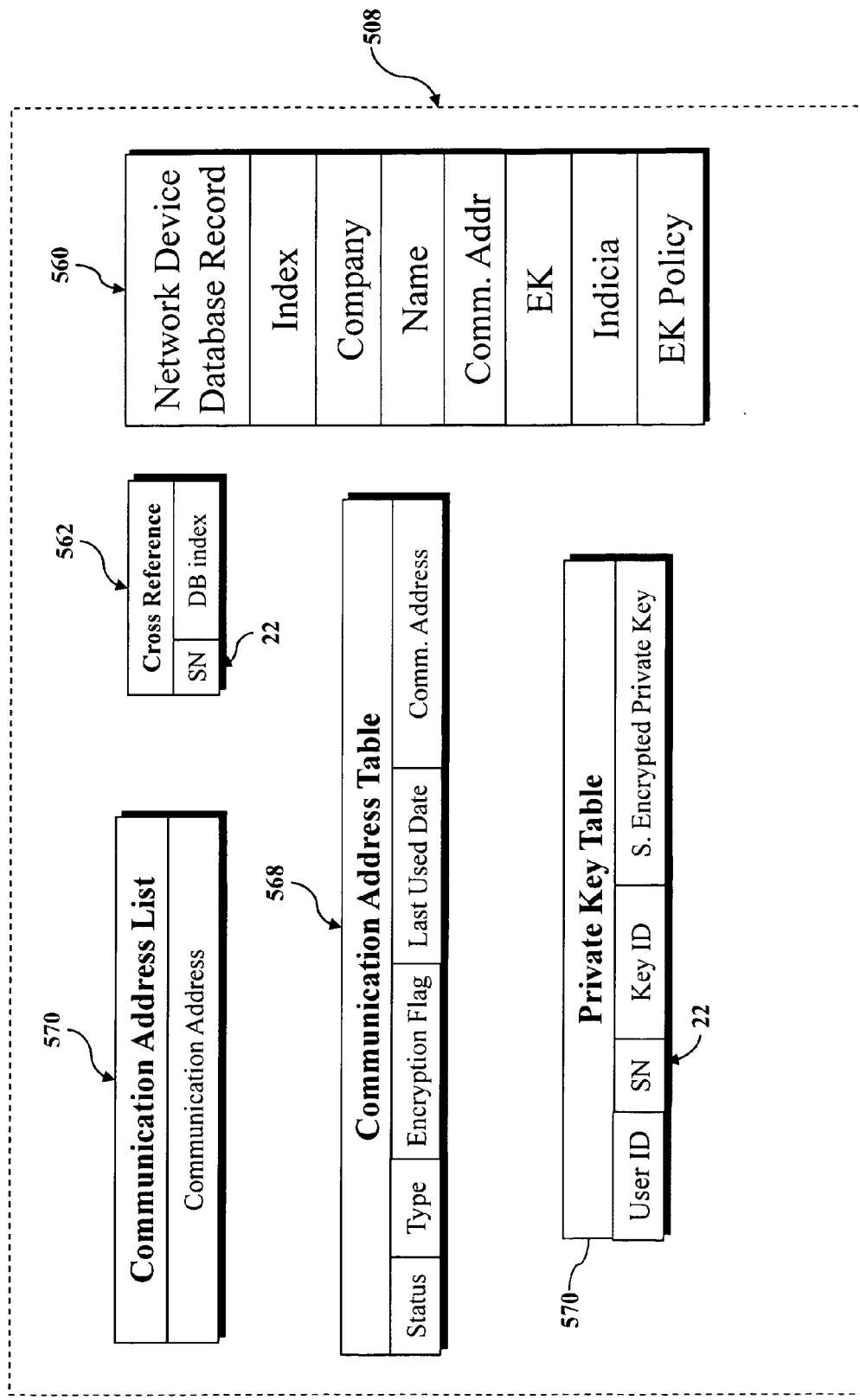

A communication application 520 contains logic 544 to import or retrieve a local list of communication addresses (FIG. 11d 570) where a signed or encrypted communication 24 may be sent. The communication application 520 contains logic 546 capable of making a request to the KES 10, the request containing the local list of communication addresses (FIG. 11*d* 570). The KES 10 contains logic 379 to accept the request and to find the intersection of the set of communication addresses contained within the communication list 428 and the set of communication addresses submitted by the request (FIG. 11*c*). The KES 10 provides the intersection of communication addresses in a reply which is stored (FIG. 11*d* 568) in the communication application 520 data storage 508, the intersection indicating to the communication application 520 which communication addresses may receive a signed communication 24. The communication application 520 is further adapted to store a copy of the requested communication list in the database of the network device 32. In operation, the program memory 504 may contain at least one communication list.

In another embodiment, the KES 10 is adapted with 'look forward' technology to forecast the need for communication addresses not included in the request from the communication application 520. For example, communication addresses of matching so-called 'partial correctness' or matching domain names may also be included along with the intersection of communication addresses (FIG. 11*c*). In one embodiment, since the communication application does not already have the communication address, the KES 10 is adapted to encrypt the communication address with a public key and to set a field indicating that it is encrypted by a particular public key, wherein the key is also accessible by the network device 32's communication application 520.

The communication application 520 is adapted to use the encrypted communication address in the following way: the program memory 504 contains logic for identifying one or more destination communication addresses 820 (FIG. 20*b*) of an outbound communication 24, the means to compare each destination communication address with the local communication list to determine if a matching address record exists 824; and, if a match doesn't exist, the means to encrypt the destination communication addresses and a means to compare each resulting encrypted data with the communication list to determine if a matching encrypted communication address record exists within the communication list 824; and, if a match exists in either of the foregoing scenarios, signing the communication with an appropriate private key 830 of the user of the exclusive service level. In one embodiment, the encryption/signing module described herein is adapted with the communication list functionality.

In one embodiment, the communication address record stored in the KES 10 contains a status attribute and a "last modified" timestamp attribute so that users of the exclusive service level may, via a communication application 520, query the communication list 428 on the KES 10 by timestamp to retrieve only the records that were modified since the last time the communication application queried the KES 10. Either the communication application or the KES 10 may store attributes indicating the last time a particular communication application last queried the communication list (e.g., using a device identifier and a time stamp of the last request). Upon receipt of the modified subset of the communication list, the communication application may modify the local copy of the communication list by adding a record, modifying an existing record, or deleting a record as instructed by the status attribute of the record retrieved from the KES 10. In one embodiment, only update and delete operations occur such that the communication application 520 only adds a new communication address to the list if the communication application sends or intends to send a communication 24 to a communication address that is not in the list.

Referring to FIG. 20*b*, an encrypting/signing module may use a plurality of matching schemes to determine if a communication may be encrypted or signed, and the encryption/signing module may have precedence for executing the matching schemes. For example, the encrypting/signing module first tries to detect a pre-existing relationship between the sender and the intended recipient by looking for a matching EK record 822; then, it attempts to see if the intended recipient's communication address exists in a list of communication addresses; then, it attempts to see if the intended recipient's communication address when encrypted with a particular key retrieved from the KES 10 can be matched with an encrypted communication address in the communication list retrieved from the KES 10 824; then, it attempts to see if the domain of the intended recipient matches a communication provider where the user of an exclusive service level operating the signing module has a relationship with a user of a communication provider service level 826.

An ordinary person skilled in the art will appreciate that while every non-exclusive user of the system may retrieve all EK records associated to the users of an exclusive service level, they may not have a pre-existing relationship with each user of an exclusive service level and may not wish to share their communication addresses with all users of the exclusive service level. A communication provider may also act on behalf of a non-exclusive user by downloading keys to decrypt signed messages. Users of an exclusive service level may only want to maintain a list of the communication addresses, communication domains and/or EK records they use regularly.

Obtaining a Plug-in

In one embodiment, an encrypted message is attached to a communication (e.g., in a similar manner to S/MIME), and the clear text portion of the communication provides the user with instructions on how to decrypt the message. In one embodiment, the attached encrypted message provides an application type extension mapping so that activating the attachment automatically activates the decryption application (or plug-in). In one embodiment, a hyperlink is attached to the communication, the hyperlink pointing to a site containing at least one plug-in application suitable for decrypting the message. In one embodiment, the server that contains the at least one plug in may determine the type of application submitting the hyperlink—e.g., a web browser of a particular type, an email application of a particular type, or a cellular phone of a particular type. In another embodiment, the sending application will have already made this determination by first having received a communication from the recipient, the communication containing a header indicating the type of application used by the recipient (e.g., an X-Mailer SMTP extension). In one embodiment, the attachment is an application containing logic to determine the type of client application in receipt of the communication, and logic to dynamically generate and preferably execute a hyperlink to retrieve an appropriate plug-in. In another embodiment, the server upon receiving a request for a plug-in may select an appropriate plug-in application automatically and transmit it to the requester. In an alternate embodiment, a communication may contain a plurality of hyperlinks attached to the communication, each hyperlink identifying a particular type of plug-in. In an alternate embodiment, the clear text portion of the message embeds at least one hyperlink to at least one plug-in application.

An ordinary person skilled in the art will appreciate that a communication in a format similar to S/MIME can be decrypted automatically by an application supporting the format and presented to the user if the application has an appropriate key—the clear text portion of the communication not presented. If the user does not have an appropriate key, the clear text portion of the communication may provide appropriate instructions for retrieving and configuring a key, a plug-in, or obtaining a user account with the KES 10.

Sending an Encrypted Email to a Non-User

In one embodiment, a user wants to send an encrypted communication to a recipient who is not a user of the KES 10. A network device 30 and communication application 520 is adapted request an encryption key for the intended recipient, the request containing the communication address of the recipient. The KES 10 is adapted to generate a key pair for the exclusive use of the sender and recipient of the communication, and convey one key to the communication sender, and to store the second key in a record including the communication address of the intended recipient. In one embodiment, the communication is sent to the recipient. The clear text portion of the communication contains instructions for signing up with the KES 10, and instructions on obtaining a suitable plug-in or other software module for decrypting and viewing the encrypted communication. When the user signs up with the KES 10, the KES 10 requires the recipient to confirm the communication address by sending a communication with a confirmation code, hyperlinked confirmation code or another method that enables the user to confirm the communication address with the KES 10. Once confirmed, the KES 10 creates an EK record, Link record 426 and Link EK record 427 and enables the user to retrieve the key from the Link EK 427 for decrypting the encrypted communication via a plug-in or other software module for decrypting and viewing the encrypted communication. An ordinary person skilled in the art will appreciate that by this method, a user may acquire and install a plug-in for a communication application and network device that enables the parties to the encryption key relationship to communicate in encrypted form without having to retrieve encryption keys from the KES 10 each time they receive an encrypted communication from the same party.

Adobe Flash-Based Application

In one embodiment, the communication application 520 is a web-based application. The communication application is adapted for use with an Adobe Flash application that contains the functions 522, 524, 528-538, and 550 to enable the user to decrypt and verify a communication 24. In one embodiment, the Adobe Flash application is invoked when the user clicks the encrypted message attachment (e.g., in a manner similar to S/MIME), where the file extension invokes the Adobe Flash application within the browser. In another embodiment, an Adobe Flash application is adapted to operate without the aid of a web browser, and may further provide common protocol modules (see FIG. 24, 514-526). In another embodiment, the Adobe Flash application includes the ability to create a communication and sign or encrypt it using a encrypting/signing module 534, and send it to an SMTP gateway using an SMTP client protocol 514 or an IMAP protocol. An ordinary person skilled in the art will appreciate that a user may maintain a persistent relationship with a sender without having to save an HTML attachment to a file before decrypting the communication (e.g., as is the case with solutions like IronPort PXE).

Communication Gateways

In an alternate embodiment, communication gateways 520 (e.g., MS Exchange Server, RIM Blackberry Exchange Server, IBM Lotus Domino, etc.) may be adapted to communicate with the KES 10, including registry information 522 and login information 524, which enable the communication gateways to access the KES 10. The communication gateway may also include a key manager function 528, an encryption key request manager 530, and a key cross reference function 532.

The corresponding communication applications that use the communication gateways (e.g., MS Outlook, MS Outlook for Mobile, RIM Blackberry, IBM Lotus Notes) are adapted to enter a serial number 22 and to initiate the making of a request which is routed to and handled by the communication gateway. In this embodiment, the communication gateway may make EK requests and receive EK replies on behalf of each user (e.g., using each user's authentication criteria, or the authentication criteria of a company), maintain the encryption keys on behalf of the various user accounts associated to the communication applications and provide encryption and decryption services on behalf of the communication applications (e.g., email clients pass requests via Messaging Application Programming Interface—MAPI).

Email gateways may provide web-based user interfaces for users attempting to access their email from a remote location. In one embodiment, an email gateway is adapted to provide sender verification panel 950 functionality for its web-based user interface among other features as described herein and depicted in FIGS. 21*a*-21*b*, 30*a*-30*d*, and 26-29.

An ordinary person skilled in the art will appreciate that individuals in large organizations increasingly use both desktop email applications and wireless email applications which have intranet security, and it may be more convenient for the gateway to provide the encryption and decryption services on behalf of those clients/network devices.

Anti-Phishing for Secure Communications Solutions

In one embodiment, the encrypting/signing module 534 is a secure communication solution (e.g., Voltage, IronPort PXE), which sends email invitations or notifications to recipients indicating that they have received a secure communication. The communication application 520 or the encrypting/signing module 534 is further adapted to send invitations or notifications by first signing the invitation or notification with a private key using methods described herein. In one embodiment a preexisting relationship as indicated by matching the intended recipient's communication address with an EK record determines the private key to be used in signing the message. In another embodiment, the user account on the KES 10 associated to the communication application 520 or the encrypting/signing module 534 has a relationship with a communication provider service level where the intended recipient's communication address matches the communication domain of the communication provider.

Communication Classification (This paragraph claims a priority date of Feb. 3, 2011, and not priority from U.S. Provisional Application Ser. No. 61/301,189 filed Feb. 3, 2010) In one embodiment, the key generator 395 is adapted to enable the certificate manager 396 and the key generator/rotator 397 to specify a classification for a communication, such that the communication recipient via sender verification panels and other means may determine the type of communication. Examples of communication classifications may include monthly statements, marketing messages, receipts, alerts, notifications, and other types of communications. Communication providers, upon verifying a communication signature may infer the type of communication from the communication classification and determine delivery priorities, routing rules, and other conditions for processing the communication from the communication classification. A communication classification may be subject to an agreement between a communication sender and the key exchange system provider. In other embodiments, a certificate and/or an encryption key pair may contain regular expressions which evaluate the communication and enable the signing, encryption, verification or decryption of the communication if the regular expressions evaluate to true. For example, a communication with a communication classification of "monthly statement," may require a text string indicating that it is a monthly statement (e.g., <h1>Monthly Statement</h1>).

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. In a network including a key exchange system and a plurality of network devices, a computer-implemented method enabling at least one communication recipient to identify a sender of a communication comprising:
creating, in the key exchange system, a user account for the communication sender, the user account storing user information comprising communication sender identification information, user authentication criteria and user indicia;
verifying, that the communication sender identification information associated with the user account positively identifies the communication sender;
associating the private key of an asymmetric key pair to a network device of the communication sender;
associating, to the user account of the communication sender on the key exchange system, the public key of the asymmetric key pair;
sending, by the network device of the communication sender, the communication, the communication digitally signed using the private key of the communication sender;
receiving, by the network device of the at least one communication recipient the communication;
receiving, by the key exchange system from the network device of the at least one communication recipient, a request for at least one public key and user indicia associated to at least one user account of the communication sender;
transmitting, to the network device of the at least one communication recipient, at least one public key and user indicia associated to at least one user account of the communication sender;
identifying, by the network device of the at least one communication recipient with the public key of the communication sender and the digital signature within the communication, the identity of the communication sender; and,
presenting, by a user interface of the network device of the at least one communication recipient, user indicia of the communication sender.

2. The method of claim 1, wherein the step of verifying includes verifying a right of the communication sender to use the stored indicia.

3. The method of claim 1, wherein associating the public key of the asymmetric key pair to the user account includes generating the asymmetric key pair from a certificate.

4. The method of claim 1, wherein associating the public key of the asymmetric key pair includes generating the asymmetric key pair from a certificate, the public key including at least one of embedded user indicia and an association to user indicia.

5. The method of claim 1, wherein associating the public key of the asymmetric key pair includes generating the asymmetric key pair from a certificate, the public key including at least one of embedded security zone indicia and an association to security zone indicia, wherein transmitting at least one pubic key and user indicia includes security zone indicia.

6. The method of claim 1, wherein verifying includes specifying, by at least one of the administrative user of the key exchange system and the certificate authority and the third party application, a classification of the communication sender and associating the classification with the user account.

7. In a network, including a key exchange server and a plurality of network devices, a network device of a communication sender comprising:
a network interface for facilitating network communication;
a processor for executing and a program memory for executing therein
user authentication logic for managing at least one of user authentication information and user authentication criteria to authenticate at least one communication sender with the key exchange server,
signing logic for signing a communication with a private key of an asymmetric key pair wherein the asymmetric key pair verifies, by a public key of the asymmetric key pair retrieved from the key exchange server, an identity of the communication sender, and
at least one of
certificate requester logic for retrieving a certificate associated to a user account on the key exchange server, the certificate identifying a communication sender, and at least one of the user indicia of the communication sender and a classification of the communication sender,
private key requester logic for retrieving a private key of at least one asymmetric key pair associated to a user account on the key exchange server, the key pair identifying a communication sender, and at least one of the user indicia of the communication sender and a classification of the communication sender,
security zone indicia requester logic for retrieving security zone indicia from the key exchange server,
key generation logic for generating an asymmetric key pair from a certificate whereby the private key is stored in at least one of the data storage and the program memory of the network device and the public key is transmitted to the key exchange server and associated to the user account on the key exchange server, the key pair identifying the communication sender, and at least one of the user indicia of the communication sender and the classification of the communication sender,
key rotation logic for invoking the key generation logic automatically on a periodic basis; and,
a communication application adapted to invoke signing logic to sign the communication with the private key of the key pair, the key pair identifying the communication sender, and at least one of the user indicia of the communication sender and the classification of the communication sender.

8. The network device of claim 7, wherein the communication application is an email application and the communication is an email message.

9. The network device of claim 7, wherein the communication application is a short message service application and the communication is a short message service message.

10. The network device of claim 7, wherein the communication application is an instant messaging application and the communication is an instant message.

11. The network device of claim 7, wherein the communication contains a variable, the signing logic is adapted to select a private key with associated security zone indicia, and the signing logic is adapted to substitute the variable with a reference to the security zone indicia of the selected private key.

12. In a network including a key exchange server and a plurality of network devices, a network device of a communication recipient comprising:
  a network interface for facilitating network communication;
  a processor for executing and a program memory for storing therein
  verifying logic for verifying a communication with a public key of an asymmetric key pair retrieved from the key exchange server wherein the public key verifies an identity of the communication sender, and at least one of a user indicia of the communication sender and a classification of the communication sender,
  sender verification panel logic for presenting to the communication recipient a sender verification panel in juxtaposition to a verified communication, the sender verification panel presenting the identity of the communication sender and the classification of the communication sender, and
  at least one of
  public key requester logic for retrieving at least one public key of at least one key pair associated to a user account on the key exchange server, the key pair identifying the communication sender, and at least one of user indicia of the communication sender and the classification of the communication sender,
  security zone indicia requester logic for retrieving security zone indicia from the key exchange server,
  key rotation logic for invoking the public key requester logic automatically on a periodic basis; and,
  a communication application adapted to invoke verifying logic to verify the communication with the public key of the key pair, the key pair identifying the communication sender, and at least one of the user indicia of the communication sender and the classification of the communication sender.

13. The network device of claim 12, wherein the communication application is an email application and the communication is an email message.

14. The network device of claim 12, wherein the communication application is a short message service and the communication is a short message service message.

15. The network device of claim 12, wherein the communication application is an instant message application and the communication is an instant message.

16. The network device of claim 12, wherein the communication contains user indicia and the sender verification panel animates the user indicia of the sender verification panel and the user indicia of the communication to establish a visual match.

17. The network device of claim 12, wherein the sender verification panel logic presents security zone indicia.

18. The sender verification panel logic of claim 17, wherein the communication contains security zone indicia and the sender verification panel logic animates the security zone indicia of the sender verification panel and the security zone indicia of the communication to establish a visual match.

19. The network device of claim 12, wherein the processor for executing and the program memory for storing therein further comprises verified communication presentation logic for presenting at least one verified received communication separately from unverified received communications; and, the communication application is further adapted to invoke the verified communication presentation logic to separately present the at least one verified received communication.

20. In a network including a key exchange system and a plurality of network devices, a computer-implemented method enabling at least one communication application to identify a server provider of a server comprising:
  creating, in the key exchange system, a user account for a server provider, the user account storing server provider identification information and user authentication criteria;
  verifying, that the server provider identification information associated with the user account identifies the server provider;
  associating a private key of a key pair to a server of the server provider;
  associating, to the user account of the server provider on the key exchange system, a public key of the key pair;
  receiving, by the key exchange system from the communication application of a network device, a request for at least one public key associated to at least one user account;
  transmitting, by the key exchange system to the communication application of the network device, at least one public key of at least one user account;
  communicating, by the communication application of the network device to the server of the server provider; and,
  identifying, by the communication application of the network device with the public key of the server provider, the identity of the server provider of the server.

21. The method of claim 20, wherein the communication application is adapted to present at least one of user indicia of the server provider and a classification of the server provider in a server verification panel when the communication application identifies the server of the server provider using at least one public key received from the key exchange system.

22. The method of claim 20, wherein verifying includes specifying by at least one of the administrative user of the key exchange system and the certificate authority and the third party application, a classification of the server provider and associating the classification with the user account.

23. In a network, including a key exchange server and a plurality of network devices, a network appliance for verifying a communication comprising:
  a network interface for facilitating network communication;
  a processor for executing and a program memory for storing therein
  verifying logic for verifying a communication with a public key of an asymmetric key pair retrieved from the key exchange server wherein the public key verifies at least one of an identity of the communication sender and a classification of the communication sender,
communication routing logic for routing a verified communication,
at least one of
public key requester logic for retrieving at least one public key of at least one key pair associated to a user account on the key exchange server, the key pair identifying at least one of the communication sender and the classification of the communication sender, and
key rotation logic for invoking the public key requester logic automatically on a periodic basis; and,
a communication application adapted to invoke verifying logic to verify a communication with the public key of the key pair, the key pair identifying at least one of the communication sender and the classification of the communication sender, and further adapted to invoke communication routing logic to route the communication after verification.

* * * * *